US008577026B2

(12) United States Patent
Lablans

(10) Patent No.: US 8,577,026 B2
(45) Date of Patent: Nov. 5, 2013

(54) METHODS AND APPARATUS IN ALTERNATE FINITE FIELD BASED CODERS AND DECODERS

(75) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 225 days.

(21) Appl. No.: 12/980,504

(22) Filed: Dec. 29, 2010

(65) Prior Publication Data

US 2012/0170738 A1   Jul. 5, 2012

(51) Int. Cl.
*H04K 1/00*   (2006.01)

(52) U.S. Cl.
USPC .......................................................... 380/28

(58) Field of Classification Search
USPC .......................................................... 380/28
See application file for complete search history.

(56) References Cited

U.S. PATENT DOCUMENTS

| | | | |
|---|---|---|---|
| 3,129,340 A | 4/1964 | Baskin | |
| 3,142,037 A | 7/1964 | Gazale | |
| 3,210,529 A | 10/1965 | Hanson | |
| 3,283,256 A | 11/1966 | Hurowirz | |
| 3,492,496 A | 1/1970 | Callan | |
| 3,515,805 A | 6/1970 | Fracassi et al. | |
| 3,586,022 A | 6/1971 | Bauer | |
| 3,649,915 A | 3/1972 | Mildonian | |
| 3,656,117 A | 4/1972 | Maley et al. | |
| 3,660,678 A | 5/1972 | Maley et al. | |
| 3,663,837 A | 5/1972 | Epstein et al. | |
| 3,671,764 A | 6/1972 | Maley et al. | |
| 3,718,863 A | 2/1973 | Fletcher et al. | |
| 3,760,277 A | 9/1973 | Whang | |
| 3,970,790 A | 7/1976 | Guanella | |
| 3,988,538 A | 10/1976 | Patten | |
| 3,988,676 A | 10/1976 | Whang | |
| 4,162,480 A * | 7/1979 | Berlekamp | 714/784 |
| 4,195,196 A | 3/1980 | Feistel | |
| 4,195,200 A | 3/1980 | Feistel | |
| 4,304,962 A | 12/1981 | Fracassi et al. | |
| 4,378,595 A | 3/1983 | Current | |
| 4,383,322 A | 5/1983 | Halpern et al. | |
| 4,553,237 A | 11/1985 | Nakamura et al. | |
| 4,745,568 A | 5/1988 | Onyszchuk et al. | |
| 4,775,984 A | 10/1988 | Jaffre et al. | |

(Continued)

OTHER PUBLICATIONS

Wicker, Stephen "Error Control Systems for Digital Communication and Storage", Prentice Hall (1995) pp. 109-121.

(Continued)

*Primary Examiner* — Christopher Brown

(57) ABSTRACT

Methods and apparatus for coding and decoding n-state symbols with n≥2 and n>2 and n>3 and n>4 are provided wherein at least one implementation of an addition over an alternate finite field GF(n) and an inverter defined by a multiplication over the alternate finite field GF(n) are provided. Encoders and decoders implementing a single n-state truth table that is a truth table of an addition over an alternate finite field GF(n) modified in accordance with at least one inverter defined by a multiplication over the alternate finite field GF(n) are also provided. Encoders include scramblers, Linear Feedback Shift Register (LFSR) based encoders, sequence generator based encoders, block coders, streaming cipher encoders, transposition encoders, hopping rule encoders, Feistel network based encoders, check symbol based encoders, Hamming coder, error correcting encoders, encipherment encoders, Elliptic Curve Coding encoders and all corresponding decoders. Systems applying encoders and decoders also are provided.

18 Claims, 15 Drawing Sheets

(56) References Cited

U.S. PATENT DOCUMENTS

| | | |
|---|---|---|
| 4,797,848 A | 1/1989 | Walby |
| 4,808,854 A | 2/1989 | Reinagel |
| 4,815,130 A | 3/1989 | Lee |
| 4,928,280 A | 5/1990 | Nielson et al. |
| 4,984,192 A | 1/1991 | Flynn |
| 4,990,796 A | 2/1991 | Olson |
| 5,017,817 A | 5/1991 | Yamakawa |
| 5,070,504 A | 12/1991 | Bossen et al. |
| 5,230,003 A | 7/1993 | Dent et al. |
| 5,327,441 A | 7/1994 | Kawazoe et al. |
| 5,351,297 A | 9/1994 | Miyaji et al. |
| 5,386,425 A | 1/1995 | Kim |
| 5,412,665 A | 5/1995 | Gruodis |
| 5,412,687 A | 5/1995 | Sutton et al. |
| 5,563,530 A | 10/1996 | Frazier |
| 5,621,580 A | 4/1997 | Cruz et al. |
| 5,714,892 A | 2/1998 | Bowers et al. |
| 5,724,383 A | 3/1998 | Gold et al. |
| 5,745,522 A | 4/1998 | Heegard |
| 5,761,239 A | 6/1998 | Gold et al. |
| 5,771,245 A | 6/1998 | Zhang |
| 5,784,427 A | 7/1998 | Bennett et al. |
| 5,790,265 A | 8/1998 | Shikakura |
| 5,790,591 A | 8/1998 | Gold et al. |
| 5,829,466 A | 11/1998 | Church |
| 5,856,980 A | 1/1999 | Doyle |
| 5,881,073 A | 3/1999 | Wan et al. |
| 5,889,413 A | 3/1999 | Bauer |
| 5,917,914 A | 6/1999 | Shaw et al. |
| 5,946,473 A | 8/1999 | Lotspiech et al. |
| 5,959,871 A | 9/1999 | Pierzchala et al. |
| 5,978,412 A | 11/1999 | Takai |
| 5,999,542 A | 12/1999 | Turner et al. |
| 5,999,959 A | 12/1999 | Weng |
| 6,122,376 A | 9/2000 | Rao |
| 6,133,753 A | 10/2000 | Thomson et al. |
| 6,133,754 A | 10/2000 | Olson |
| 6,181,164 B1 | 1/2001 | Miller |
| 6,188,714 B1 | 2/2001 | Yamaguchi |
| 6,192,257 B1 | 2/2001 | Ray |
| 6,275,538 B1 | 8/2001 | Ramesh et al. |
| 6,320,897 B1 | 11/2001 | Fattouche et al. |
| 6,389,080 B1 | 5/2002 | Barnes |
| 6,411,231 B1 | 6/2002 | Yanagiya et al. |
| 6,430,246 B1 | 8/2002 | Ozluturk |
| 6,452,958 B1 | 9/2002 | van Nee |
| 6,463,448 B1 | 10/2002 | Mo |
| 6,477,205 B1 | 11/2002 | Doblar et al. |
| 6,477,680 B2 | 11/2002 | Mujtaba |
| 6,501,801 B2 | 12/2002 | Chujoh et al. |
| 6,510,228 B2 | 1/2003 | Rose |
| 6,519,275 B2 | 2/2003 | Callaway et al. |
| 6,530,059 B1 | 3/2003 | Crozier et al. |
| 6,570,927 B1 | 5/2003 | Van Stralen et al. |
| 6,574,283 B1 | 6/2003 | Sakoda et al. |
| 6,590,860 B1 | 7/2003 | Sakoda et al. |
| 6,665,832 B1 | 12/2003 | Neufeld et al. |
| 6,721,771 B1 | 4/2004 | Chang |
| 6,735,606 B2 | 5/2004 | Terasawa et al. |
| 6,763,363 B1 | 7/2004 | Driscoll |
| 6,785,389 B1 | 8/2004 | Sella et al. |
| 6,794,999 B1 | 9/2004 | Said |
| 6,816,555 B2 | 11/2004 | Sakoda |
| 6,845,481 B2 | 1/2005 | Gueguen et al. |
| 6,850,175 B1 | 2/2005 | Bossen |
| 6,851,086 B2 | 2/2005 | Szymanski |
| 6,907,062 B2 | 6/2005 | Carlson |
| 6,909,704 B2 | 6/2005 | Sakoda |
| 6,937,727 B2 | 8/2005 | Yup et al. |
| 6,961,369 B1 | 11/2005 | Tzannes |
| 6,967,601 B2 | 11/2005 | Bossen |
| 7,000,167 B2 | 2/2006 | Coker et al. |
| 7,046,803 B2 | 5/2006 | Lee et al. |
| 7,061,888 B2 | 6/2006 | Sakoda |
| 7,069,287 B2 | 6/2006 | Paar et al. |
| 7,082,449 B2 | 7/2006 | Rarick |
| 7,092,906 B1 | 8/2006 | Campbell et al. |
| 7,099,469 B2 | 8/2006 | Kuhlman et al. |
| 7,116,250 B2 | 10/2006 | Coene |
| 7,133,458 B2 | 11/2006 | Sakoda |
| 7,177,424 B1 | 2/2007 | Furuya et al. |
| 7,227,949 B2 | 6/2007 | Heegard et al. |
| 7,236,433 B2 | 6/2007 | Kando et al. |
| 7,372,960 B2 | 5/2008 | Lambert |
| 7,383,435 B2 | 6/2008 | Fellerer |
| 7,415,112 B2 | 8/2008 | Amer |
| 7,421,076 B2 | 9/2008 | Stein et al. |
| 7,506,015 B1 | 3/2009 | Graham |
| 7,508,399 B2 | 3/2009 | Kim et al. |
| 7,573,405 B2 | 8/2009 | Shima |
| 7,586,924 B2 | 9/2009 | Wiegand |
| 7,605,722 B2 | 10/2009 | Beack et al. |
| 7,711,763 B2 | 5/2010 | Stribaek |
| 7,831,895 B2 * | 11/2010 | Lin ............................... 714/800 |
| 2002/0054682 A1 | 5/2002 | Di Bernardo et al. |
| 2002/0089364 A1 | 7/2002 | Goldgeisser et al. |
| 2003/0063677 A1 | 4/2003 | Mix et al. |
| 2003/0072449 A1 | 4/2003 | Myszne |
| 2003/0099359 A1 | 5/2003 | Hui |
| 2003/0125055 A1 | 7/2003 | Kim et al. |
| 2003/0165184 A1 | 9/2003 | Welborn et al. |
| 2003/0167431 A1 | 9/2003 | Nicolaidis et al. |
| 2003/0204541 A1 | 10/2003 | Shackleford et al. |
| 2004/0021829 A1 | 2/2004 | Griffin |
| 2004/0032918 A1 | 2/2004 | Shor et al. |
| 2004/0032949 A1 | 2/2004 | Forest |
| 2004/0037108 A1 | 2/2004 | Notani |
| 2004/0042702 A1 | 3/2004 | Akimoto |
| 2004/0068164 A1 | 4/2004 | Diab et al. |
| 2004/0078555 A1 * | 4/2004 | Porten et al. .................. 712/221 |
| 2004/0085937 A1 | 5/2004 | Noda |
| 2004/0091106 A1 | 5/2004 | Moore et al. |
| 2005/0135621 A1 | 6/2005 | Burdine et al. |
| 2005/0207571 A1 | 9/2005 | Ahn et al. |
| 2007/0058805 A1 | 3/2007 | Ohkuma et al. |
| 2007/0110229 A1 * | 5/2007 | Lablans ......................... 380/28 |
| 2008/0016418 A1 | 1/2008 | Evans et al. |
| 2008/0031251 A1 | 2/2008 | Rajan et al. |
| 2009/0122978 A1 | 5/2009 | Gorissen et al. |
| 2009/0214024 A1 | 8/2009 | Schneider |
| 2010/0014664 A1 | 1/2010 | Shirai et al. |
| 2010/0057823 A1 * | 3/2010 | Filseth et al. ................. 708/492 |

OTHER PUBLICATIONS

Mathworks, "Communications Blockset Descrambler", http://www.mathworks.de/access/helpdesk_r13/help/toolbox/commblks/ref/descrambler.html, website,(1994-2007).

Mathworks, "Communications Blockset Scrambler", http://www.mathworks.de/access/helpdesk_r13/help/toolbox/commblks/ref/scrambler.html, (before 2003), 1-2.

Mathworks, "Descrambler Blocks (Communications Blockset)", *Matlab 7.1.0 R14 Help Screen*, (2005).

Selected page from Communications Blockset for use with Simulink, Reference, version 2, 2002, The Mathworks, 1 page, Natick, MA 01760-2098, downloaded from Internet.

Rogers, Derek P., "Non-Binary Spread-Spectrum Multiple-Access Communications", *Derek Rogers, Ph. D. Thesis*, 213 pages, *The University of Adelaide, Faculty of Engineering*, Adelaide, Australia, Mar. 1995., 213 pgs.

Sklar, Bernard "Reed-Solomon Codes", Downloaded from URL http://www.informit.com/content/images/art_sklar7_reed-solomon/elementLinks/art_sklar7_reed-solomon.pdf, (unknown pub date), pp. 1-33.

Kim et al., Synchronization of Shift Register Generators in Distributed Sample Scramblers, 1994, IEEE transactions on Communications, vol. 42, No. 2/3/4, pp. 1400-1408.

Clarke, C.K.P. "Reed-Solomon Error Correction", *BBC R&D White Paper*, (Jul. 2002), 45 pp.

Frank M.Loya, Algorithm for Initialization of a Convolutional Decoder, JPL New Technology Report NPO—19776, Sep. 1998, 13 pages, JPL, Pasadena, CA.

(56) References Cited

OTHER PUBLICATIONS

Armanavicius, G. et al., "Analysis of pseudo-noise sequences for multi channel distance measurements", ISSN 1392-2114 *Ultragarasas*, Nr. 4(37), (2000).

Pohlmann, Ken C., "The Compact Disc; a handbook of theory and use", *The Computer music and digital audio series*; vol. 5 A-R Editions, Inc. Madison, WI 1989, pp. 58-61.

Rao, Wenjing et al., "Fault Tolerant Arithmetic with Applications in Nanotechnology Based Systems", *ITC International Test Conference*, (Oct. 26-28, 2004), pp. 472-478.

Wong, et al., "Using Multi-Dimensional Parity-Check Codes to Obtain Diversity in Rayleigh Fading Channels", URL: www.dsp.ufl.edu/-twong/Preprints/00965675.pdf, (2001), pp. 1210-1214.

Tee, et al., "Multilevel Generalised Low-Density Parity-Check Codes", *Electronics Letters*, vol. 42 No. 3, (Feb. 2006), 2 pages.

Sklar, Bernard, "A Primer on Turbo Code Concepts", *IEEE Communications Magazine*, (Dec. 1997), pp. 94-102.

Xilinx LogiCORE™, "Compatible Turbo Product Code Encoder v1.0", *IEEE 802.16, Product Specification*, (Jun. 30, 2008), 7 pages.

Valles, et al., "Hamming Codes Are Rate-Efficient Array Codes", *IEEE Globecom*, (2005), 1320-1324.

ECC Tutorial by Certicom Corp. of Mississauga, ON, Canada, downloaded from www.certicom.com/index.php/10-introduction, no date provided but which was available on-line before Nov. 23, 2010, 32 pgs.

* cited by examiner

|  | col1 | col2 | col3 | col4 |
|---|---|---|---|---|
| row1 | d1 | d5 | d9 | q1 |
| row2 | m1 | m5 | m9 | q2 |
| row3 | d2 | d6 | d10 | q3 |
| row4 | m2 | m6 | m10 | q4 |
| row5 | r1 | r2 | r3 | q9 |
| row6 | p1 | p2 | p3 | q10 |

|       | col11 | col12 | col13 | col14 |
|-------|-------|-------|-------|-------|
| row1  | d1    | d5    | d9    | q1    |
| row2  | d2    | d6    | d10   | q2    |
| row3  | d3    | d7    | d11   | q3    |
| row4  | d4    | d8    | d12   | q4    |
| row5  | r1    | r2    | r3    |       |

3501

|       | col21 | col22 | col23 |
|-------|-------|-------|-------|
| row1  | d12   | d11   | d10   |
| row2  | d9    | d8    | d7    |
| row3  | d6    | d5    | d4    |
| row4  | d3    | d2    | d1    |
| row5  | p1    | p2    | p3    |

3502

METHODS AND APPARATUS IN ALTERNATE FINITE FIELD BASED CODERS AND DECODERS

BACKGROUND OF THE INVENTION

The present invention relates to apparatus and methods for coding and for decoding. In particular, it relates to methods and apparatus for coding and for decoding that apply an implementation of at least an n-state addition over an alternate finite field GF(n) and at least one n-state inverter defined by a multiplication over the alternate finite field GF(n) or an implementation of a truth table defined by said addition and inverter, with n>2, with n>3 or with n>4.

Finite fields GF(n), including classical extension fields are known. Presently, certain type of coders apply additions and multiplications over a classical finite field GF(n). This makes certain elements of an encoder and/or decoder relatively predictable. It would make a coded signal of n-state symbols with n>2, n>3 or n>4, including certain check symbols generated as part of a code word less predictable if novel functions with attractive properties as defined in an alternate and currently unknown finite field would be used.

Accordingly, novel and improved methods and apparatus for encoding and decoding n-state symbols with functions defined over an alternate finite field are required.

SUMMARY OF THE INVENTION

As an aspect of the present invention methods and apparatus for encoding and decoding n-state symbols with n>1, n>2, n>3 and n>4 are provided wherein a single truth table is implemented which is a truth table of an addition over an alternate finite field or a truth table of an addition over the alternate finite field that is modified in accordance with at least one inverter defined by a multiplication over an alternate finite field, wherein an alternate finite field has a neutral element that is not 0.

In accordance with a further aspect of the present invention, an apparatus is provided for encoding a first sequence of n-state symbols, each symbol being represented by a signal, comprising an input enabled to receive the first sequence of n-state symbols, a device implementing an addition over an alternate finite field GF(n) with n≥3, and an output that provides a second sequence of encoded symbols.

In accordance with yet a further aspect of the present invention, the apparatus is provided, wherein n>4.

In accordance with yet a further aspect of the present invention, the apparatus is provided, further comprising an implementation of at least one inverter defined by a multiplication over the alternate finite field.

In accordance with yet a further aspect of the present invention, the apparatus is provided, further comprising an n-state shift register with at least two n-state shift register elements.

In accordance with yet a further aspect of the present invention, the apparatus is provided, wherein the apparatus is a Linear Feedback System Register based encoder.

In accordance with yet a further aspect of the present invention, the apparatus is provided, wherein the second sequence is applied in symbol error correction.

In accordance with yet a further aspect of the present invention, the apparatus is provided, wherein the device is part of a Feistel-like network.

In accordance with yet a further aspect of the present invention, the apparatus is provided, wherein the apparatus is an Advanced Encryption Standard (AES) encoder.

In accordance with yet a further aspect of the present invention, the apparatus is provided, wherein the apparatus is an Elliptic Curve Coding encoder.

In accordance with yet a further aspect of the present invention, the apparatus is provided, wherein the apparatus modifies a statistical distribution of symbols in the first sequence compared to the second sequence.

In accordance with yet a further aspect of the present invention, the apparatus is provided, further comprising a corresponding apparatus to decode the second sequence into the first sequence.

In accordance with yet a further aspect of the present invention, the apparatus is provided, wherein the second sequence includes at least one check symbol.

In accordance with yet a further aspect of the present invention, the apparatus is provided, wherein n is a prime number.

In accordance with yet a further aspect of the present invention, the apparatus is provided, wherein $n=2^m$ with $m>1$.

In accordance with yet a further aspect of the present invention, the apparatus is provided, wherein the apparatus is a transposition encoder.

In accordance with yet a further aspect of the present invention, the apparatus is provided, wherein the apparatus performs a Galois arithmetical operation for encoding.

In accordance with yet a further aspect of the present invention, the apparatus is provided, wherein the apparatus is part of the group consisting of a communication system and a data storage system.

In accordance with another aspect of the present invention, an apparatus is provided for encoding a first sequence of n-state symbols, each symbol being represented by a signal, comprising an input enabled to receive the first sequence of n-state symbols, a device implementing a single truth table that is a truth table of an addition over an alternate finite field GF(n) modified by at least one n-state inverter defined by a multiplication over the alternate finite field GF(n) with n≥4, and an output that provides a second sequence of encoded symbols.

In accordance with yet another aspect of the present invention, the apparatus is provided, wherein the apparatus is one of the group consisting of scramblers, convolutional coders, Reed-Solomon coders, Hamming coder, check-symbol based error correcting coders, transposition coders, hopping rule coders, Linear Feedback Shift Register based coders, Feistel-like network based coders, Elliptic Curve Coding coders, symbol statistical distribution modifying coders, Galois arithmetic based coders, sequence generator based encoders, streaming coders, block coders and Advanced Encryption Standard (AES) coders.

In accordance with a further aspect of the present invention, a method is provided for decoding a sequence of n-state symbols with n>3, each symbol being represented by a signal, comprising providing a plurality of signals representing the sequence of n-state symbols on an input of a processor, the processor processing the plurality of signals representing the sequence of n-state symbols by an implementation of a single truth table, wherein the single truth table is a truth table of an addition over an alternate finite field or a truth table of an addition over the alternate finite field that is modified in accordance with at least one inverter defined by a multiplication over an alternate finite field, providing a plurality of signals representing a decoded sequence of symbols on an output; and wherein the sequence of n-state symbols was generated by an encoder in the group consisting of scramblers, convolutional encoders, Reed-Solomon encoders, Hamming coder, check-symbol based error correcting encoders, transposition encoders, hopping rule encoders, Linear Feedback Shift Register based encoders, streaming cipher encoders, block coders, Feistel-like network based encoders, Elliptic Curve Coding encoders, symbol statistical distribution modifying encoders, Galois arithmetic based encoders and Advanced Encryption Standard (AES) encoders.

DESCRIPTION OF A PREFERRED EMBODIMENT

Figure 1:
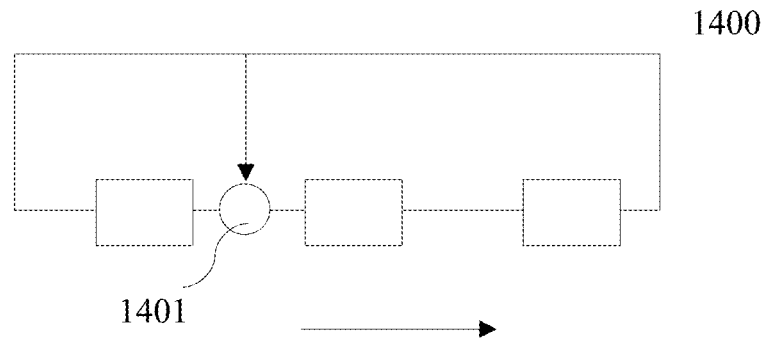
FIGS. 1-7 illustrate Linear Feedback Shift Registers (LFSRs) representing a minimal polynomial to generate p state symbols representing states of a field over $p^q$.

The term n-valued or n-state herein is used generally as non-binary wherein n>2, unless the binary case is included. Herein also the term n-state symbol is used. An n-state symbol is a symbol that has one of n states. A symbol or an n-state symbol is a single entity. A symbol herein is being generated or processed as a signal by an apparatus. A symbol such as an n-state symbol can be represented by a single n-state signals that can have one of n states; it can also be represented and processed as a plurality of signals such as binary signals.

Herein also the term check symbol is used. In binary applications one generally uses the term parity bit or symbol. Because the binary check function is the XOR function a check symbol generated by the XOR function is a 0 if there was an even number of 1s and a 1 if there was an odd number of 1s. Hence, the name parity. The name parity has no such meaning in n-valued functions. Accordingly, the name check symbols will be used.

Parity calculation in binary error correction is the process wherein a number of bits in a codeword or sequence or block have for instance an even parity or even number of 1s, including the parity bit. Assume one has an 8 bit code word [a b c d e f g h] and a parity bit p is added. For instance, a rule for determining a parity symbol could be: the number of 1s in [a b c d e f g h p] should always be even.

This can be expressed in the equation a+b+c+d+e+f+g+h+p=0. The operation '+' in this equation is the modulo-2 addition or XOR function.

It is one aspect of the present invention to create a check symbol for a codeword comprised of k n-valued symbols by using a reversible n-valued operation sc1. In n-valued logic one may use different ways or functions to create a 'parity' or check symbol. One may use reversible and non-reversible operations. For instance, a non-reversible parity n-valued operation is one wherein a 1 is added (modulo-n) to a sum when a symbol is not 0, and a 0 when a symbol is zero. The reversibility is related to determining the original value of the symbols of which a parity symbol is determined.

One method as an aspect of the present invention is to apply reversible n-valued logic operations to calculate the 'check' or parity symbol of a sequence of n-valued symbols. The advantage of a reversible operation is that an equation can be solved. For instance, two n-valued symbols x1 and x2 combined by a function sc1 will generate a symbol p1 according to the equation: x1 sc1 x2=p1.

Assume that sc1 is self reversing and commutative. In that case (as is for instance explained in U.S. patent application Ser. No. 10/912,954 filed Aug. 6, 2004 entitled: Ternary and higher multi-value digital scramblers/descramblers, which is incorporated herein in its entirety): x1=p1 sc1 x2. For calculation and notation purposes it is sometimes preferred to write the parity symbol equations with a result 0. In that case (x1 sc1 x2=0) can be written for instance as: (x1 sc1 x2 sc1 p1)=0. This is the result of (x1 sc1 x2)=(p1 sc1 0) again with sc1 assumed to be a commutative self-reversing n-valued function.

It should be clear that p1 can also be calculated in a different fashion. For instance by: (x1 sc1 x2)=(p1 sc2 0) so that ((x1 sc1 x2) sc3 p1)=0. Herein the function sc3 is the reverse of sc2. If sc2 is self-reversing then: ((x1 sc1 x2) sc2 p1)=0.

The n-valued self-reversing functions are in general not associative. This means that even though a function may be commutative, the order of variables in a multi-variable equation does matter. The expression (x1 sc1 x2 sc2 p1) should be evaluated as {(x1 sc1 x2) sc2 p1}. In words: first evaluate (x1 sc1 x2) as 'term' and then {term sc2 p1}. Assuming sc1 and sc2 being commutative one will get the same results by evaluation {p1 sc2 (x1 sc1 x2)} or {p1 sc2 (x2 sc1 x1)} or {(x2 sc1 x1) sc2 p1}.

To demonstrate the above one may apply two functions: sc1 and sc2, which are self-reversing and commutative. For instance, one can use two 4-valued switching functions sc1 and sc2 of which the truth tables are provided below.

| sc1 | 0 | 1 | 2 | 3 |
|---|---|---|---|---|
| 0 | 3 | 2 | 1 | 0 |
| 1 | 2 | 1 | 0 | 3 |
| 2 | 1 | 0 | 3 | 2 |
| 3 | 0 | 3 | 2 | 1 |

| sc2 | 0 | 1 | 2 | 3 |
|---|---|---|---|---|
| 0 | 1 | 0 | 3 | 2 |
| 1 | 0 | 3 | 2 | 1 |
| 2 | 3 | 2 | 1 | 0 |
| 3 | 2 | 1 | 0 | 3 |

Assume x1=1 and x2=2. Then (x1 sc1 x2)=0 according to the truth table of sc1. If one wants (x1 sc1 x2)=(p1 sc1 0) then p1=3. Or (x1 sc1 x2 sc1 p1)=0. For instance (x1 sc1 p1) in this case is (1 sc1 3)=3. And (x2 sc1 3)=(2 sc1 3)=2 which is different from 0. So the expression is not associative. However the expression is reversible when one observes the order of the variables.

For illustrative purposes the associative 4-valued function sc3 is also provided in the following truth table.

| Sc3 | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

It is easy to check that (x1 sc3 x2 sc3 p1)=0 will apply if (x1 sc3 x2)=p1. Alternate Extension Fields Binary extension fields or Galois Fields represented as $GF(n=2^p)$ with $p \geq 2$ are applied in generating n-state check symbols from 2 or more n-state symbols. An n-state or n-valued symbol is a symbol which assumes one of n possible states. One may also use the term n-valued. An n-state or n-valued symbol for processing in an apparatus or a device is represented by a signal. Such a signal may be a single signal, which has one of n states. For instance, a 4-state symbol has one of 4 states or values. A 4-state symbol may have the values or states 0, 1, 2 and 3. Each state is represented by a single n-valued signal. For instance the value or state of a signal may be determined by a voltage. It should be clear that it is not required that the states 0, 1, 2 and 3 are represented by 0, 1, 2 and 3 Volt respectively. The 4 different states may be represented by for instance 0.5 V, 1 V, 1.25 V and 1.75 V. Or a state in an n-state signal may be represented by an optical signal of a particular wavelength which in certain cases are considered independent instances of a physical phenomenon. Linear combinations of these independent instances will just mix the states but will not create a signal of a different state. Circuitry or apparatus that processes these type of n-state signals are in general non-linear.

Furthermore, an n-state symbol may be represented by 2 or more signals. For instance, each possible state of a 4-state symbol may be represented by 2 binary signals. To emphasize that a value in an n-valued symbol is a distinguishing property and not a true value the term n-state symbol is preferred.

Extension fields $GF(q^p)$ with $q \geq 2$ and $p \geq 2$ as applied in for instance error correction are in general binary extension field. These extension fields are defined by a finite (n) number of field elements, by a first operation usually called an addition, its reverse being a subtraction, by a function called a multiplication and its reverse called a division all over GF(n). The addition over $GF(n=2^p)$ is self reversing, which means that addition and subtraction over GF(n) have the same truth table. Furthermore, the addition is commutative (which means that a+b=b+a over GF(n)) and the addition is associative (which means that (a+b)+c=a+(b+c)=(a+c)+b etc. over GF(n)). The field also has an operation multiply, which is also commutative and associative. And the addition and multiplication are distributive (which means that c*(a+b)=c*a+c*b.) Furthermore there is a neutral element e or a zero element in the field so that an addition a+e=a, wherein a and e both belong to the field. There is a neutral element i (or identity or the one element) so that a*1=a wherein a and i both belong to the field. Furthermore each multiplication a has an inverse $a^{-1}$ that is also part of the field (except the zero element perhaps). Addition 'scn' and multiplication 'mn' can be represented as + and *. One should keep in mind that these operations are defined by a truth table and in many cases are different from the standard addition and multiplication.

In general, elements of an extension field $GF(q^p)$ are generated by a primitive polynomial in q of order p or by a p-state LFSR expressing such a polynomial. Such polynomials are provided for the binary extension fields in, for instance, the earlier mentioned book of Lin and Costello in appendix A. However, there is more than one minimal polynomial for larger values of n. While there is only one minimal polynomial for GF(4), there are 2 minimal polynomials for GF(8) and 4 for GF(16).

For instance, the adder sc81 over GF(8) of paragraph [0113] is created from elements in GF(8) generated by the binary LFSR 1400 of FIG. 1 with binary logic function 1401 being XOR. Assume that the initial state of the LFSR is [1 0 0]. The consecutively generated states are then:

| | | | GF state |
|---|---|---|---|
| 0 | 0 | 0 | 0 |
| 1 | 0 | 0 | 1 |
| 0 | 1 | 0 | 2 |
| 0 | 0 | 1 | 3 |
| 1 | 1 | 0 | 4 |
| 0 | 1 | 1 | 5 |
| 1 | 1 | 1 | 6 |
| 1 | 0 | 1 | 7 |
| 1 | 0 | 0 | 1 |

The state [0 0 0] is the forbidden or degenerative state of the LFSR and represents GF(8) state 0. By modulo-2 addition of the individual binary elements of a GF(8) state one gets the GF(8) addition result. For instance [1 0 0] XOR [0 1 0]→[1 1 0] which is GF(8) state 4 in accordance with the state diagram. One may run the LFSR with starting state [0 1 0] as initial state (which may be called element 1 in GF(8)). Every element in GF(8) except 0 moves up one place and [0 1 0] is GF(8) 1 and [0 0 1] is GF(8) 2. Then [0 1 0] is GF(8) 4. [0 1

0] XOR [0 0 1]→[0 1 1] which is the new representation of GF(8). So changing the initial state of the LFSR does not change the addition or the related multiplication.

Figure 2:
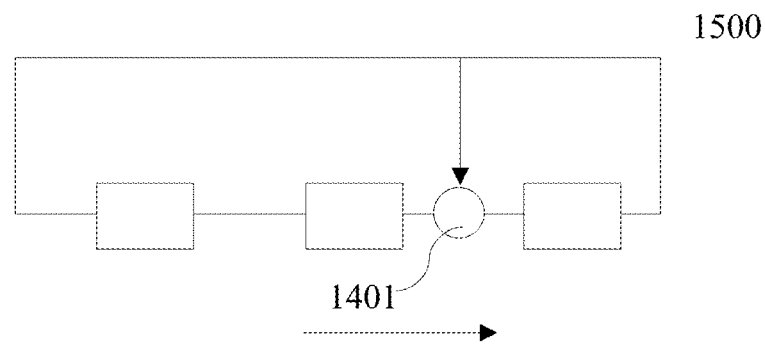
Figure 3:
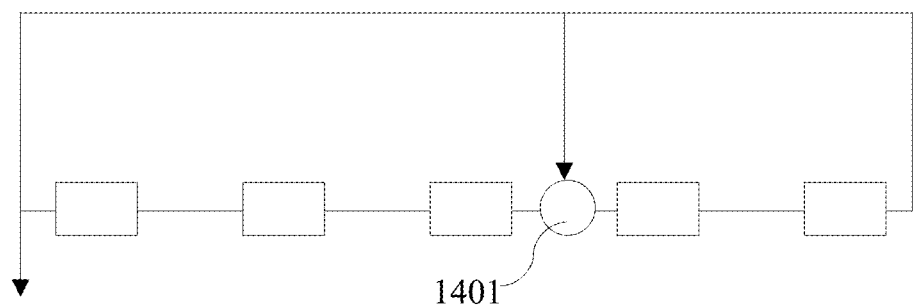
Figure 4:
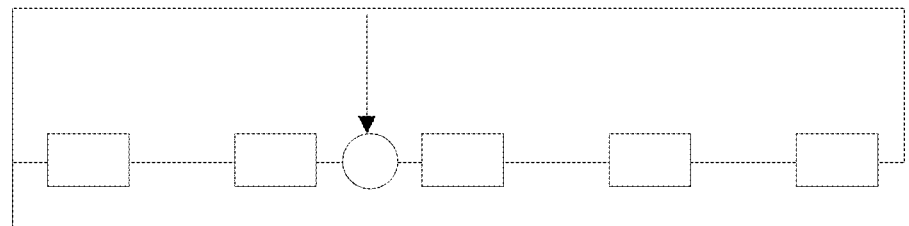
Figure 5:
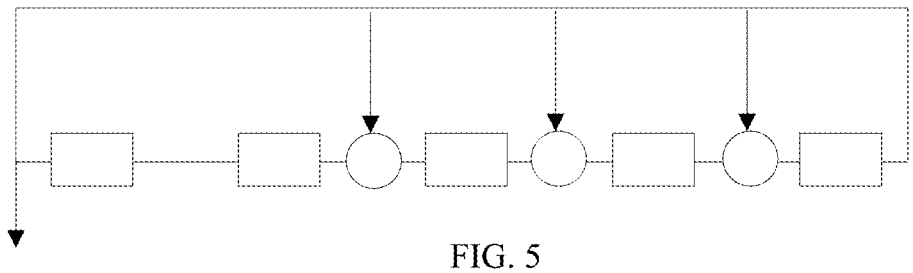
Figure 6:
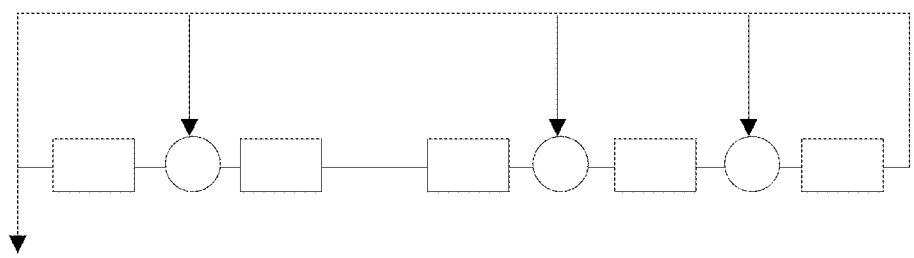
Figure 7:
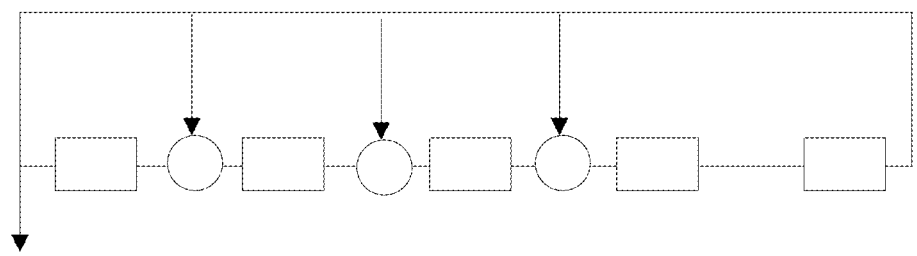

Another minimal polynomial to generate elements of GF(8) is implemented by the LFSR 1500 of FIG. 2. Starting with initial state [1 0 0] this LFSR generates the following states:

| | | | GF state |
|---|---|---|---|
| 0 | 0 | 0 | 0 |
| 1 | 0 | 0 | 1 |
| 0 | 1 | 0 | 2 |
| 0 | 0 | 1 | 3 |
| 1 | 0 | 1 | 4 |
| 1 | 1 | 1 | 5 |
| 1 | 1 | 0 | 6 |
| 0 | 1 | 1 | 7 |
| 1 | 0 | 0 | 1 |

Herein the XOR addition of GF(8) states 1 and 2 is [1 0 0] XOR [0 1 0]→[1 1 0] which is GF(8) state 6. Accordingly, a different addition over GF(8) is created. The truth table for this addition over GF(8) is provided by the following truth table:

| sc82 | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 0 | 6 | 4 | 3 | 7 | 2 | 5 |
| 2 | 2 | 6 | 0 | 7 | 5 | 4 | 1 | 3 |
| 3 | 3 | 4 | 7 | 0 | 1 | 6 | 5 | 2 |
| 4 | 4 | 3 | 5 | 1 | 0 | 2 | 7 | 6 |
| 5 | 5 | 7 | 4 | 6 | 2 | 0 | 3 | 1 |
| 6 | 6 | 2 | 1 | 5 | 7 | 3 | 0 | 4 |
| 7 | 7 | 5 | 3 | 2 | 6 | 1 | 4 | 0 |

This function is also self reversing and associative and is distributive with the multiplication of paragraph [0113]. Let's call the addition of paragraph [0113] sc81 and the just created addition sc82. One can create a symbol $c1=a1*x1\ sc81\ b1*x2$ by using function sc81 and a different symbol $c2=a1*x2\ sc82\ b1*x2$. For instance, create the symbols c1 and c2 from x1=2 and x2=6 with a1=3 and b1=5. The two expressions then generate:

$c1=3*2\ sc81\ 5*6$ and $c2=3*2\ sc82\ 5*6.$

Remember that in both expressions the same multiplication m81 of paragraph is used. This will generate:

$c1=4\ sc81\ 3=6$ and $c2=4\ sc82\ 3=1.$

Assume that in a coder one has to determine x2 from c1 or c2 and x1.

Using c1: $c1=3*x1\ sc81\ b1*x2$ which leads to $x2=b1^{-1}*(c1\ sc81\ 3*x1)$ wherein $b1^{-1}$ is the reverse of b1. (the reverse of multiplier 5 is $5^{-1}$ or multiplier 4 as one can derive from the multiplication table.) This leads to $x2=4*(6\ sc81\ 3*2)=4*(6\ sc81\ 4)=6$. If one would have used the wrong function sc82 one would have as result $x2=4*(6\ sc82\ 3*2)=4*(6\ sc82\ 4)=4*7=3$.

Using c2: $c2=3*x1\ sc82\ b1*x2$ which leads to $x2=b1^{-1}*(c2\ sc82\ 3*x1)$ wherein $b1^{-1}$ is the reverse of b1. (the reverse of multiplier 5 is $5^{-1}$ or multiplier 4 as one can derive from the multiplication table.) This leads to $x2=4*(1\ sc82\ 3*2)=4*(1\ sc82\ 4)=4*3=6$. If one would have used the wrong function sc81 one would have as result $x2=4*(1\ sc81\ 3*2)=4*(1\ sc81\ 4)=4*2=5$.

Accordingly, using different adder functions wherein the functions are distributive with the same multiplier. Because there is a limited number of these functions, one may try a limited number of functions to apply the correct one. To further confuse an unauthorized decoder one may create an expression using more than 2 variables and at least 2 different functions. For instance, $c=a1\ sc81\ a2\ sc82\ a3$. Herein, the order of execution will become an issue. However, solving equations also may become more involved.

One easy generation of an adder over GF(n) such as GF(8) is using consecutive binary representation and adding the elements as before by XORing all bits. This generates the following states over aGF(8) as an example wherein aGF(8) stands for alternate Galois Field.

| | | | aGF state |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |
| 0 | 0 | 0 | 0 |

This will create the following adder sc83 over aGF(8) (by XORing the bits of an element in aGF(8)).

| sc83 | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 0 | 3 | 2 | 5 | 4 | 7 | 6 |
| 2 | 2 | 3 | 0 | 1 | 6 | 7 | 4 | 5 |
| 3 | 3 | 2 | 1 | 0 | 7 | 6 | 5 | 4 |
| 4 | 4 | 5 | 6 | 7 | 0 | 1 | 2 | 3 |
| 5 | 5 | 4 | 7 | 6 | 1 | 0 | 3 | 2 |
| 6 | 6 | 7 | 4 | 5 | 2 | 3 | 0 | 1 |
| 7 | 7 | 6 | 5 | 4 | 3 | 2 | 1 | 0 |

One can apply the multiplication m81 of paragraph [0113] to the function sc83 for checking if the functions are distributive. This means checking if $x1\ m81\ (x2\ sc83\ x3)=(x1\ m81\ x2)\ sc83\ (x1\ m81\ x3)$. The functions sc83 is not distributive for m81. However, it turns out sc83 is distributive for a multiplication function m82 which is defined by the following truth table.

| x/m82 | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 1 | 2 | 3 | 4 | 5 | 6 | 7 |
| 2 | 0 | 2 | 4 | 6 | 5 | 7 | 1 | 3 |
| 3 | 0 | 3 | 6 | 5 | 1 | 2 | 7 | 4 |
| 4 | 0 | 4 | 5 | 1 | 7 | 3 | 2 | 6 |
| 5 | 0 | 5 | 7 | 2 | 3 | 6 | 4 | 1 |
| 6 | 0 | 6 | 1 | 7 | 2 | 4 | 3 | 5 |
| 7 | 0 | 7 | 3 | 4 | 6 | 1 | 5 | 2 |

Checking if $x1\ m82\ (x2\ sc83\ x3)=(x1\ m82\ x2)\ sc83\ (x1\ m82\ x3)$ for all possible states of x1, x2 and x3 demonstrates that the combination of sc83 and m82 is distributive.

There are actually several other distributive combinations of self reversing additions over aGF(n) which cannot be generated by an LFSR with multipliers which are not the multiplier m81.

Different classes of adders over GF(n) with n>1 and GF($p^q$) with p>1 and q>1 wherein n, p and q are integers.

In general a field like GF(4) or GF(8) or GF($2^q$) cannot be generated from modulo-4 or modulo-8 addition and modulo-4 or modulo-8 multiplication. In order to generate a finite field GF(8) one defines GF(8) as an extension field, such as GF(n=$2^3$) by using the earlier shown LFSR methods. However, especially for n>2 there are more reversing and even self-reversing two-input n-state functions than those defined by the classical LFSR methods. First of all, for values greater than 4, there are several different primitive or minimal polynomials of degree q in n=$p^q$ of which each will define an addition over GF($p^q$) as was shown in the case of GF(8). Each of these additions based on a primitive or minimal polynomial has the same multiplier over GF($p^q$) over which the operation c*(a+b) is distributive. Each of the multipliers has an inverse in the field.

FIGS. 3-7 are diagrams of LFSRs with a 5-stage shift register that generate a field over GF(32=$2^5$). A circle in these figures, even if not provided with a numeral indicates the same as 1401, which is a XOR function. Each field thus generated has a different 32-state addition function which is associative. Each field thus generated has the same multiplier function, which combined with the appropriate addition over GF(32) is distributive. Each individual constant multiplier herein has an inverse (or a divisor) which is also an element of the field. As n=$2^q$ becomes larger for larger values of q the number of fields or extension fields over GF(n=$2^q$) becomes larger.

The field generated by XORing, for instance for binary words of 5-bits, over all 32 binary words ranging from [0 0 0 0 0] to [1 1 1 1 1] will create a proper 32-state addition function that is associative. However, as was already shown in the 8-state case, this 32-state addition and the 'standard' GF($2^5$) combination are not distributive. In accordance with an aspect of the present invention different adders and reversible multipliers over GF(n) and especially over GF($2^q$) will be provided that constitute a field which allows these to be applied in n-state coders, n-state decoders, n-state sequence generators, n-state LFSRs and n-state polynomial and arithmetical circuits. Any n-state switching function herein be it an n-state function with at least two inputs and an output or an n-state inverter can be implemented in a switching device. The switching device can be a true n-state switching device wherein an n-state symbol having one of n-states is represented by an n-state signal. In the alternative, an n-state switching function, be it an n-state function with at least two inputs and an output or an n-state inverter, can be implemented in a memory device, wherein the corresponding truth table of an n-state function is implemented in a memory. A memory can be a true n-state memory. It can also be a binary memory, wherein an n-state symbol is represented as a binary word, and inputted, stored and outputted as a binary word of binary signals. An analog/digital (A/D) and digital/analog (D/A) converter can be used to generate a true n-state signal from a binary word.

The extension field GF(4) which is a traditional field is defined by the following addition and multiplication over GF(4) sc4 and m4 respectively of which the truth tables are provided in the following tables.

| sc4 | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

| m4 | 0 | 1 | 2 | 3 |
|---|---|---|---|---|
| 0 | 0 | 0 | 0 | 0 |
| 1 | 0 | 1 | 2 | 3 |
| 2 | 0 | 2 | 3 | 1 |
| 3 | 0 | 3 | 1 | 2 |

In this case a 4-state symbol can be represented by a 2-bit word. By adding (with XOR) the corresponding bits of two two-bits word one will get the above addition. The functions are associative and distributive. The addition is also commutative and self-reversing. The multiplication is reversible with elements of the field. It is again noted that a multiplication with a constant (or element) of the field is applying an n-state inverter with an input and an output of which the function is defined by a column or a row in the truth table of m4.

A first alternate or not traditional addition over alternate field GF(4) is provided in the following truth table.

| sc4 | 0 | 1 | 2 | 3 |
|---|---|---|---|---|
| 0 | 3 | 2 | 1 | 0 |
| 1 | 2 | 3 | 0 | 1 |
| 2 | 1 | 0 | 3 | 2 |
| 3 | 0 | 1 | 2 | 3 |

This addition is self reversing, it has a 'zero' element (symbol 3) and it is commutative and associative. There is a corresponding multiplier which combined with the above adder will be distributive, which means [a m4 (b sc4 c)=(a m4 b) sc4 (a m4 c)]. The truth table of this multiplier is provided in the following table.

| m4 | 0 | 1 | 2 | 3 |
|---|---|---|---|---|
| 0 | 0 | 1 | 2 | 3 |
| 1 | 1 | 2 | 0 | 3 |
| 2 | 2 | 0 | 1 | 3 |
| 3 | 3 | 3 | 3 | 3 |

The 'zero' element is again 3 (any multiplication with 3 results in 3) and the '1' element (multiplying a symbol 'a' with this element will again create 'a') is '0'. Furthermore, a division is defined within this field as each factor of multiplication 'b' has a reverse '$b^{-1}$' which is also an element of the field. (element 0 has 0 as inverse; element 1 has element 2 as inverse; and element 2 has element 1 as inverse. Furthermore, element 3 is the 'zero' element).

A multiplier over GF(4) in this case is actually a 4-state inversion. The inversion is indicated by [0 1 2 3]→[a b c d]. This means that the elements in the vector [0 1 2 3] are transformed into the elements of vector [a b c d] in their corresponding positions or: 0→a; 1→b; 2→c; and 3→d, wherein a, b, c and d are elements of GF(4). The multipliers 0, 1, and 2 are defined by the 4-state inversion [0 1 2 3]→[0 1 2 3] for multiplier 0; [0 1 2 3]→[1 2 0 3] for multiplier 1; and [0 1 2 3]→[2 0 1 3] for multiplier 2. One can easy check that each multiplier has an inverse: $0^{-1}=0$; $1^{-1}=2$; and $2^{-1}=1$. One proof is to multiply for instance 1*2=0 or invert [1 2 0 3] with [2 0 1 3] which will generate [0 1 2 3].

Figure 8:
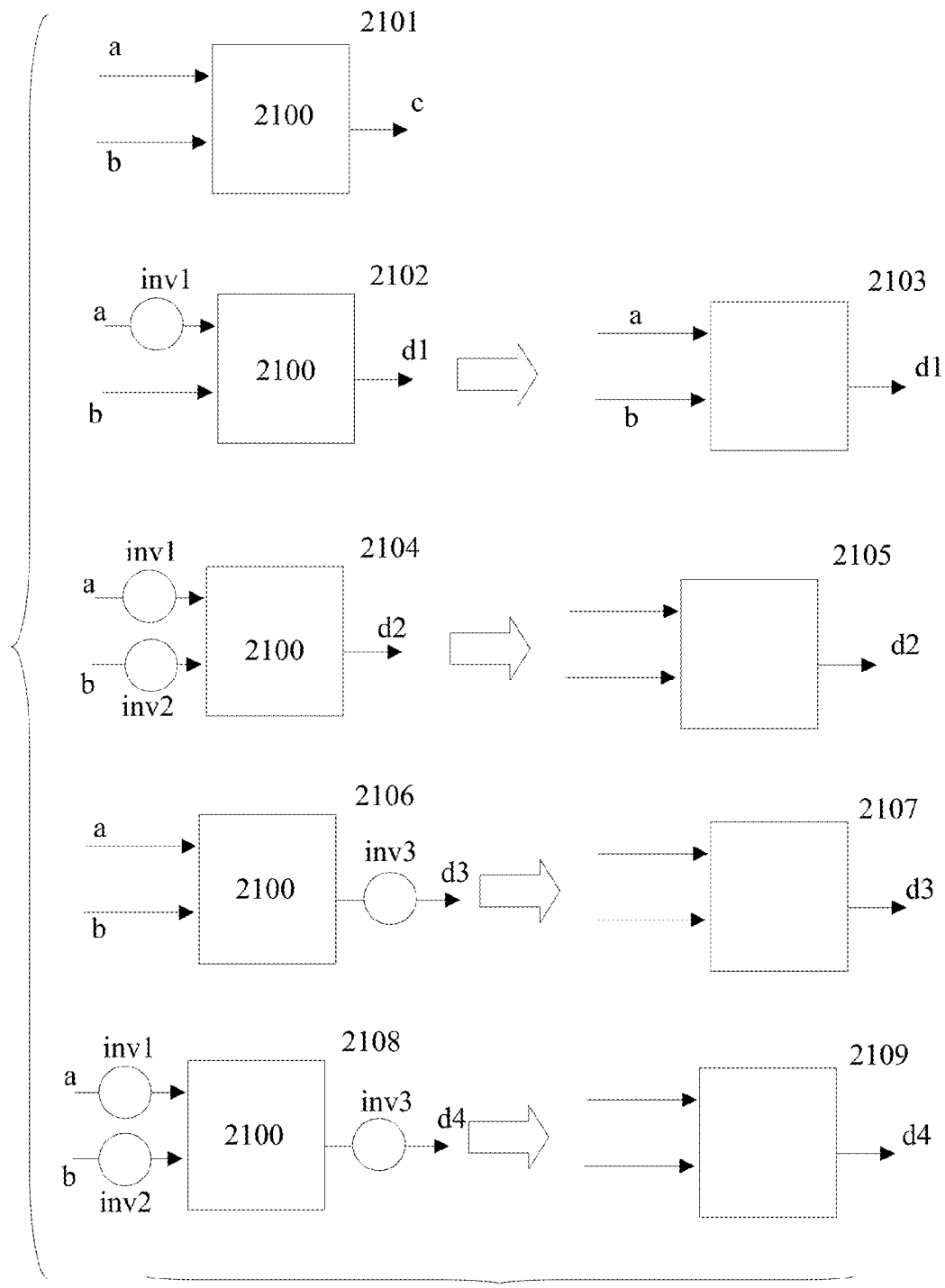
FIG. 8 illustrates reduction of an n-state truth table over at least one n-state inverter in accordance with an aspect of the present invention.

At least one implementation of sc4 and m4 is shown in FIG. 8. FIG. 8 shows a device 2101 which implements the function sc4 in 2100, which may be a memory or a switching circuit with inputs a and b and an output c which represents a 4-state symbol c. The output symbol on c which is represented by a signal is determined by the truth table of sc4 and the input symbols on a and b which are also are represented by signals. The relationship between a, b and c can be expressed by (c=a sc4 b) wherein sc4 is represents the above truth table.

In device 2102 input 'a' to a device 2100 which implements sc4 is provided with an inverter (or multiplier) inv1, which may be a multiplier which is defined by a row or column in m4. Assume that inv1 is a multiplier. The resulting symbol on d1 is then determined by {d1=(inv1(a) sc4 b)}. Assume that inv1 is the inverter representing multiplier 2. One can then write the relationship between a, b and d1 as d1=(2 m4 a) sc4 b. It is more common to name m4 as * and sc4 as +. This will create the expression d1=2*a+b, keeping in mind that * and + have a special meaning.

Assume that the top input 'a' to a device 2100 determines the rows of the truth table. The truth table of 2100 (sc4) with a multiplier [2 0 1 3] at the top input can be reduced to the single truth table sc41 as provided in the following table.

| sc41 | 0 | 1 | 2 | 3 |
|---|---|---|---|---|
| 0 | 1 | 0 | 3 | 2 |
| 1 | 3 | 2 | 1 | 0 |
| 2 | 2 | 3 | 0 | 1 |
| 3 | 0 | 1 | 2 | 3 |

The circuit of 2102 can thus be replaced by equivalent circuit 2103 which implements a single truth table defined by sc41 and by an expression d1=a sc41 b. It is noted that sc41 is non-commutative.

A similar approach can be taken with circuit 2104 which has an inverter inv1 in input a and an inverter inv2 in input b and output d2 is defined by d2=inv1(a) sc4 inv2(b). Assume that inv1 is multiplier 2 and inv2 is multiplier 1. We can then replace the combination of 2100 with the two inverters inv1 and inv2 with the equivalent circuit 2105 with no inverters on the inputs, wherein 2105 implements the single truth table of sc42 which is provided in the following table.

| sc42 | 0 | 1 | 2 | 3 |
|---|---|---|---|---|
| 0 | 0 | 3 | 1 | 2 |
| 1 | 2 | 1 | 3 | 0 |
| 2 | 3 | 0 | 2 | 1 |
| 3 | 1 | 2 | 0 | 3 |

The input b of 2100 is determined by the columns of a truth table. Accordingly, one has to modify the rows of sc4 in accordance with inv1 and the columns of that transformation in accordance with inv2 to arrive at sc42. One can also say that sc4 is modified in accordance with inv1 and inv2. In circuit 2105 the output d2 can be expressed as d2=a sc42 b, noting that if inv1 and inv2 are not identical then sc42 is non-commutative.

Circuit 2106 has an inverter inv3 at the output. This means that d3=inv3 (a sc4 b), which is a commutative function if sc4 is commutative. The circuit 2106 can be replaced by the circuit 2107 with no inverter at the output and that implements sc43 wherein d3=a sc43 b.

The same approach is applied to reduce 2108 to 2109. One can also say that d4=inv3 (inv1(a) sc4 inv2(b)) is reduced to d3=a sc44 b, wherein sc44 is created by modifying sc4 in accordance with inv1, inv2 and inv3.

The reduction examples have been shown for 4-state fields. These reductions of at least 2 input/1 output truth tables by their applied inverters apply to an n-state truth table with n>2 of a function in a field.

Figure 9:
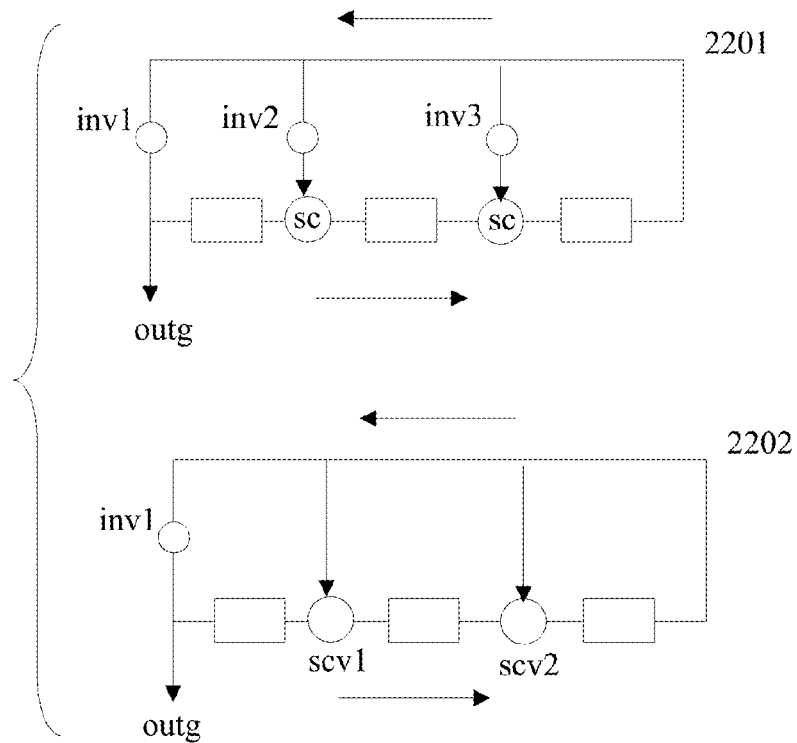
FIGS. 9-10 illustrate a sequence generator in accordance with an aspect of the present invention.

In a further embodiment of the present invention, a sequence generator for generating a sequence of n-state symbols, using implementations of the addition and multiplier or the inverter reduced form thereof is provided. In yet a further embodiment, the sequence generator generates an n-state pseudo-noise or maximum length sequence of n-state symbols. An n-state sequence generator can be implemented by an n-state Linear Feedback Shift Register (LFSR), either in Galois or Fibonacci configuration. An n-state LFSR based sequence generator in Galois configuration is shown in FIGS. 9 as 2201 and 2202. The LFSR has a shift register of 3 storage elements, each element able to store and provide an n-state symbol. As common in a Galois LFSR, at least one 2-input n-state function sc is implemented between two storage element. In the illustrative example the LFSR 2201 has 3 storage elements, two functions sc (though one may apply two different functions) and three inverters inv1, inv2 and inv3. The maximum length sequence that can be generated with this n-state generator is a sequence of $n^3-1$ n-state symbols. In an illustrative 4-state case the function sc is the above defined 4-state adder sc4 over alternate or non-traditional field GF(4). The inverters inv1, inv2 and inv3 are the 4-state inverters defined by the rows or columns of the truth table of m4 over alternate field GF(4). It should be noted that a generator may also have other functions than sc4 and inverters defined by m4 over alternate field GF(4) or have a function sc4 defined over alternate field GF(4) and n-state inverters that are not defined by m4.

The sequence generator provides a sequence 'outg' on an output. In one embodiment of the present invention one has to determine the actual inverters inv1, inv2 and inv3 to generate an n-state m-sequence. In the example a 4-state inverter will be selected from m4 and being [0 1 2 3] which is the identity, [1 2 0 3] and [2 0 1 3]. The inverter [3 3 3 3] is effectively a 0 inverter or open connection. (Keep in mind that '0' herein is merely one of n n-state symbols. What '0' does is determined by a truth table, not by the common interpretation that 0 is nothing and does nothing. The truth tables of sc4 and m4 show that the '0' role is assumed by '3').

A relatively simple method to determine if a sequence is a m-sequence has been developed by the inventor of the present invention for instance in U.S. Pat. No. 7,580,472 to Lablans issued on Aug. 25, 2009 and in U.S. Pat. No. 7,725,779 to Lablans issued on May 25, 2010, which are both incorporated herein by reference. An auto-correlation graph of an n-state sequence can determine if a sequence is an m-sequence or a pseudo-noise sequence. However, the standard method of calculating an n-state auto-correlation graph will show side-peaks. Some sequences, which are not m-sequences, also have side-peaks. This sometimes makes it difficult to determine if an n-state sequence is pseudo-noise. The novel method determines a correlation value by adding a constant value to a sum if corresponding symbols in two sequences are identical and subtracting a constant or nothing when the two symbols are different. This will create a single peak correlation graph for any n-state m-sequence.

By applying this correlation method to the generator 2201 of FIG. 9 one finds that inv1=[2 0 1 3] and in2 and inv3 are both [1 2 0 3]. The function sc is sc4 in the alternate field GF(4). The generator can generate a 4-state m-sequence on 'outg' of length 63 4-state symbols. Assume that the initial state of the LFSR is [3 2 1], then the first 10 generated 4-state symbols on 'outg' are [1 3 1 2 0 2 3 3 1 1].

The two functions sc in 2201 have inv2 and inv3 respectively at an input. These functions can be reduced to scv1 and scv2 respectively by modifying the first function sc in accordance with inv2 and the second sc in accordance with inv3 in accordance with the method as was described earlier herein. Because sc is commutative, the functions scv1 and scv2 will be non-commutative.

Figure 10:
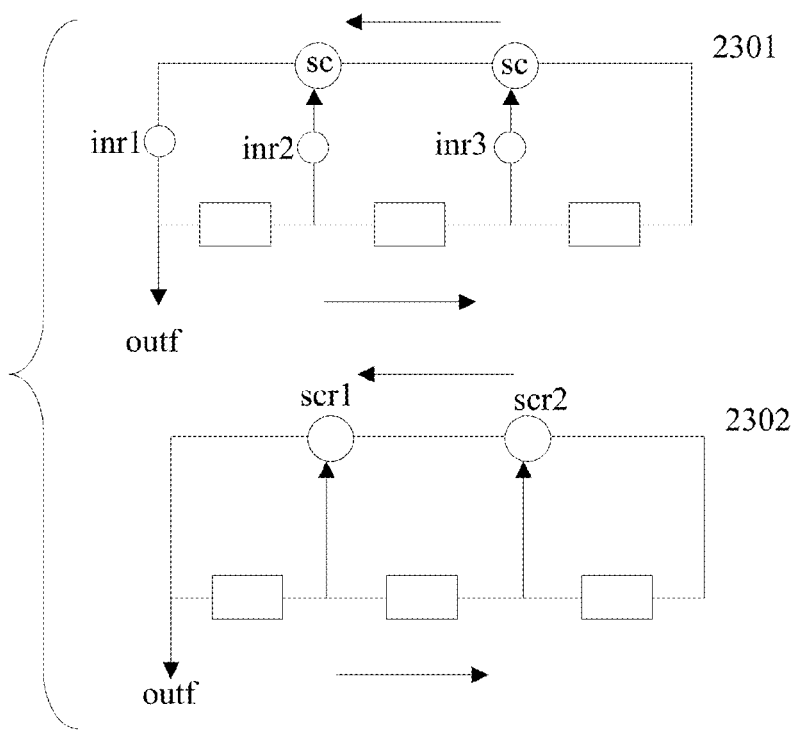

FIG. 10 illustrates a 3 stage n-state sequence generator 2301 in Fibonacci configuration. It has the n-state inverters inr1, inr2 and inr3, which are inr1=[1 2 0 3]; inr2=[1 2 0 3] and inr3=[2 0 1 3]. Assume that the initial state of the LFSR of 2301 is [3 2 1], then the first 10 generated 4-state symbols on 'outf' are [2 2 2 1 0 0 1 0 1 3].

The two functions sc in 2301 have inr2 and inr3 respectively at an input. The first function sc also has inr1 at an output. These functions sc can be reduced to scr1 and scr2 respectively by modifying the first sc in accordance with inr1 and inr2 and the second sc in accordance with inr3 as is shown in 2302 and according to the method as was described earlier. Because sc is commutative, the functions scr1 and scr2 will be non-commutative.

It is noted that there are other ways to generate an m-sequence equivalent to the m-sequence generated by an LFSR based sequence generator. All states of an LFSR are deterministic. If an initial state of the 4-state LFSR 2301 of FIG. 10 is [a b c] then all following states of the LFSR and the generated sequence are determined by n-state (in this case 4-state) expressions. Assuming function sc4 and inverters inr1, inr2 and inr3 over the alternate field GF(4) one can provide the expression: outf=inr1{inr2($a$) sc4 inr3($b$) sc4 c}. In the Fibonacci configuration, the content of the first shift register element is identical to the previous output symbol. Assume that at moment k the output symbol is $s_k$. This means that at moment k the content of the shift register is [$s_{k-1}$ $s_{k-2}$ $s_{k-3}$]. The expression that determines an output symbol can thus be written as: $s_k$=inr1{inr2($s_{k-1}$) sc4 inr3($s_{k-2}$) sc4 $s_{k-3}$} as a recursive expression. One can also express all generated symbols as a function of {a, b, c}. This approach applies to all n-state Fibonacci and Galois configuration LFSR based sequence generators as one can easily check.

A sequence generator as provided in FIGS. 9 and 10 can be combined by a circuit as provided in FIG. 8 wherein in the combination at least one function over an alternate field GF(n) such as GF(4) is used to generate an n-state combined sequence such as an n-state Gold sequence as is disclosed in U.S. Pat. No. 7,580,472 to Lablans issued on Aug. 25, 2009 which is incorporated herein by reference.

Figure 11:
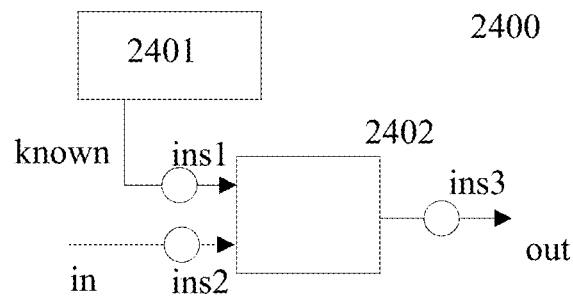
FIG. 11 illustrates a coder in accordance with an aspect of the present invention.

In one embodiment of the present invention a sequence generator applying functions over an alternate field GF(n) such as alternate field GF(4), be it a Gold sequence generator or an m-sequence generator or any other sequence generator, is applied to generate a 'known' sequence to be applied in a scrambler in one of the configurations as shown in FIG. 8. Such a scrambler 2400 is illustrated in FIG. 11. It has a sequence generator 2401 to generate a known sequence which is provided on an input to a scrambling device 2402 such as provided in FIG. 8 and explained above. The input of the 'known' sequence to device 2402 has an inverter ins1, which may be an identity. This inverter is preferably an inverter defined by a multiplication over an alternate field GF(n). However, the inverter ins1 may also be any reversible n-state inverter if 2402 implements an addition over an alternate field GF(n). A to be scrambled n-state sequence 'in' is provided on a second input of 2402 with n-state inverter ins2, which may be an identity inverter. The device 2402 scrambles 'in' against 'known' and generates on an output the scrambled n-state sequence 'out'. The output has an n-state inverter ins3 which may be an identity inverter.

It should be clear that the scrambler or coder of FIG. 11 has a corresponding descrambler by applying the corresponding descramblers as explained related to FIG. 8. It is to be understood that for clarity inverters ins1, ins2 and ins3 are used to explain the working of the scrambler. However, the n-state function implemented in 2402 may be reduced in accordance with ins1, ins2, ins3 so that 2402 implements a single reduced truth table without having inverters at inputs or output. A further requirement for correct descrambling with a descrambler is that the sequence generator of a descrambler is synchronized with a sequence generator used by the corresponding scrambler.

LFSR based encoders such as LFSR based scramblers are known as streaming ciphers or streaming encoding as they work continuously generating a coded symbol after an input symbol has been entered.

Yet another coder provided in accordance with an aspect of the present invention is a reversible transposition coder wherein symbols in a sequence of symbols are transposed in accordance in part at least with an n-state pseudo-noise or maximum-length sequence generated by using at least an n-state addition and one n-state inverter that are defined over an alternate finite field GF(n) as provided herein. Yet another coder is a coder with a hopping rule based on an n-state pseudo-noise or maximum-length sequence generated by using at least an n-state addition and one n-state inverter that are defined over an alternate finite field GF(n) as provided herein. How to create these transposition encoders and hopping rules and their corresponding decoders is disclosed in U.S. patent application Ser. No. 11/534,777 to Lablans filed on Sep. 25, 2006 which is incorporated herein by reference. This type of encoder can also be applied for hopping type of communication system, wherein a transposition rule determines a hopping rule.

Figure 12:
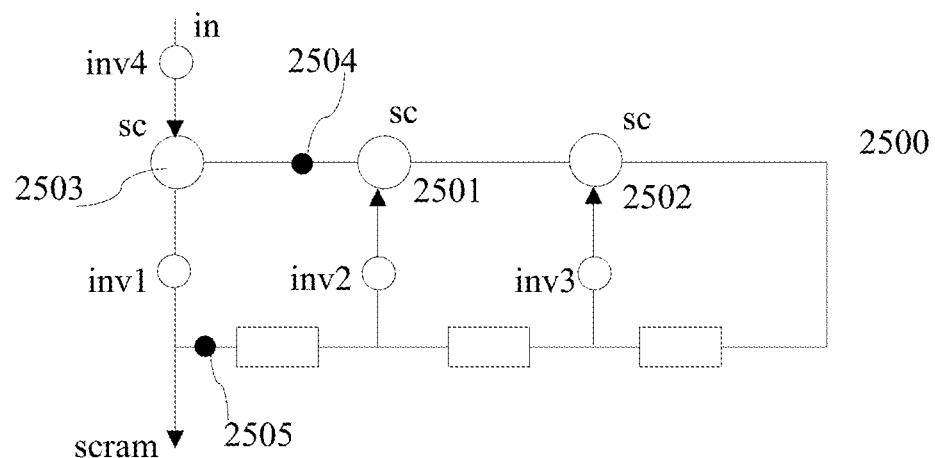
FIG. 12 illustrates a coder in accordance with an aspect of the present invention.

Another coder provided in accordance with an aspect of the present invention is an n-state LFSR based scrambler and a corresponding self synchronizing descrambler in Fibonacci configuration using at least an addition function over an alternate field GF(n) and preferably with an addition and an inverter defined by a multiplication over the alternate field GF(n). An illustration of such a scrambler 2500 is shown in FIG. 12. The illustrative scrambler has a 3 stage n-state shift register, each register element enabled to store and provide an n-state symbol. It is to be understood that an LFSR can have more shift register elements than 3, and also less than 3. The scrambler 2500 has feedback taps to implementations 2501 and 2502. The LFSR 2500 has an output 2504 and an input 2505. The output 2504 is connected to an input of an implementation 2503 of an n-state scrambling function indicated as being 'sc'. Another input of 2503 receives a sequence of n-state symbols 'in' which may be inverted by an inverter 'inv4'. The output of 2503 is connected to an input 2505 of the LFSR, which may include an inverter 'inv1'. The output of 2503 or (if present) the output of 'inv1', will generate the sequence of scrambled n-state symbols 'scram' resulting from 'in'. It should be clear that an input sequence of k n-state symbols will result in k scrambled output n-state symbols.

The scrambler may include additional inverters, for instance 'inv2' and 'inv3'. The implementations 2501, 2502 and 2503 all are indicated as implementing a function 'sc'.

In accordance with an aspect of the present invention, at least one implemented truth table to realize an n-state LFSR based scrambler is an n-state truth table of an addition over an alternate field GF(n). Preferably, such a scrambler also implements at least one n-state inverter being defined by the multiplication over the alternate field GF(n). This means that FIG. 12 in accordance with an aspect of the present invention implements one function 'sc' being the addition over the alternate field GF(n) and that 2 of the functions now designated as 'sc' may be any n-state reversible, or even non-reversible, n-state function.

Figure 13:
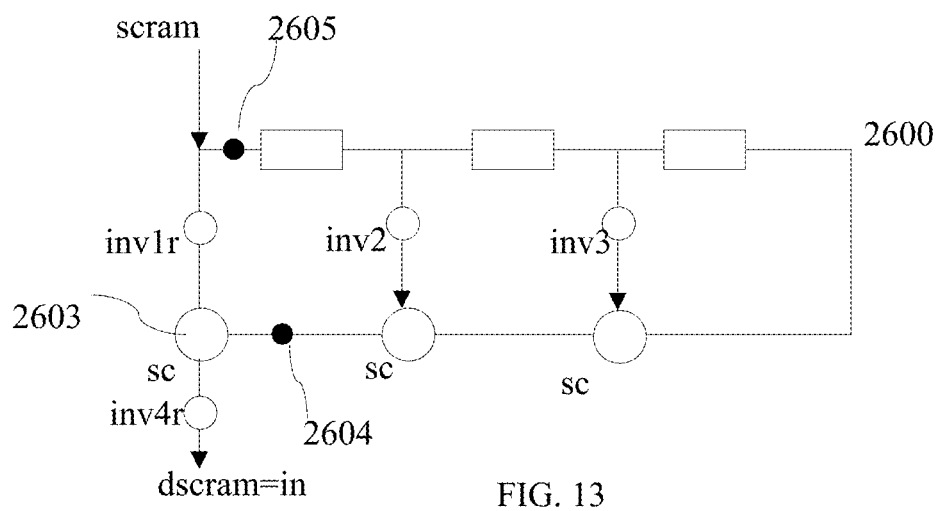
FIG. 13 illustrates a decoder in accordance with an aspect of the present invention.

The self-reversing descrambler 2600 corresponding to the scrambler of FIG. 12 is shown in FIG. 13. The descrambler 2600 has the same structure as the scrambler. However, the scrambled sequence 'scram' is provided on the input 2605 of the LFSR of the descrambler. The inputted symbols are also inputted on 2603 which may be an implementation of sc, potentially after inversion by inverter inv1$r$, wherein inv1 in the scrambler and inv1$r$ in the descrambler establish identity. The inverters inv1 and inv1$r$ combined should establish identity. This means that a symbol inverter by both inv1 and inv1$r$ should be un-transformed. Implementation 2603 which may be a device implementing a 2-dimensional truth table is then the descrambling device that has also one input connected to output 2604 of the LFSR of FIG. 13. An output of 2603 then outputs a descrambled symbol. If the scrambler has an inverter inv at the input of the scrambling device 2503 then 2603 should have the inverter inv4$r$ at its output. Inverters inv4 and inv4$r$ should establish identity.

As an example, assume that FIGS. 12 and 13 pertain to a 4-state device, that all functions sc are the addition sc4 over the alternate finite field GF(4) as provided above and that inv1 and inv4 are identity inverters and inv2 is 4-state inverter [1 2 0 3] and inv3 is 4-state inverter [2 0 1 3] as defined by the multiplication over the alternate finite field GF(4).

Assume that a sequence in=[1 3 0 2 0 2 3 1 3] is inputted on the scrambler of FIG. 12 with initial LFSR state [3 2 1]. This will create scrambled sequence scram=[1 3 3 0 2 0 0 3 1]. Assume that the descrambler of FIG. 13 has initial LFSR state [2 1 3] and that the descrambler receives scram. This will generate dscram=[1 2 1 2 0 2 3 1 3], which only has the first 3 symbols in error due to the error in the initial setting of the LFSR of the descrambler and illustrates the self-synchronizing aspect.

It is again pointed out that any of the coders and decoders described herein may be implemented in true n-state devices, as disclosed for instance in U.S. Pat. No. 7,218,144 to Lablans issued on May 15, 2007 and U.S. Pat. No. 7,002,490 to Lablans issued on Feb. 21, 2006 and U.S. Pat. No. 7,548,092 to Lablans issued on Jun. 16, 2009 and in U.S. Pat. No. 7,643,632 to Lablans issued on Jan. 5, 2010, which are all incorporated herein by reference in their entirety. N-state memory devices are disclosed in U.S. Pat. No. 7,397,690 issued on Jul. 8, 2008 to Lablans and in U.S. Pat. No. 7,656,196 to Lablans on Feb. 2, 2010 which are incorporated herein by reference. A memory device or a dual memory device with appropriate clocking acts as a shift register element as is known to one of ordinary skill A shift register and in particular an n-state LFSR can also be implemented in an addressable memory, which may be an addressable n-state memory as is disclosed in U.S. Patent Application Publication Ser. No. 20070088997 to Lablans published on Apr. 19, 2007 and in U.S. Patent Application Publication Ser. No. 20070098160 to Lablans published on May 3, 2007 which are all incorporated herein by reference.

An n-state symbol with n>2 is a designation of a processing unit which is processed by an implementation of an n-state truth table with n>2. An n-state truth table can be a one dimensional truth table that defines an n-state inverter having one input and one output. It is a vector (which may be represented as a column or a row vector) that defines how each of n possible input states of an input symbol is transformed into a state of an output symbol. A reversible n-state inverter transforms one of n states of an input symbol into one of n states of an output symbol, wherein each of n input states is transformed into a unique output state. An inverter can also be non-reversible in which case n input states or transformed into less than n output states. An n-state truth table can also be 2-dimensional wherein an output n-state symbol is determined by 2 n-state input symbols.

An implementation of a 2 dimensional n-state truth table can be an actual active switching device. It can also be a memory device. In that case an n-state output symbol may be addressed by 2 n-state input symbols. Or in other words: an n-state output symbol has an address that is determined by 2 n-state input symbols. Such an n-state truth table can be implemented as for instance a 2 by 2 matrix in a computer program running on a processor with memory such as an Intel® microprocessor with memory running a language such as MatLab® of The MathWorks, Inc. of Natick, Mass. or FreeMat, an open source computer programming language, available from <URLwww.sourceforge.net>. The following truth table of sc4 can be implemented and the function sc4 can be executed in such a processor system.

| sc4 | 1 | 2 | 3 | 4 |
|-----|---|---|---|---|
| 1 | 4 | 3 | 2 | 1 |
| 2 | 3 | 4 | 1 | 2 |
| 3 | 2 | 1 | 4 | 3 |
| 4 | 1 | 2 | 3 | 4 |

The following is a listing of a program in MatLab performing all possible 4-state input combinations and the resulting output 4-state symbol of sc4.

```
% generating all possible 4-state symbols 'out' as result of
    all possible input
    % symbols 'in1' and 'in2'
sc4=[4 3 2 1;3 4 1 2;2 1 4 3;1 2 3 4]; % this is the truth table stored in
memory
for in1=1:4
    for in2=1:4
        out=sc4(in1,in2) % the generated output
    end
end
    % end program
```

Figure 14:
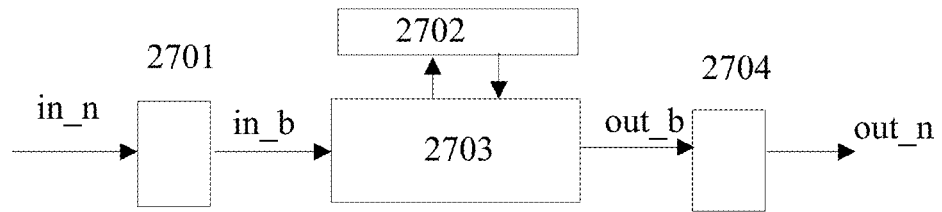
FIG. 14 illustrates a system that implements a truth table in accordance with an aspect of the present invention.

The possible states of a 4-state symbol in this program are 1, 2, 3 and 4. Each n-state symbol in this implementation sample is represented by a plurality of binary symbols, wherein a binary symbol or a bit is represented by a binary signal. An n-state symbol is thus represented by a word of binary signals. An illustrative system that implements a truth table and transforms an input to an output is shown in FIG. 14. A binary processor 2703 has an input to receive a binary word in_b. A binary word may be received as a serial sequence of bits or may be received on a plurality of parallel inputs. The binary input word may be generated from an n-state signal in_n on a device 2701 which may be an Analog/Digital (A/D) converter which transforms a single n-state signal into a plurality of binary signals. The system may be provided with two binary words 'word1' and 'word2' in series or in parallel. In the parallel case the system may have at least two A/D converters. After having received a single, or after receiving at least two input words the processor 2703 will address in one embodiment of the present invention the memory 2702 with and address based on the single input word or with the two input words to find in 2702 the related output word. The memory provides the processor with the output symbol or output binary word which may be applied for further processing or will be provided on an output by the processor to provide out_b as for instance a binary word. In a further embodiment of the present invention the binary output word out_b is provided to a Digital/Analog (D/A) converter 2704 to generate an n-state signal out_n.

The following demonstrates the difference between an implementation of sc4 with an inverter [3 1 2 4] at the input that determines a row in the truth table and applying the reduced single truth table sc41 as provided in the following table.

| sc41 | 1 | 2 | 3 | 4 |
|------|---|---|---|---|
| 1    | 2 | 1 | 4 | 3 |
| 2    | 4 | 3 | 2 | 1 |
| 3    | 3 | 4 | 1 | 2 |
| 4    | 1 | 2 | 3 | 4 |

The following is a listing of a program in MatLab performing all possible 4-state input combinations and the resulting output 4-state symbol of sc4 with the inverter [3 1 2 4] at the input that determines a row in the truth table.

```
% generating all possible 4-state symbols 'out' as result of
all possible input
% symbols 'in1' and 'in2' on sc4 with inverter [3 1 2 3] at
an input
sc4=[4 3 2 1;3 4 1 2;2 1 4 3;1 2 3 4]; % this is the truth table stored in
memory
inv = [3 1 2 4];
for in1=1:4
    for in2=1:4
        in1= inv(in1);   % this is the inversion
        out=sc4(in1,in2) % the generated output
    end
end
    % end program
```

The execution takes an extra step for inversion, requiring at least an additional clock pulse.

The following is a listing of a program in MatLab performing all possible 4-state input combinations and the resulting output 4-state symbol of sc41 which is sc4 modified in accordance with inverter [3 1 2 4] at the input that determines a row in the truth table.

```
% generating all possible 4-state symbols 'out' as result of all
possible input
% symbols 'in1' and 'in2' on sc41
sc41=[2 1 4 3;4 3 2 1;3 4 1 2;1 2 3 4]; % this is the truth table stored in
memory
for in1=1:4
    for in2=1:4
        out=sc41(in1,in2) % the generated output
    end
end
    % end program
```

The execution of this does not require an extra step for inversion, and does not require an additional clock pulse and is faster than using an implementation of the inverter.

A signal be it binary or n-state with n>2 may be an electric signal, an optical signal, a magnetic signal, a radiation, an magneto-optical signal, an electro-magnetic signal, a mechanical signal or a mechanical impulse, a presence of a material or a quantum-mechanical state or any other physical state of a material that will represent at least one of 2 states in one embodiment of the present invention or at least 1 of 3 states in a further embodiment of the present invention or at least 1 of 4 states in yet a further embodiment of the present invention. In yet a further embodiment an implementation of an n-state truth table, of which an example is provided in FIG. 14, can process n-state symbols with n>2 at a speed of at least 100 Hz (=100 symbols per second). In yet a further embodiment an implementation of an n-state truth table with n>2, of which an example is provided in FIG. 14, can process n-state symbols at a speed of at least 1000 Hz (=1000 symbols per second). In yet a further embodiment an implementation of an n-state truth table, of which an example is provided in FIG. 14, can process n-state symbols with n>2 at a speed of at least 100 Hz (=100 symbols per second). In yet a further embodiment an implementation of an n-state truth table, of which an example is provided in FIG. 14, can process n-state symbols with n>2 at a speed of at least 1 MHz (=1,000,000 symbols per second). In yet a further embodiment an implementation of an n-state truth table, of which an example is provided in FIG. 14, can process n-state symbols with n>2 at a speed of at least 100 MHz (=100,000,000 symbols per second). It should be clear that processing of n-state symbols in accordance with an n-state truth table with n>2 at the above speeds are only possible with a processor and cannot be performed mentally or with paper and pencil by a human operator.

Figure 15:
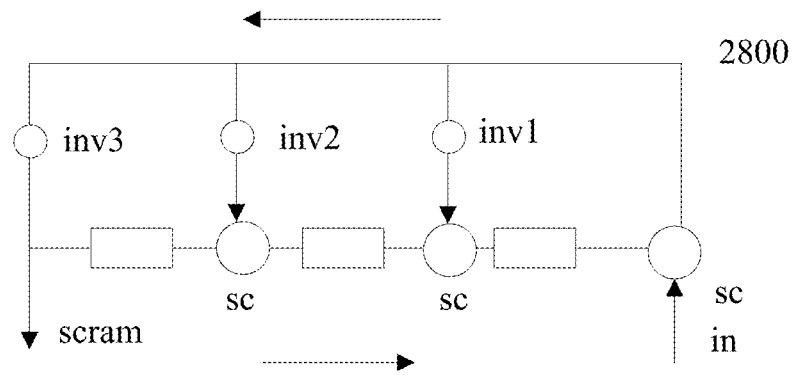
FIG. 15 illustrates a scrambler in accordance with an aspect of the present invention.
Figure 16:
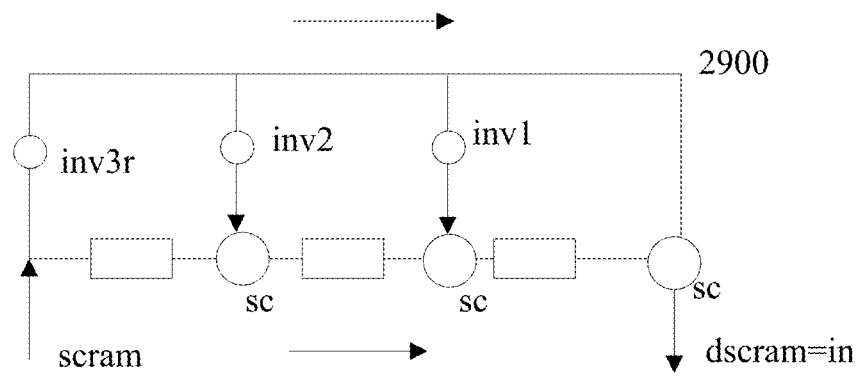
FIG. 16 illustrates a descrambler in accordance with an aspect of the present invention.

In accordance with an embodiment of the present invention an n-state scrambler with an n-state LFSR in Galois configuration is provided and a corresponding self synchronizing descrambler. Illustrative embodiments are shown in FIGS. 15 and 16. The scrambler 2800 of FIG. 15 is based on an n-state LFSR with a 3-stage shift register with two connecting n-state functions sc and a scrambling function sc that receives the to be scrambled n-state sequence on input 'in'. Two feedback taps contain n-state inverters inv2 and inv3 respectively. The end feedback to the output that provides the scrambled n-state sequence 'scram' contains an n-state inverter inv1. A corresponding descrambler 2900 is shown in FIG. 16. The scrambled sequence is provided on input 'scram'. The tap from the input has n-state inverter inv1r, which combined with inverter inv1 of FIG. 15 forms identity. The descrambler 2900 also has inverters inv2 and inv3. The descrambled n-state sequence is provided on 'dscram'. All functions in the example are called 'sc'. However, in accordance with an aspect of the present invention a 'scrambler' and/or a descrambler in the configuration like FIGS. 15 and 16 only needs to have one of the devices or implementations named 'sc' to be an addition over alternate finite field GF(n). An inverter in a scrambler or descrambler that is like the Galois configuration in FIGS. 15 and 16 can be any n-state inverter, though preferably at least one inverter is defined by a multiplication over the alternate finite field GF(n). "Like" FIGS. 15 and 16 means a Galois configuration based scrambler with a corresponding Galois configuration shift register self synchronizing descrambler. More details of the workings of LFSR and Linear Forward Connected Shift Registers (LFCSR) in Galois configuration are disclosed in U.S. Pat. No. 7,487,194 to Lablans issued on Feb. 3, 2009 which is incorporated herein by reference.

Galois configuration means a shift register with at least two adjacent shift register elements connected through an implementation of an n-state truth table from an output of a first shift register element to an input of a directly adjacent shift register element in the signal flow direction as is shown in FIG. 15. Preferably, the connecting implementation is an implementation of an at least 2 dimensional n-state truth table. Fibonacci configuration means that no implementation of an at least 2-dimensional n-state truth table is placed between an output of a first shift register element to an input of a directly adjacent shift register element in the signal flow direction as is shown in FIG. 12.

Figure 17:
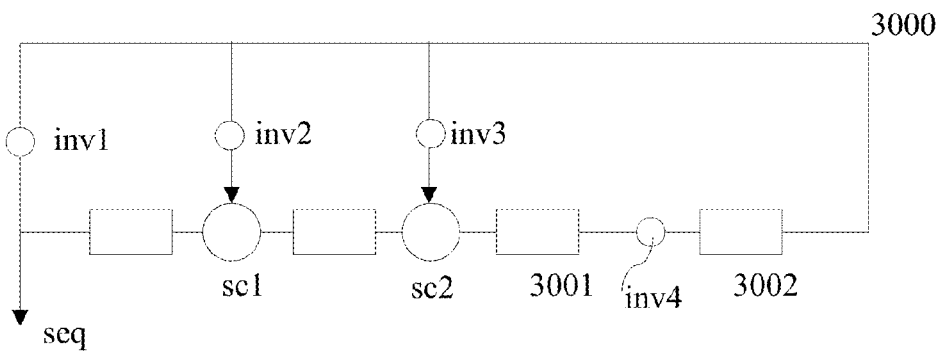
FIG. 17 illustrates a sequence generator in accordance with an aspect of the present invention.

In one embodiment an LFSR is provided wherein two adjacent shift register elements are connected through an inverter as is shown in FIG. 17. The shift register elements 3001 and 3002 are connected through an inverter inv4 and not through an implementation of an at least two dimensional n-state truth table. The Galois LFSR 3000 in FIG. 17 is shown as a sequence generator with functions sc1 and sc2 and feedback inverters inv1, inv2 and inv3 to generate an n-state sequence on output 'seq'. By changing 'inv4' to one of 24 possible 4-state inverters one can generate several different 4-state m-sequences.

In accordance with a further aspect of the present invention a convolutional n-state encoder and decoder is provided for n>2, including a forward encoder, a recursive encoder and a systematic encoder and corresponding decoders. These n-state encoders and corresponding decoders are disclosed in U.S. patent application Ser. No. 11/566,725 with Lablans as named inventor and filed on Dec. 5, 2006 which is incorporated herein by reference. These encoders may be forward coders, recursive coders and systematic coders or any combination thereof and their corresponding decoders. In one embodiment of the present invention the functions and inverters applied in these coders and decoders include at least one addition and one inverter derived from a multiplication over an alternate finite field GF(n).

Figure 18:
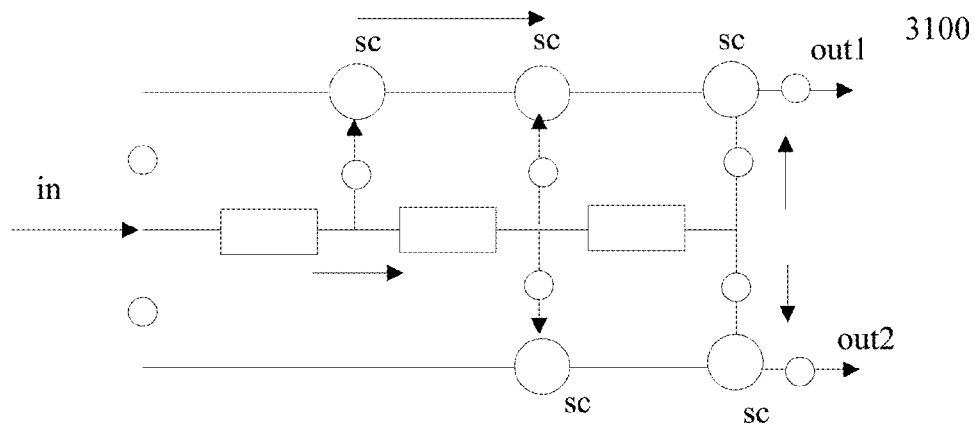
FIGS. 18 and 19 illustrate a coder in accordance with an aspect of the present invention.

FIG. 18 illustrates a forward convolutional coder 3100 with at least two different forward coders applying a shift register (in this case of 3 stages) with functions and inverters implemented.

The coder 3100 is shown in its two component coders 3201 and 3202. Each of the coders is provided with an input sequence of n-state symbols 'in'. The coders 3201 and 3202 both use a forward connected shift register. Because both shift registers are provided with the same sequence their shift register states will be identical. Coder 3201 has four taps including the start tap with inverters inv11, inv12, inv13 and inv14 respectively connected to the function 'sc' which for illustrative purposes will all be the addition over alternate finite field GF(n). The output sequence is inverted by inverter inv15 to create output sequence out1. All inverters herein for illustrative purposes are assumed to be derived from the multiplication over alternate finite field GF(n).

The coder 3202 is similar to 3201, but has one less tap and thus function sc and has inverters inv21, inv22, inv23 and inv24 to generate sequence out2. All inverters and functions are again defined over alternate finite field GF(n).

Figures 20, 21:
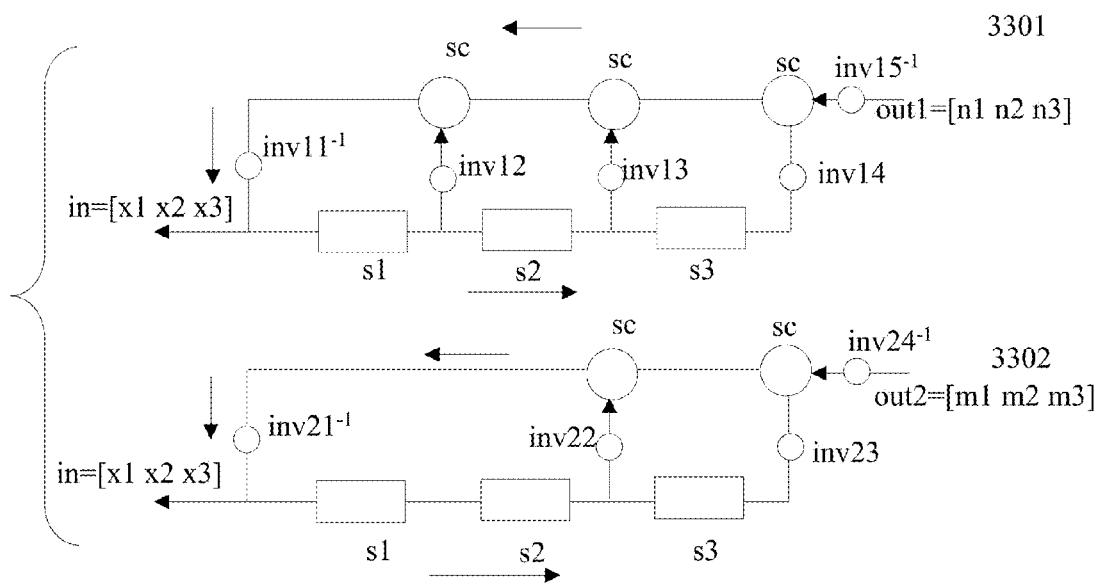
FIG. 20 illustrates a decoder in accordance with an aspect of the present invention.
FIGS. 21 and 22 illustrate coding matrices in accordance with an aspect of the present invention.

The corresponding decoders 3301 and 3302 are illustrated in FIG. 20. The structure of the decoders is similar to that of the corresponding coders with some directions reversed. This requires that inv15 in the decoder 3301 is replaced by $inv15^{-1}$, inv11 in the decoder 3301 is replaced by $inv11^{-1}$, that inv21 in the decoder 3301 is replaced by $inv21^{-1}$, inv24 in the decoder 3301 is replaced by $inv24^{-1}$. Because of the field properties (which include associativity and distributivity) and the self reversing properties one can easily manipulate equations that determine output symbols and state of the shift register.

To ease the burden of notation in inverters, an equation of a first n-state symbol in1 inputted on an n-state inverter that is defined by a multiplication over an alternate finite field GF(n) can be written as m1*in1, wherein m1 is the position of the column or row in the truth table of the multiplication. Accordingly, the inverter [0 1 2 3] in m4 of the alternate finite field corresponds with '0'; [1 2 0 3' corresponds with '1'; [2 0 1 3] corresponds with '2' and [3 3 3 3] corresponds with '3'. One should keep in mind that the '*' operation then is different from the commonly used meaning of *. Furthermore, the function sc4 can be replaced with '+'. A function 'sc' with a first inverter '1' provided with input n-state symbol 'x1' and with a second inverter '2' provided with input n-state symbol 'x2' to generate n-state symbol y, can be expressed as: y=1*x1+2*x2.

FIG. 20 shows two convolutional decoders 3301 and 3302, provided with scrambled symbols out1=[n1 n2 n3] and out2= [m1 m2 m3] respectively to both generate in=[x1 x2 x3]. Based on the construction of the coders and decoders, the content of the decoders 3301 and 3302 must be identical if the decoders are working error free. Assume that all inverters in the decoders are inverters [0 1 2 3] or '0', which represents identity in this case. The following equations determine the content [s1 s2 s3] of the shift register when symbols n1 and m1 are entered on the inputs out1 and out2:

$$x1 = n1 + s1 + s2 + s3$$

$$x2 = n2 + x1 + s1 + s2$$

$$x3 = n3 + x2 + x1 + s1$$

$$x1 = m1 + s2 + s3$$

$$x2 = m2 + s1 + s2$$

$$x3 = m3 + x1 + s1$$

Solving by substitution leads to:

$$s1 = n1 + m1 \quad (1)$$

$$s2 = n1 + m1 + m2 + n3 + m3 \quad (2)$$

$$s3 = n1 + n2 + n3 + m3 \quad (3)$$

The above equations show that, when the 3 consecutive symbols inputted into the decoders are error free, then the content of shift register is determined. The content of the shift register also reflect the 3 previous correctly generated decoded symbols. Thus if the symbols [n1 n2 n3] and [m1 m2 m3] have been preceded with symbols in error then one can correct some of these errors as is explained in detail in U.S. patent application Ser. No. 11/566,725.

The above equations show [x1 x2 x3] and [s1 s2 s3] as unknowns, while [n1 n2 n3] and [m1 m2 m3] are known entities. This means there are 6 equations with 6 unknowns, which can be resolved with for instance Cramer's rule, wherein '*' and '+' have a meaning as defined by the truth tables of sc4 and m4. Furthermore a division by 'a' in a finite field is a multiplication with '$a^{-1}$'. Accordingly, one can solve the above equations also when the inverters in the decoders are not identity inverters '0' or [0 1 2 3].

Figure 19:
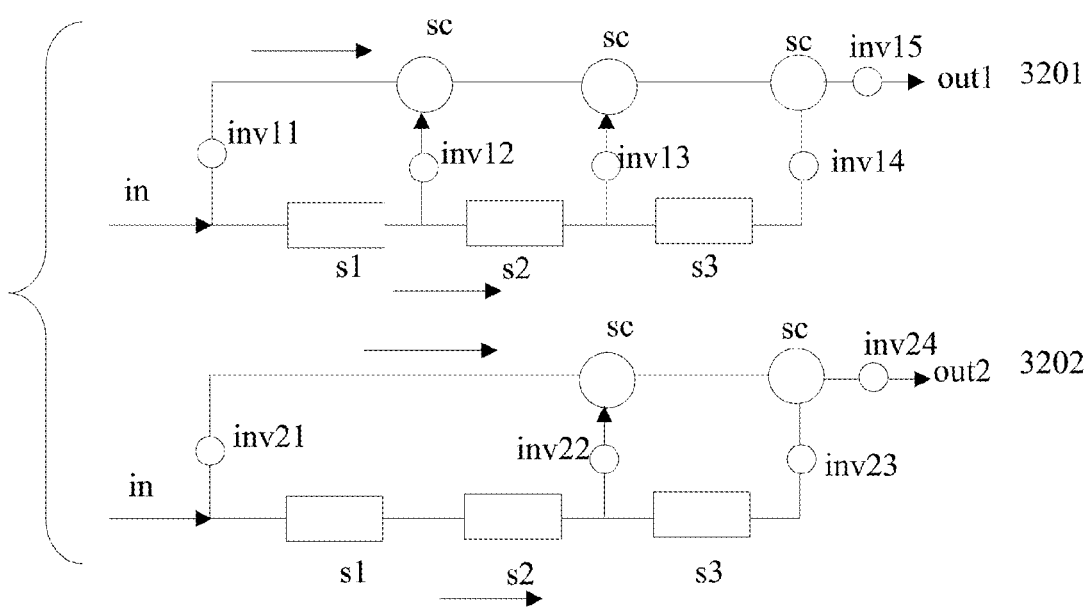

In a further illustrative example the inverters in FIG. 19 are assigned as follows: all inverters as shown in 3201 are the inverter '2' or [2 0 1 3] in the alternate finite field GF(4) and all inverters in 3202 are the inverter '1' or [1 2 0 3] in the alternate finite field GF(4). This determines that in the corresponding decoders 3301 and 3302 most inverters are identical, except inv$11^{-1}$ and inv$15^{-1}$ which should be the reverse of 3201 and thus are '1' and except inv$21^{-1}$ and inv$24^{-1}$ which should be the reverse of 3202 and thus are '2'. The function 'sc' is again the addition in the alternate finite field GF(4).

The above establish the following equations for the decoders 3301 and 3302:

For 3301:

$$2*x1+2*s1+2*s2+s*s3=1*n1;$$

$$2*x1+2*x2+2*s1+2*s2=1*n2;$$

$$2*x1+2*x2+2*x3+2*s1=1*n3;$$

For 3302:

$$1*x1+1*s2+1*s3=2*m1;$$

$$1*x2+1*s1+1*s2=2*m2;$$

$$1*x1+1*x3+1*s1=2*m3.$$

The above equations establish 6 equations with 6 unknowns (the generated x1, x2 and x3 and the shift register state s1, s2 and s3). One can resolve the set by substitution and by Cramer's rule for instance. Cramer's rule establishes the determinant for the coefficients of the unknown and unknowns as:

$$\begin{bmatrix} D & x1 & x2 & x3 & s1 & s2 & s3 \\ \hline & 0 & 3 & 3 & 0 & 0 & 0 \\ & 0 & 0 & 3 & 0 & 0 & 3 \\ & 0 & 0 & 0 & 0 & 3 & 3 \\ & 0 & 3 & 3 & 3 & 0 & 0 \\ & 3 & 0 & 3 & 0 & 0 & 3 \\ & 0 & 3 & 0 & 0 & 3 & 3 \end{bmatrix} = \begin{bmatrix} \text{knowns} \\ \hline 2*n1 \\ 2*n2 \\ 2*n3 \\ 1*m1 \\ 1*m2 \\ 1*m3 \end{bmatrix}$$

In calculating the corresponding value of the determinants one should keep all the rules of the alternate field GF(4) in mind. When an unknown does not have a coefficient in an equation its coefficient is actually '3' which is the zero-element in the finite field. The value of D is '0', which is the neutral element. The inverse of '0' is also '0'.

The unknown 's1' for instance under Cramer's rule is then:

$$0* \begin{bmatrix} x1 & x2 & x3 & s1 & s2 & s3 \\ \hline 0 & 3 & 3 & 2*n1 & 0 & 0 \\ 0 & 0 & 3 & 2*n2 & 0 & 3 \\ 0 & 0 & 0 & 2*n3 & 3 & 3 \\ 0 & 3 & 3 & 1*m1 & 0 & 0 \\ 3 & 0 & 3 & 1*m2 & 0 & 3 \\ 0 & 3 & 0 & 1*m3 & 3 & 3 \end{bmatrix}$$

A similar approach is applied to determine s2 and s3.

Accordingly, after receiving a sequence of coded n-state symbols out1 and a sequence of coded n-state symbols out2, one can determine the state of the shift register [s1 s2 s3] that corresponds to these sequences. Using [s1 s2 s3] as the initial state of the shift register in decoders 3301 and 3302 one can determine if these decoders will generate identical output symbols 'in' for the next two clock cycles. If that is the case, the sequences out1 and out2 may be considered error free, and previous errors can be corrected by using the calculated state [s1 s2 s3].

A similar approach can be applied to coders that include a recursive shift register and an encoder that includes an uncoded sequence which is usually called a systematic encoder. As an aspect of the present invention a similar approach using the functions over an alternate finite field GF(n) is applied to encoders with at least one shift register in Galois configuration as is disclosed in U.S. patent application Ser. No. 12/774,092 to Lablans filed on May 5, 2010 and which is incorporated herein by reference.

In accordance with an aspect of the present invention an encoder is provided that creates one or more n-state check symbols from one or more n-state data symbols generated by using at least an n-state addition and one n-state inverter that are defined over an alternate finite field GF(n) as provided herein, and that in one embodiment provides an error detection capability in a sequence containing an n-state data symbol and an n-state check symbol and that in a further embodiment provides an error correction capability in a sequence containing an n-state data symbol and an n-state check symbol.

An example is provided using the function addition and at least one inverter based on a multiplication over alternate finite field GF(n) and the following relations in a (7,4) n-state Hamming code to generate 3 n-state check symbols from 4 n-state data symbols $$p1=(\text{inv}1(x1) sc\ x2) sc\ \text{inv}2(x3);$$

$$p2=(x1\ sc\ x3) sc\ x4;$$

$$p3=(x2\ sc\ x3) sc\ x4.$$

Assume that inv1 is multiplier '1' in the alternate finite field GF(4) and inv2 is multiplier '2'. The function 'sc' is '+' in the alternate finite field. The above equations can then be written as:

$$p1=1*x1+x2+2*x3;$$

$$p2=x1+x3+x4;$$

$$p3=x2+x3+x4.$$

The expression (1*x1+x2) in one embodiment is replaced by an implementation of a non-commutative n-state function. This aspect has been explained earlier above.

It is assumed that only one symbol in the 7 n-state symbols is in error. One can run through all possible error situations with only one data symbol or check symbol in error. One recalculates all check symbols from the received data symbols and then compares the calculated and the received check symbols. The requirements for an n-valued (n,k) code then may be: each of the k data symbols in a n-valued Hamming codeword should be a function of at least 2 check symbols. There are (n-k) check symbols. One check symbol in error should mean just that: only one check symbol and no data symbol is in error. No check symbol in error means that no single error has occurred. What one does with a Hamming code is mapping each state of a codeword into a unique word formed by check symbols. For a (7,4) n-valued Hamming code:

$x1=p1,p2,\sim p3;$ $x2=p1,\sim p2,p3;$ $x3=p1,p2,p3;$ $x4=\sim p1,p2,p3;$ no error=$\sim p1,\sim p2,\sim p3;$ $p1$ in error=$p1,\sim p2,\sim p3;$ $p2$ in error=$\sim p1,p2,\sim p3;$ $p3$ in error=$\sim p1,\sim p2,p3;$ Accordingly all 8 combinations of p1, p2 and p3 are used.

If it is determined that x1 is in error x1 has to be reconstructed from x2, x3, x4, p1, p2 and p3 which are not in error. The equation p2=x1+x3+x4 provides that x1=p2+x3+x4 which establishes the correct value for x1. One can perform a similar calculation to determine x2, x3 and x4 when one of these symbols is in error. The check symbol can also be corrected if desired.

The aspects of determining n-state check symbols and error detection and error correction of an n-state symbol in error based on the check symbols including an n-state Hamming code have been disclosed in U.S. patent application Ser. No. 11/680,719 to Lablans filed on Mar. 1, 2007 which is incorporated herein by reference.

N-state check symbols can be determined from at least 2 n-state data symbols by applying an addition and at least one inverter based on a multiplication over an alternate finite field as disclosed herein. The symbols in one embodiment are arranged in a matrix to determine at least a location of an error which may be called an erasure. Errors can be located by re-calculating the check symbols. Once errors are located one can use the expressions or equations that have been used to determine the check symbols and by using check symbols and data symbols that are known to be error free to create an expression that determines a correct state of a symbol in error. To prevent that multiple errors in a column or a matrix prevent calculating a correct state 2 check symbols can be determined by arranging data symbols in a first matrix and determine a check symbol from a row or a column and arrange data symbols in a second matrix and determine a check symbol from a row or a column from the second matrix. The equations that determine a correct state of a symbol in error are derived from the equations or expressions that generate the check symbols.

The above matrix approach is explained in U.S. patent application Ser. No. 11/969,560 to Lablans filed on Jan. 4, 2008 and in U.S. patent application Ser. No. 12/400,900 to Lablans filed on Mar. 10, 2009 which are both incorporated herein by reference.

An illustrative example is provided using FIG. 21. FIG. 21 illustrates an arrangement of 4 rows and 3 columns of n-state data symbols $d_i$ and $m_k$ and with two rows of check symbols $p_n$ and $r_n$ and 1 column of check symbols $q_j$. Assume that it is determined that after re-calculation check symbols q3 and q4 and r2 and p2 are different from the received check symbols. In one embodiment a check symbol on check symbols confirms that the check symbols are not in error. It is determined that d6 and m6 are in error. There are several ways to solve the errors. For instance check symbol q3 may have been created from the expression c1*d2+c2*d6+c3*d10=q3. For instance the equations in one embodiment is implemented by using the function addition and at least one inverter based on a multiplication over alternate finite field GF(n). In this example n=4. Let 1*d2+2*d6+0*d10=q3. Assume that [d2 d6 d10]=[2 2 3]. This will create q3=2. Assume, received was [d2 d6 d10 q3]=[2 0 3 2]. It was already determined that d6 is in error. One can rephrase the check symbol expression or equation as 2*d6=1*d2+0*d10+q3. Multiplying left and right by '1' will result in d6=2*d2+1*d10+1*q3. Evaluating this expression will provide d6=2 of course.

In a further embodiment also a set of equations is resolved. For instance the following equations apply:

$r2=a1*d5+a2*m5+a3*d6+a4*m6;$ and $p2=b1*d5+b2*m5+b3*d6+b4*m6$. Herein d6 and m6 are in error and can be resolved from the set of two equations, for instance by applying Cramer's rule. The equations in one embodiment are again implemented by using the function addition and at least one inverter based on a multiplication over alternate finite field GF(n).

Figures 22, 23:
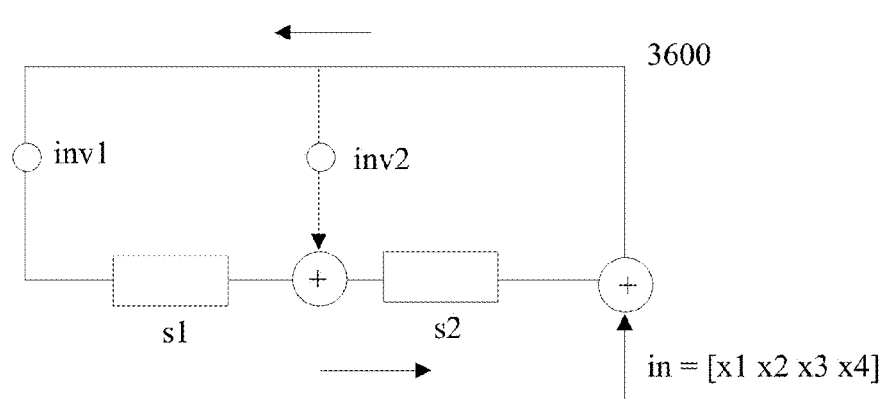
FIG. 23 illustrates a coder in accordance with an aspect of the present invention.

In one embodiment of the present invention at least two check symbols are generated by using the function addition and at least one inverter based on a multiplication over alternate finite field GF(n) with two expressions which have at least one n-state data symbol in common as a variable and wherein each check symbol is achieved by arranging n-state data symbols in different matrices. This embodiment is illustrated in FIG. 22 in matrices 3501 and 3502. Assume data symbols d6, d7 and d11 in error. By arranging the data symbols d1, ..., d12 in two different ways to generate check symbols one can determine the symbols in error, even if double errors occur in a row or a column that only generates a single check symbol. Like with the Hamming code one can establish a table that determines under what conditions which data symbol is in error. One can then use a check symbol generating expression or equation to determine the correct value of a symbol in error.

It is noted that in accordance with an aspect of the invention an expression or equation (a*x1+b*x2+c*x3+ ... m*xk) can be modified to {(x1 sc41 x2)+ ... } wherein sc41 is an implementation of a single non-commutative n-state function which is created by modifying '+' in accordance with inverters 'a' and 'b' and wherein the addition '+' function and at least one inverter based on a multiplication are defined over alternate finite field GF(n).

In one embodiment a coder is provided which is based on an n-state Linear Feedback Shift Register (LFSR) or expressions that evaluate the states and/or outputs of such an LFSR, wherein the LFSR through a function is provided with n-state data symbols and one output is a final state of the shift register as a plurality of check symbols, which can be applied to determine if an error has occurred in a sequence containing the data symbols and the final shift register content of the LFSR and wherein the LFSR and/or the expressions apply the addition '+' function and at least one inverter based on a multiplication that are defined over alternate finite field GF(n). Such a coder is illustrated in FIG. 23 with a coder 3600. At least 4 n-state data symbols in this example are entered on a function '+' to be combined with a content of the last shift register element of the LFSR which has at least 2 n-state shift register elements, which is in this case an n-state LFSR in Galois configuration. A Fibonacci configuration can also be used. The LFSR also has two n-state inverters of which at least one is defined by the multiplication over the alternate finite field GF(n). As an example n=4 and inv1 is multiplier '1' and inv2 is multiplier '2'. One can generate all codewords [x1 x2 x3 x4 s1 s2] wherein s1 and s2 represent the content of the shift register after processing. The content of the shift register at the start may be [0 0] or [3 3] or any other state. One may check that each 4-state codeword has a distance of at least 2 symbols. That means that at least one error in a codeword can be detected by recalculating the codeword.

In a further embodiment, one may take as a codeword generated by 3600 the word formed by [x1 x2 x3 x4 s1], for instance when both inv1 and inv2 are the multiplier '2' over the alternate finite field GF(4). In that case the distance between all codewords is still 2, thus allowing to determine if a symbol was in error. As an example a word [1 0 3 2 0] is received. The check symbol is re-calculated from [1 0 3 2] to generate codeword [1 0 3 2 3] which is different from the received word, which indicates that an error had occurred.

In one embodiment at least one erasure can be corrected in a coder as shown in FIG. 23. To explain how expressions can determine a state of an LFSR such as an n-state LFSR without actually running the LFSR the embodiment in FIG. 9 will be applied. Assume the content of the three n-state shift registers to be a, b and c. The inverters are inv1='1'; inv2='2' and in3='1' defined by the multiplication over alternate finite field GF(4) and sc is the addition over alternate finite field GF(4). The approach is the following: each element in the shift register gets its own assigned symbol. For instance the first element has content [s1 3 3]. The 3 is used because that is the '0' element. The second element has as content [3 s2 3] and the final element has content [3 3 s3]. The multipliers then are expressed as inv1=[1 1 1] and inv2=[2 2 2] and inv3=[1 1 1]. The multiplication of the content of the third shift register element with inv1=[1 1 1] is [1*3 1*3 1*s3]. This approach allows tracking the effects and contributions of each individual shift register element. The result of addition of inv3 times the content of the third shift register element plus the content of the second shift register element is: [{(1*3)+3} {(1*3)+s2} {(1*s3)+3}] as all operations take place on individual values. The actual final content of a shift register can be determined by adding all three components, keeping in mind that the '+' herein is the addition over the alternate finite field. The following table provides the content of the individual shift register elements after staring with s1=[0 3 3]; s2=[3 0 3] and s3=[3 3 0].

|  | sr1 | | | sr2 | | | sr3 | | |
| --- | --- | --- | --- | --- | --- | --- | --- | --- | --- |
| start | 0 | 3 | 3 | 3 | 0 | 3 | 3 | 3 | 0 |
| 1 | 3 | 3 | 1 | 0 | 3 | 2 | 3 | 0 | 1 |
| 2 | 3 | 1 | 2 | 3 | 2 | 2 | 0 | 1 | 3 |
| 3 | 1 | 2 | 3 | 2 | 2 | 2 | 1 | 3 | 2 |
| 4 | 2 | 3 | 0 | 2 | 2 | 1 | 3 | 2 | 1 |
| 5 | 3 | 0 | 2 | 2 | 1 | 3 | 2 | 1 | 0 |
| 6 | 0 | 2 | 1 | 1 | 3 | 3 | 1 | 0 | 1 |
| 7 | 2 | 1 | 2 | 3 | 3 | 2 | 0 | 1 | 2 |
| 8 | 1 | 2 | 0 | 3 | 2 | 0 | 1 | 2 | 1 |
| 9 | 2 | 0 | 2 | 2 | 0 | 3 | 2 | 1 | 1 |
| 10 | 0 | 2 | 2 | 0 | 3 | 1 | 1 | 1 | 2 |

This approach uses the associative a distributive properties of the addition and multiplication. One may replace [0 3 3] with [0*s1 3 3] which is of course [s1 3 3] and means that all states in the first position of a shift register content have to be multiplied with s1, etc. The table shows only the first 10 results of the content of the shift register. One can expand that to any length. It should be clear that after 63 cycles the content will return to the original initial content. The above also means that if an initial state of a shift register is known one can determine the actual content (and the generated symbol) at any time after and before the initial time without having to run the LFSR.

The following table shows the content of the shift register of the LFSR of FIG. 23 after starting with content [3 3] and being entered with [x1 x2 x3 x4]. The input states are reflected as x1=[0 3 3 3]; x2=[3 0 3 3]; x3=[3 3 0 3] and x4=[3 3 3 0]. All shift register contents are expressed as depending on x1, x2, x3 and x4. This means that: s1=[3 3 3 3] and s2=[3 3 3 3]. The states of the two shift register elements are then:

| cycle | s1 | | | | s2 | | | |
| --- | --- | --- | --- | --- | --- | --- | --- | --- |
| 0 | 3 | 3 | 3 | 3 | 3 | 3 | 3 | 3 |
| 1 | 2 | 3 | 3 | 3 | 2 | 3 | 3 | 3 |
| 2 | 1 | 2 | 3 | 3 | 0 | 2 | 3 | 3 |
| 3 | 2 | 1 | 2 | 3 | 0 | 0 | 2 | 3 |
| 4 | 2 | 2 | 1 | 2 | 3 | 0 | 0 | 2 |

As was described above, the check symbol in a codeword is the content of the first shift register element after 4 cycles and thus entering x1, x2, x3 and x4. From the above one can see that after 4 cycles s1=2*x1+2*x2+1*x3+2*x4. In the earlier example it was shown that [1 0 3 2 0] was received with one symbol in error. Assume that it was decided that x2 is an erasure and that thus s1 was correct. This means that: 2*x2=2*x1+1*x3+2*x4+s1 or x2=x1+2*x3+x4+1*s1 or x2=2. This demonstrates that in one embodiment of the present invention one can determine the correct state of a symbol in error from an expression that determines a state of a check symbol. This approach can be applied for all type of expressions. However, it has here been shown to apply to a coder using at least an addition and an inverter defined by a multiplication over an alternate finite field GF(n) with n=4.

In one embodiment of the present invention the combination of an addition and an inverter defined by a multiplication over alternate finite field GF(n) as applied in coders and decoders as shown in FIGS. 15-20 and FIG. 23 are implemented in a single non commutative truth table. One implementation of a combination of the above addition and inverter in a further embodiment of the present invention is a single non-commutative truth table stored in a memory device.

The addition over an alternate finite field GF(n) and inverters defined over a multiplication defined over an alternate finite field GF(n) as disclosed herein can be used in any reversible coder. For instance it can be applied in a scrambler as disclosed by Kuhlman et al. in U.S. Pat. No. 7,099,469 issued on Aug. 29, 2006 which is incorporated herein by reference. The methods can also be used in for instance the S-box of Feistel ciphers or Feistel networks.

Figure 24:
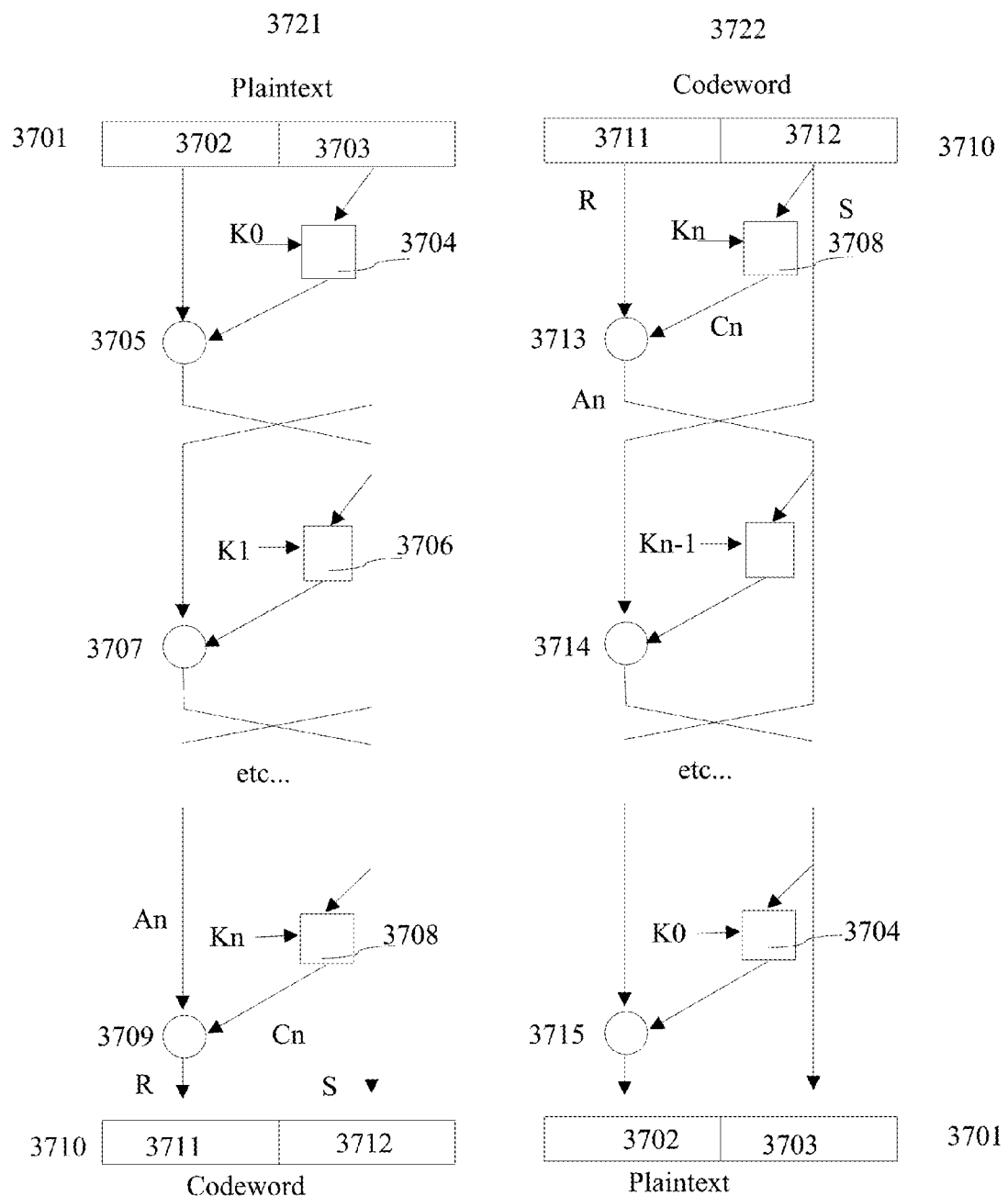
FIG. 24 illustrates another coder in accordance with an aspect of the present invention.

The Feistel network is illustrated in FIG. 24. Herein 3721 is the coding or ciphering network and 3722 is the decoding or deciphering network. The order of use of 3721 and 3722 can the exchanged as long the one reverses the other. The working is well known to one of ordinary skill in the art, but will be briefly explained herein. A plaintext word 3701 of 2p (with p≥1 or p>1) n-state symbols with n≥2 will be spilt into two parts 3702 and 3703 of n-state symbols. These words and their parts may be binary symbols. They may also be n-state symbols with n>2. They may also be n-state symbols which are represented as binary symbols. An n-state symbol may be represented by n-state signals to be processed by n-state switching functions. They also may be binary symbols represented by binary signals to be processed by binary switching functions as n-state symbols. They may also be n-state symbols represented by binary signals that are processed by n-state switching functions that are implemented by binary switching technology. In the last case, signals and switching technology often represent symbols and functions over GF($2^q$) with q>1.

In 3721 word 3701 is split up in word 3702 and 3703. Word 3703 is modified by an n-state function 3704 against a word K0. The n-state functions implemented in 3704, 3706 and 3708 may be reversible or non-reversible. They have as input a known signal such as a key word K0, K1, ... Kn or apply some known confusion scheme. These functions have to be applied with the same corresponding key in the coder 3721 and in reversed order in decoder 3722. The n-state functions 3705, 3707 and 3709 in coder 3721 have to be reversible n-state functions and have to be applied in reversed order in their corresponding reversing function in 3722. The reversible n-state functions may be commutative or non-commutative but at least one of them is an addition over alternate finite field GF(n) or is an addition over alternate finite field GF(n) with at least one n-state inverter at an input or an output which is defined by a multiplication over the alternate finite field GF(n) or is an addition over alternate finite field GF(n) that is modified in accordance with an inverter which is defined by a multiplication over the alternate finite field GF(n) and is implemented as a single n-state truth table for instance in a memory device, wherein the truth table may be a non-commutative truth table.

Assume that function 3709 can be represented as sc1 and function 3708 as sc2. Further assume that the reverse of function sc1 is function ds1. This can be illustrated by the expressions c=a sc1 b and a=c ds1 b. In general one applies the adder over GF($2^n$) as the reversible n-state function. This adder is self-reversing and commutative and can be implemented in a binary logic circuit or a memory device.

The last stage of 3721 can be expressed as Cn=S sc1 Kn and R=An sc2 Cn. The first stage of 3722 has a function 3713 which reverses sc2 and can be called ds2. The first stage of the decoder 3722 can be expressed as Cn=S sc1 Kn and An=R ds2 Kn. This demonstrates that the decoder 3722 reverses the coder 3721. One has to make sure that the generated codeword 3710 which is formed from 3711 and 3712 is entered in the proper way as the to be decoded codeword into decoder 3722. A similar reasoning applies to reversible functions 3714 and 3715.

The structure of a Feistel network, wherein coding includes "rounds" of confusion and substitution are also applied in advanced codes such as Rijndael and the related Advanced Encryption Standard (AES) coding scheme. The rounds herein apply what is called herein a Feistel-like network. This means that a word of k n-state symbols (with n≥2, or n>2, or n>3) and k≥2, is split at least in two sub-words of at least one symbol and wherein at least one of the sub-words is being processed by either an implementation of an addition over an alternate finite field or by an addition over an alternate finite field and an inverter defined by a multiplication over a finite field or by an implementation of a truth table of an addition over an alternate finite field that is modified in accordance with an inverter defined by an alternate finite field. At least the reversible part of for instance DES and AES in one embodiment of the present invention apply functions and inverters defined by the alternate finite fields as defined and explained herein.

How to generate and decode an AES code is for instance provided in U.S. Pat. No. 7,421,076 issued on Sep. 2, 2008 to Stein et al. and U.S. Pat. No. 7,383,435 to Fellerer issued on Jun. 3, 2008 which are both incorporated herein by reference.

Feistel-like or Feistel network based encoders generally work in blocks of n-state symbols. A plurality of symbols that is received sequentially, rather than in parallel are thus considered words or blocks of symbols. These codes are generally called block codes as a coder can operate only after a block of symbols has been entered. The same applies to error correcting coders wherein check symbols are determined over a block of n-state symbols. A decoder cannot complete decoding until all symbols of a block have been entered into the decoder and can be processed.

Figure 38:
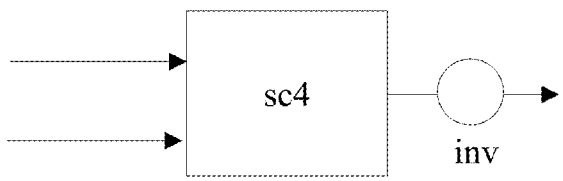

In accordance with an embodiment of the present invention a two input n-state function of FIG. 24 may be represented by an n by n truth table. Such a truth table in one embodiment is implemented in a memory device. If the function is reversible a column and/or a row of the truth table have to be a reversible n-state inverter. One may modify the adder by providing n-state inverter at one or both of the inputs and/or by providing an n-state inverter at the output. An n-state inverter over GF($2^q$) can be implemented in binary logic for processing of words of q bits by using combinational binary circuitry, by switching outputs or by using a memory device. FIG. 38 shows in diagram an n-state switching device 3800 implementing an n-state function with inputs 3801 and 3802 and output 3803.

One may implement an n-state function by using a device 3804 that implements an adder over alternate finite field GF(n) with inverters 3805 and 3806 at the inputs and inverter 3807 at the output wherein at least one of the inverters is defined by a multiplication over the alternate finite field GF(n). An inverter may be identity, which is a direct connection, which may be called a multiplier '0' in the alternate finite field GF(4) as was developed above. In one illustrative example the device 3804 implements the 4-state adder:

| sc4 | 0 | 1 | 2 | 3 |
|-----|---|---|---|---|
| 0   | 3 | 2 | 1 | 0 |
| 1   | 2 | 3 | 0 | 1 |
| 2   | 1 | 0 | 3 | 2 |
| 3   | 0 | 1 | 2 | 3 |

In a further example one of the inverters 3805, 3806 and 3807 is 4-state inverter [2 0 1 3] while the other 2 inverters are [0 1 2 3] or identity. Inverter 3805 has input 3802, inverter 3806 has input 3802 while inverter 3807 has an output 3803.

Case 1: inverter 3805 is [2 0 1 3]. The device of FIG. 38 is reduced to the device of FIG. 39 (assuming that input 3801 determines a row in the truth table and input 3802 a column) with a device 3900 that implements a single truth table:

| sc4 | 0 | 1 | 2 | 3 |
|-----|---|---|---|---|
| 0   | 1 | 0 | 3 | 2 |
| 1   | 3 | 2 | 1 | 0 |
| 2   | 2 | 3 | 0 | 1 |
| 3   | 0 | 1 | 2 | 3 |

Figure 39:
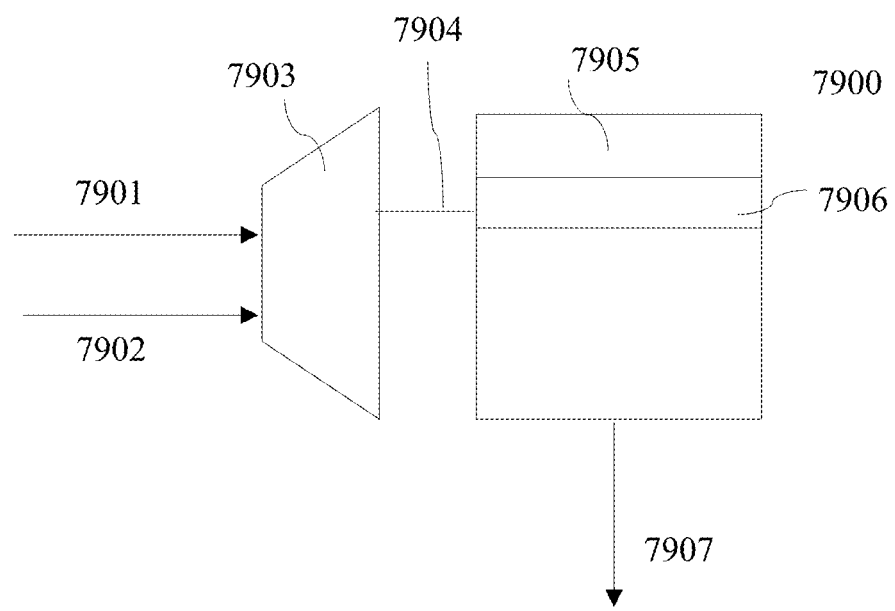
FIG. 39 illustrates an addressable memory.

This is clearly a non-commutative truth table. However, the device of FIG. 39 in this example does not require separate inverters at inputs or output. In one embodiment the truth table of FIG. 39 is implemented on a processor for instance on a memory device of a processor.

Case 2: In the second example invert 3806 is [2 0 1 3] while the other inverters are identity. This results in a device 3900 that implements a single truth table:

| sc4 | 0 | 1 | 2 | 3 |
|-----|---|---|---|---|
| 0   | 1 | 3 | 2 | 0 |
| 1   | 0 | 2 | 3 | 1 |
| 2   | 3 | 1 | 0 | 2 |
| 3   | 2 | 0 | 1 | 3 |

This is also a non-commutative truth table. The device of FIG. 39 in this example does not require separate inverters at inputs or output. In one embodiment the truth table of FIG. 39 is implemented on a processor for instance on a memory device of a processor.

Case 3: inverter 3807 is [2 0 1 3]. The device of FIG. 38 is reduced to the device of FIG. 39 with a device 3900 that implements a single truth table:

| sc4 | 0 | 1 | 2 | 3 |
|-----|---|---|---|---|
| 0   | 3 | 1 | 0 | 2 |
| 1   | 1 | 3 | 2 | 0 |
| 2   | 0 | 2 | 3 | 1 |
| 3   | 2 | 0 | 1 | 3 |

This is a commutative truth table. The device of FIG. 39 in this example does not require separate inverters at inputs or output. In one embodiment the truth table of FIG. 39 is implemented on a processor for instance on a memory device of a processor.

Case 4: inverter 3805 is [2 0 1 3], inverter 3806 is [1 2 0 3] and inverter 3807 is [2 0 1 3]. The device of FIG. 38 is reduced to the device of FIG. 39 with a device 3900 that implements a single truth table:

| sc4 | 0 | 1 | 2 | 3 |
|-----|---|---|---|---|
| 0   | 2 | 3 | 0 | 1 |
| 1   | 1 | 0 | 3 | 2 |
| 2   | 3 | 2 | 1 | 0 |
| 3   | 0 | 1 | 2 | 3 |

This is again a non-commutative truth table. The device of FIG. 39 in this example does not require separate inverters at inputs or output. In one embodiment the truth table of FIG. 39 is implemented on a processor for instance on a memory device of a processor.

It is noted that all of the truth tables after reduction are still reversible. The reduced function can be called scnm.

It has been noted before that in alternate finite field GF(4) that the inverse of inverters are 0→inv $0^{-1}$; 1→inv $2^{-1}$; and 2→inv $1^{-1}$.

For instance, the function device of FIG. 38 can be expressed as y=c*(a*x1+b*x2), wherein a, b and c are the inverters 3805, 3806 and 3807, x1 is the representation of the signal on 3801, x2 is the representation of the signal on 3802, and y is the representation of the signal provided on 3803, and + is the function scn performed by 3804. Assume that x2 and y are known. The state of x1 can then be determined by: x1=$c^{-1}$*$a^{-1}$*y+$a^{-1}$b*x2, keeping in mind that '+' is self reversing and if a, b and c are inverters in the alternate finite field GF(n) then $a^{-1}$, $b^{-1}$ and $c_{-1}$ are also inverters in the alternate finite field GF(n).

Figure 25:
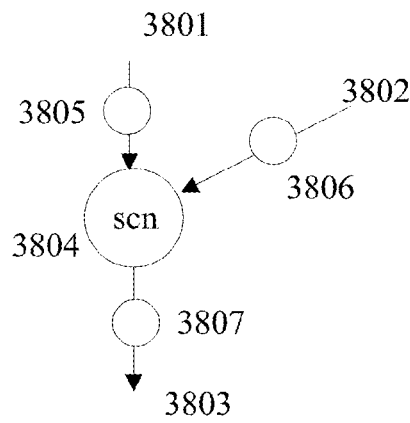
FIG. 25 illustrates a device that implements a truth table in accordance with an aspect of the present invention.
Figure 26:
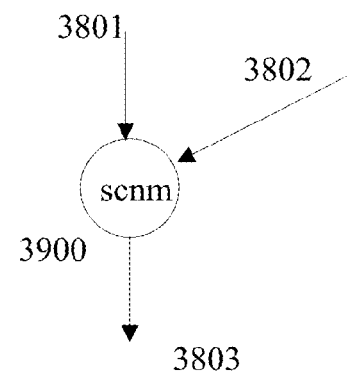
FIG. 26 illustrates another device that implements a truth table in accordance with an aspect of the present invention.

In one embodiment of the present invention the device or implementation of FIG. 25 or 26 can be applied in any coder which processes an n-state symbol in accordance with an n-state addition over an alternate finite field GF(n) which is modified in accordance with at least one inverter which is defined by a multiplication over the alternate finite field GF(n) or has such an inverter at an input or an output.

In one embodiment of the present invention a coding device performs a polynomial arithmetical calculation over the alternate finite field GF(n). This means that additions, multiplications and divisions are all performed over the alternate finite field GF(n). The division over such a field is the reverse of the multiplication as was explained earlier. It is believed that calculations over finite fields are known. In general one performs these calculations over the classical fields GF($2^m$). One reason to apply GF($2^m$) is that symbols over GF($2^m$) can be represented in binary form as binary words using mainly XOR and AND operations. By using functions over an alternate finite field GF(n) the results become less predictable and hard to analyze for an unauthorized or uninformed receiver of n-state symbols coded or generated over an alternate finite field.

The following patents disclose n-state arithmetic over a finite or Galois field GF(n=$2^m$). U.S. Pat. No. 4,745,568 to Onyszchuk et al. issued on May 17, 1988; U.S. Pat. No. 7,372,960 to Lambert issued on May 13, 2008; U.S. Pat. No. 7,506,015 to Graham issued on May 17, 2009; U.S. Pat. No. 7,711,763 issued on May 4, 2010 which are all incorporated herein by reference. In one embodiment these Galois field calculators apply a shift register to determine a multiplication or division of polynomials or a remainder thereof, such as in U.S. Pat. No. 4,797,848 to Walby issued on Jan. 10, 1989 and U.S. Pat. No. 5,999,959 to Weng et al. issued on Dec. 7, 1999 which are also incorporated herein by reference. While in one embodiment a calculator over an alternate finite field has an implementation of an addition and an inverter both over an alternate finite field GF(n), an implementation may also be an implementation of a single truth table which is a truth table of an addition over an alternate finite field GF(n) modified in accordance of at least inverter which is defined by a multiplication over an alternate finite field GF(n).

Above, at least one alternate finite field GF(4) has been provided. While GF(4) has not many alternate finite fields it still has at least 3 alternate finite fields. It will be shown that for instance GF(8) has many more alternate finite fields.

The following truth tables define two more alternate finite fields GF(4).

| sc4a | 0 | 1 | 2 | 3 | m4a | 0 | 1 | 2 | 3 |
|------|---|---|---|---|-----|---|---|---|---|
| 0    | 1 | 0 | 3 | 2 | 0   | 1 | 2 | 3 |   |
| 1    | 0 | 1 | 2 | 3 | 1   | 1 | 1 | 1 |   |
| 2    | 3 | 2 | 1 | 0 | 2   | 1 | 3 | 0 |   |
| 3    | 2 | 3 | 0 | 1 | 3   | 1 | 0 | 2 |   |

The functions sc4a (addition) and m4a (multiplication) form a field: requirements of commutativity, associativity and distributivity are met. There is a neutral element '0' in the multiplication so that 0*x=x for each element in the field. There is also a zero element (which is '1') so that a+(−a)=1 and a+1=a. Furthermore the inverse of every multiplication is also in the field (0→0), (2→3) and (3→2) and 2*3=0 and 3*2=0. Furthermore, every power of an element of the field is also in the field: $X^2$=X*X so that 2*2=3 and 3*3=2, etc.

Yet another alternate finite field GF(4) is defined by:

| sc4b | 0 | 1 | 2 | 3 | m4b | 0 | 1 | 2 | 3 |
|---|---|---|---|---|---|---|---|---|---|
| 0 | 2 | 3 | 0 | 1 | 0 | 0 | 1 | 2 | 3 |
| 1 | 3 | 2 | 1 | 0 | 1 | 1 | 3 | 2 | 0 |
| 2 | 0 | 1 | 2 | 3 | 2 | 2 | 2 | 2 | 2 |
| 3 | 1 | 0 | 3 | 2 | 3 | 3 | 0 | 2 | 1 |

The functions sc4*b* (addition) and m4*b* (multiplication) form a field: requirements of commutativity, associativity and distributivity are met. There is a neutral element '0' in the multiplication so that $0*x=x$ for each element in the field. There is also a zero element (which is '2') so that $a+(-a)=2$ and $a+2=a$. Furthermore the inverse of every multiplication is also in the field $(0 \rightarrow 0)$, $(1 \rightarrow 3)$ and $(3 \rightarrow 1)$ and $1*3=0$ and $3*1=0$. Furthermore, every power of an element of the field is also in the field: $X^2=X*X$ so that $1*1=3$ and $3*3=1$, etc.

As an example a multiplication of two polynomials over GF(n) defined by sc4*a* and m4*a* is provided: $(2*x+3)*(3*x+2)=2*3*x^2+(3*3+2*2)*x+2*3=0*x^2+0*x+0$. Keeping in mind that '0' in this field is the neutral element. In a similar manner one may conduct a polynomial division. For instance add $0*x+0$ to the above polynomial product, which will create $0*x^2+0*x+0+0*x+0=0*x^2+1*x+1=0*x^2$ as 1 is the '0' element. Dividing $0*x^2$ by $(2*x+3)$ will generate $3*x+0$ with a remainder 3. One can check this result by evaluating $(2*x+3)*(3*x+0)+\text{remainder}$ which will generate $0*x^2$.

In one embodiment of the present invention at least one of the functions or inverters used in a coder during coding is changed from being defined in a first alternate finite field to being defined in a second alternate finite field. For instance use the scrambler and descrambler of FIGS. 12 and 13. In a first instance the functions and inverters are defined related to sc4*a* and m4*a*, and in a second instance to sc4*b* and m4*b*. For instance assume that in FIG. 12 sc is sc4*a* and the inverters inv1 and inv4 are identity and inverter inv2 is multiplier 2 in m4*a* and inv3 is multiplier 3 in m4*a*. FIG. 13 is the corresponding descrambler. Further assume that after coding 10 symbols the functions are changed to sc4*b* and m4*b* for coding the next 10 symbols. With the initial state of the LFSR being [0 1 3] and the inputted symbols being twenty zeros [0 0 0 0 0 0 0 0 0 0 0 0 0 0 0 0 0 0 0 0] then the scrambler of FIG. 12 will generate [1 2 3 0 3 1 2 0 2 3 2 3 1 3 3 0 2 0 2 1]. When the descrambler follows the scrambler using the same initial state then the descrambled sequence will be twenty zeros. However, if the descrambler keeps on using the same functions sc4*a* and m4*a* then the descrambled sequence will be [0 0 0 0 0 0 0 0 0 0 3 1 3 3 0 2 0 2 1 2] which is clearly not correct. Implementations of the functions herein in memory are easy to realize and easy to change. Accordingly it is not required to keep the same functions for a long period. If one so desires functions and/or inverters can be changed per coding of a single symbol. One should be careful in coding procedures wherein a plurality of symbols or a word of symbols is coded, for instance in accordance with a Galois Field. In such a case it is generally beneficial to not change functions during coding of the word. However, if one is prepared to handle the complexities of changing functions in the corresponding decoding process one may also change functions during coding of a word of n-state symbols.

We will turn our attention now to alternate finite fields for n>4. It has been shown above that one can a finite field with addition such as sc81 and sc82 and multiplication over GF(8) by a primitive polynomial for instance implemented in a 3-stage LFSR. The number of additions that establish a field combined with a standard multiplication such as above provided multiplication m81 in the n=8 case will increase for $n=2^m$ and m>3. For m=4 there are 4 generator polynomials and for m=5 there are 6 and for m=8 there are 34 generator polynomials according to Lin and Costello's Error Control Coding. Each of the additions in these polynomial fields has the 'standard' multiplication. The additions and inverters related to the multiplication in such finite fields can be used in coders and decoders as provided herein. It is believed to be a novel aspect that different additions as generated by primitive or minimal polynomials can be used in coders, including reversible coders that are provided herein. It is a further aspect of the present invention that coders and/or decoders provided herein apply inverters or a multiplication defined over the field, which in these cases is known as an extension field. These different additions can also be modified or provided with inverters that are not defined over the finite field.

It has been shown above that addition sc83 is associative, it has a neutral element (0) it is commutative and it is distributive with m82 which also has a neutral element and a zero element. The addition is also self reversing. Furthermore the multiplication has for each multiplier an inverse in the field. Accordingly, sc83 and m82 form an alternate finite field GF(8) in which all of the coders and decoders as already described herein are enabled.

The following truth tables are of combinations of additions and multiplications that establish an alternate finite field over GF(8). One such combination is:

| sc8a | 0 | 1 | 2 | 3 | 4 | 5 | 6 | 7 | m8a | 0 | 1 | 2 | 3 | 4 | 5 | 6 | 7 |
|---|---|---|---|---|---|---|---|---|---|---|---|---|---|---|---|---|---|
| 0 | 0 | 1 | 2 | 3 | 4 | 5 | 6 | 7 | 0 | 0 | 0 | 0 | 0 | 0 | 0 | 0 | 0 |
| 1 | 1 | 0 | 5 | 6 | 7 | 2 | 3 | 4 | 0 | 1 | 2 | 3 | 4 | 5 | 6 | 7 |
| 2 | 2 | 5 | 0 | 7 | 6 | 1 | 4 | 3 | 0 | 2 | 3 | 5 | 6 | 7 | 1 | 4 |
| 3 | 3 | 6 | 7 | 0 | 5 | 4 | 2 | 1 | 0 | 3 | 5 | 7 | 1 | 4 | 2 | 6 |
| 4 | 4 | 7 | 6 | 5 | 0 | 3 | 2 | 1 | 0 | 4 | 6 | 1 | 5 | 2 | 7 | 3 |
| 5 | 5 | 2 | 1 | 4 | 3 | 0 | 7 | 6 | 0 | 5 | 7 | 4 | 2 | 6 | 3 | 1 |
| 6 | 6 | 3 | 4 | 2 | 2 | 7 | 0 | 5 | 0 | 6 | 1 | 2 | 7 | 3 | 4 | 5 |
| 7 | 7 | 4 | 3 | 1 | 1 | 6 | 5 | 0 | 0 | 7 | 4 | 6 | 3 | 1 | 5 | 2 |

The functions sc8a and m8a establish an alternate finite field over GF(n) with n=8 and can be applied in the coders and decoders as described herein. One can see that m8a is not the traditional multiplication over GF(8).

Another combination that defines an alternate finite field GF(n) with n=8 is:

| sc8b | 0 | 1 | 2 | 3 | 4 | 5 | 6 | 7 | m8b | 0 | 1 | 2 | 3 | 4 | 5 | 6 | 7 |
|---|---|---|---|---|---|---|---|---|---|---|---|---|---|---|---|---|---|
| 0 | 0 | 1 | 2 | 3 | 4 | 5 | 6 | 7 | | 0 | 0 | 0 | 0 | 0 | 0 | 0 | 0 |
| 1 | 1 | 0 | 7 | 5 | 6 | 3 | 4 | 2 | | 0 | 1 | 2 | 3 | 4 | 5 | 6 | 7 |
| 2 | 2 | 7 | 0 | 4 | 3 | 6 | 5 | 1 | | 0 | 2 | 3 | 5 | 1 | 6 | 7 | 4 |
| 3 | 3 | 5 | 4 | 0 | 2 | 1 | 7 | 6 | | 0 | 3 | 5 | 6 | 2 | 7 | 4 | 1 |
| 4 | 4 | 6 | 3 | 2 | 0 | 7 | 1 | 5 | | 0 | 4 | 1 | 2 | 7 | 3 | 5 | 6 |
| 5 | 5 | 3 | 6 | 1 | 7 | 0 | 2 | 4 | | 0 | 5 | 6 | 7 | 3 | 4 | 1 | 2 |
| 6 | 6 | 4 | 5 | 7 | 1 | 2 | 0 | 3 | | 0 | 6 | 7 | 4 | 5 | 1 | 2 | 3 |
| 7 | 7 | 2 | 1 | 6 | 5 | 4 | 3 | 0 | | 0 | 7 | 4 | 1 | 6 | 2 | 3 | 5 |

The functions sc8b and m8b establish an alternate finite field over GF(n) with n=8 and can be applied in the coders and decoders as described herein. One can see that m8b is not the traditional multiplication over GF(8) and is also different from m8a.

All neutral elements in the above addition are '0' (a+(−a)=0) and in the multiplication is 1 (a*1=a).

There are several ways to find the appropriate addition and corresponding multiplication functions by using the required properties of the functions. For instance, one may require that the addition is self reversing. In that case each column and row in the truth table of the addition is a self reversing n-state inverter. Furthermore, one may require that all additions have the field characteristic 2 or that (a+(−a))=e, wherein e is the zero element. A requirement of a field is the existence of e so that a+e=a. This means that at least one column and row are the identity. Communitivity also limits the construction. For each row selected in a truth table the next row selection becomes more restricted as the rows and columns are symmetric around the diagonal of the truth table.

Once one has selected the rows or columns and arranges them in a commutative table, the next check is associativity. After finding a proper addition, a next step is to find a corresponding multiplication. One can limit a search for appropriate rows or columns in a multiplication truth table by first limiting all to be considered n-state inverters to the reversible inverters that are distributive with the addition. The multiplication is also commutative further limiting a search for appropriate n-state inverters. A further limitation is that none of the inverters that are considered for an addition or multiplication should have an identical symbol in an identical position.

The earlier provided examples of alternate finite fields over GF(n) with n=8 have as neutral element '0'. In the 4-state case it was already shown that one can also generate an alternate finite field with neutral element '3' or '2' or '1'. The same applies for other alternate finite fields, for instance for n=8. For instance, one can construct at least one alternate finite field over GF(8) with neutral element 5. The truth tables of the addition and multiplication that define this field are provided next.

| sc8c | 0 | 1 | 2 | 3 | 4 | 5 | 6 | 7 | m8c | 0 | 1 | 2 | 3 | 4 | 5 | 6 | 7 |
|---|---|---|---|---|---|---|---|---|---|---|---|---|---|---|---|---|---|
| 0 | 5 | 3 | 7 | 1 | 6 | 0 | 4 | 2 | 0 | 0 | 1 | 2 | 3 | 4 | 5 | 6 | 7 |
| 1 | 3 | 5 | 4 | 0 | 2 | 1 | 7 | 6 | 1 | 1 | 2 | 3 | 4 | 6 | 5 | 7 | 0 |
| 2 | 7 | 4 | 5 | 6 | 1 | 2 | 3 | 0 | 2 | 2 | 3 | 4 | 6 | 7 | 5 | 0 | 1 |
| 3 | 1 | 0 | 6 | 5 | 7 | 3 | 2 | 4 | 3 | 3 | 4 | 6 | 7 | 0 | 5 | 1 | 2 |
| 4 | 6 | 2 | 1 | 7 | 5 | 4 | 0 | 3 | 4 | 4 | 6 | 7 | 0 | 1 | 5 | 2 | 3 |
| 5 | 0 | 1 | 2 | 3 | 4 | 5 | 6 | 7 | 5 | 5 | 5 | 5 | 5 | 5 | 5 | 5 | 5 |
| 6 | 4 | 7 | 3 | 2 | 0 | 6 | 5 | 1 | 6 | 6 | 7 | 0 | 1 | 2 | 5 | 3 | 4 |
| 7 | 2 | 6 | 0 | 4 | 3 | 7 | 1 | 5 | 7 | 7 | 0 | 1 | 2 | 3 | 5 | 4 | 6 |

The following illustrative example shows the truth tables of the addition and multiplication that define an alternate finite field GF(8) with neutral element '7'.

| sc8d | 0 | 1 | 2 | 3 | 4 | 5 | 6 | 7 | m8d | 0 | 1 | 2 | 3 | 4 | 5 | 6 | 7 |
|---|---|---|---|---|---|---|---|---|---|---|---|---|---|---|---|---|---|
| 0 | 7 | 3 | 6 | 1 | 5 | 4 | 2 | 0 | 0 | 0 | 1 | 2 | 3 | 4 | 5 | 6 | 7 |
| 1 | 3 | 7 | 4 | 0 | 2 | 6 | 5 | 1 | 1 | 1 | 2 | 3 | 4 | 5 | 6 | 0 | 7 |
| 2 | 6 | 4 | 7 | 5 | 1 | 3 | 0 | 2 | 2 | 2 | 3 | 4 | 5 | 6 | 0 | 1 | 7 |
| 3 | 1 | 0 | 5 | 7 | 6 | 2 | 4 | 3 | 3 | 3 | 4 | 5 | 6 | 0 | 1 | 2 | 7 |
| 4 | 5 | 2 | 1 | 6 | 7 | 0 | 3 | 4 | 4 | 4 | 5 | 6 | 0 | 1 | 2 | 3 | 7 |
| 5 | 4 | 6 | 3 | 2 | 0 | 7 | 1 | 5 | 5 | 5 | 6 | 0 | 1 | 2 | 3 | 4 | 7 |
| 6 | 2 | 5 | 0 | 4 | 3 | 1 | 7 | 6 | 6 | 6 | 0 | 1 | 2 | 3 | 4 | 5 | 7 |
| 7 | 0 | 1 | 2 | 3 | 4 | 5 | 6 | 7 | 7 | 7 | 7 | 7 | 7 | 7 | 7 | 7 | 7 |

The following illustrative example shows the truth tables of the addition and multiplication that define an alternate finite field GF(8) with neutral element '3'.

| sc8e | 0 | 1 | 2 | 3 | 4 | 5 | 6 | 7 | m8e | 0 | 1 | 2 | 3 | 4 | 5 | 6 | 7 |
|---|---|---|---|---|---|---|---|---|---|---|---|---|---|---|---|---|---|
| 0 | 3 | 2 | 1 | 0 | 5 | 4 | 7 | 6 | 0 | 0 | 1 | 2 | 3 | 4 | 5 | 6 | 7 |
| 1 | 2 | 3 | 0 | 1 | 6 | 7 | 4 | 5 | 1 | 1 | 4 | 6 | 3 | 5 | 7 | 0 | 2 |
| 2 | 1 | 0 | 3 | 2 | 7 | 6 | 5 | 4 | 2 | 2 | 6 | 5 | 3 | 0 | 1 | 7 | 4 |
| 3 | 0 | 1 | 2 | 3 | 4 | 5 | 6 | 7 | 3 | 3 | 3 | 3 | 3 | 3 | 3 | 3 | 3 |
| 4 | 5 | 6 | 7 | 4 | 3 | 0 | 1 | 2 | 4 | 4 | 5 | 0 | 3 | 7 | 2 | 1 | 6 |
| 5 | 4 | 7 | 6 | 5 | 0 | 3 | 2 | 1 | 5 | 5 | 7 | 1 | 3 | 2 | 6 | 4 | 0 |
| 6 | 7 | 4 | 5 | 6 | 1 | 2 | 3 | 0 | 6 | 6 | 0 | 7 | 3 | 1 | 4 | 2 | 5 |
| 7 | 6 | 5 | 4 | 7 | 2 | 1 | 0 | 3 | 7 | 7 | 2 | 4 | 3 | 6 | 0 | 5 | 1 |

The following illustrative example shows the truth tables of the addition and multiplication that define another alternate finite field GF(8) with neutral element '3'.

| sc8e2 | 0 | 1 | 2 | 3 | 4 | 5 | 6 | 7 | m8e2 | 0 | 1 | 2 | 3 | 4 | 5 | 6 | 7 |
|---|---|---|---|---|---|---|---|---|---|---|---|---|---|---|---|---|---|
| 0 | 3 | 2 | 1 | 0 | 6 | 7 | 4 | 5 | 0 | 0 | 1 | 2 | 3 | 4 | 5 | 6 | 7 |
| 1 | 2 | 3 | 0 | 1 | 5 | 4 | 7 | 6 | 1 | 1 | 4 | 5 | 3 | 2 | 7 | 0 | 6 |
| 2 | 1 | 0 | 3 | 2 | 7 | 6 | 5 | 4 | 2 | 2 | 5 | 6 | 3 | 7 | 0 | 4 | 1 |
| 3 | 0 | 1 | 2 | 3 | 4 | 5 | 6 | 7 | 3 | 3 | 3 | 3 | 3 | 3 | 3 | 3 | 3 |
| 4 | 6 | 5 | 7 | 4 | 3 | 1 | 0 | 2 | 4 | 4 | 2 | 7 | 3 | 5 | 6 | 1 | 0 |
| 5 | 7 | 4 | 6 | 5 | 1 | 3 | 2 | 0 | 5 | 5 | 7 | 0 | 3 | 6 | 1 | 2 | 4 |
| 6 | 4 | 7 | 5 | 6 | 0 | 2 | 3 | 1 | 6 | 6 | 0 | 4 | 3 | 1 | 2 | 7 | 5 |
| 7 | 5 | 6 | 4 | 7 | 2 | 0 | 1 | 3 | 7 | 7 | 6 | 1 | 3 | 0 | 4 | 5 | 2 |

The above shows that there are different alternate fields based on the same addition but with different multiplications.

Figure 27:
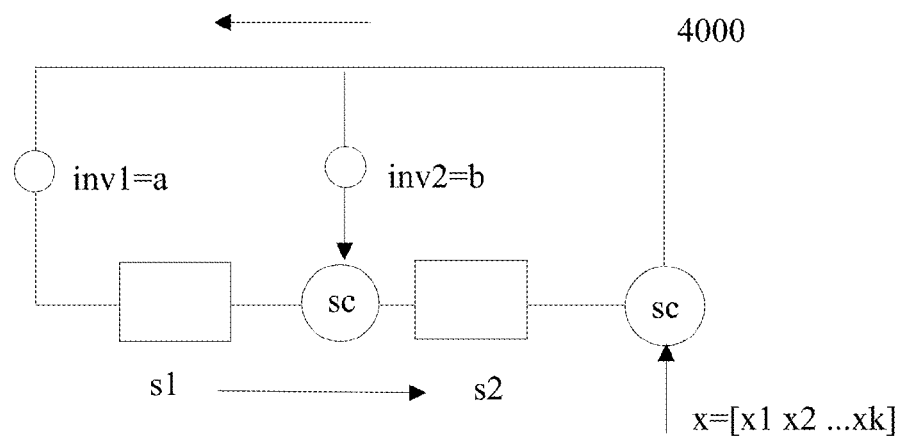
FIG. 27 illustrates a coder in accordance with an aspect of the present invention.

In accordance with an aspect of the present invention a decoder is provided to a Reed Solomon coder that is enabled to detect at least one n-state symbol in error. A diagram of an illustrative encoder 4000 is shown in FIG. 27. The n-state encoder 4000 has an n-state Linear Feedback Shift Register, in this example with 2 shift register elements s1 and s2. As is known in the art this encoder can generate two n-state symbols, which is the content of the shift register after all n-state data symbols x=[x1 x2 ... xk] have been entered into 4000. The encoder implements two n-state additions, which in this case are assumes to be identical additions over alternate finite field GF(n). The two functions may be different functions, but for illustrative purposes they are assumed to be the same. Furthermore, an inverter inv2 is included in a feedback tap and an inverter inv1 is included in the tap into the first shift register element. At least one of inv1 and inv2 is defined by a multiplication over alternate finite field GF(n).

Assume that the sequence of n-state symbols contains 4 n-state symbols [x1 x2 x3 x4], though more symbols may be entered. The shift register starts with an initial content [s1 s2]. Assume that sc is an addition '+' over an alternate finite field GF(n) and inverters inv1 and inv2 are constant multipliers 'a' and 'b' in the alternate finite field. This means that all functions are associate, distributive and commutative and the '+' herein is self reversing. The following table shows the calculated states of the shift register starting with [s1 s2] as x1 and x2 are entered, as developed by executing the functions that are implemented in the coder.

| return | sr1 | sr2 | in |
|---|---|---|---|
|  | s1 | s2 |  |
|  |  |  | x1 + s2 |
| a * (x1 + s2) | a * (x1 + s2) | b * (x1 + s2) + s1 | b * (x1 + s2) + s1 + x2 |
| a * {b * (x1 + s2) + s1 + x2} | a * {b * (x1 + s2) + s1 + x2} | b * {b * (x1 + s2) + s1 + x2} + a * (x1 + s2) |  |

One can see that the expressions in each state as the LFSR advances in processing greatly accumulate in terms. One can take at least two approaches in showing the individual states of the LFSR at each clock cycle: show the evaluated state by performing the expressions for each cycle. However, this requires the actual states of symbols. In an embodiment of the present invention one provides the coefficients of the dependent terms like s1, s2, x1, x2, x3 and x4 etc. The coefficient of a term containing for instance s1 does not depend on any other term, but only on the functions such as additions and multiplications. The end state of the shift register is then dependent on s1, s2, x1, x2, x3 and x4 and can be expressed as c1*s1+c2*s2+c3*x1+c4*x2+c5*x3+c6*x4 and can be represented as [c1 c2 c3 c4 c5 c6]. During processing a term c5*x3 can be achieved by composite processing. As an illustrative example c5*x3=(t1*x3+t2*x3)*t4. Because of properties of the functions in the alternate finite field one can simply apply multiplication and addition to calculate c5=t4*(t1+t2).

The simplest way to represent the states of the shift register is to represent each shift register as dependent upon the variables s1, s2, x1, x2, x3 and x4. For instance the initial content of the first shift register in FIG. 27 is s1 and does not depend on other variables. One can then represent this content as [s1 z z z z z] wherein z is the zero state. The second shift register has initial content [z s2 z z z z]. The first symbol x1 to be entered in the LFSR is then [z z x1 z z z] and so on. In the example field GF(8) with sc8e2 and m8e2 the zero element is 3. To provide a general representation of the states one can use the neutral identity state for the state of s1, s2 etc. To determine an actual state one then substitutes this actual state for the identity state. In the example field the neutral state is 0. (0*x1=x1 for instance). One can then represent s1=[0 3 3 3 3 3]; s2=[3 0 3 3 3 3]; x1=[3 3 0 3 3 3]; x2=[3 3 3 0 3 3]; x3=[3 3 3 3 0 3] and x4=[3 3 3 3 3 0]. Assume that inv2=[4 2 7 3 5 6 1 0] or b=4 and inv1=[1 4 5 3 2 7 0 6] or a=1. Starting the LFSR in initial state [0 0] and with x=[0 0 0 0] the consecutive states of the LFSR as a consequence of entering the 4 symbols is provided in the following table.

|  | sr element 1 | | | | | | sr element 2 | | | | | |
| --- | --- | --- | --- | --- | --- | --- | --- | --- | --- | --- | --- | --- |
|  | s1 | s2 | x1 | x2 | x3 | x4 | s1 | s2 | x1 | x2 | x3 | x4 |
| initial | 3 | 3 | 3 | 3 | 3 | 3 | 3 | 3 | 3 | 3 | 3 | 3 |
| t = 1 | 3 | 3 | 1 | 3 | 3 | 3 | 3 | 3 | 4 | 3 | 3 | 3 |
| t = 2 | 3 | 3 | 2 | 1 | 3 | 3 | 3 | 3 | 4 | 4 | 3 | 3 |
| t = 3 | 3 | 3 | 2 | 2 | 1 | 3 | 3 | 3 | 6 | 4 | 4 | 3 |
| t = 4 | 3 | 3 | 0 | 2 | 2 | 1 | 3 | 3 | 0 | 6 | 4 | 4 |

The end state of the first shift register element is determined by: 3*s1+3*s2+0*x1+2*x2+2*x3+1*x4. So, if the shift register's initial state was [3 3] and x=[0 1 2 3] then the end state of the first shift register element is [3*3+3*3+0*1+2*1+2*2+1*3]=[3+3+1+5+6+3]=0.

Figure 28:
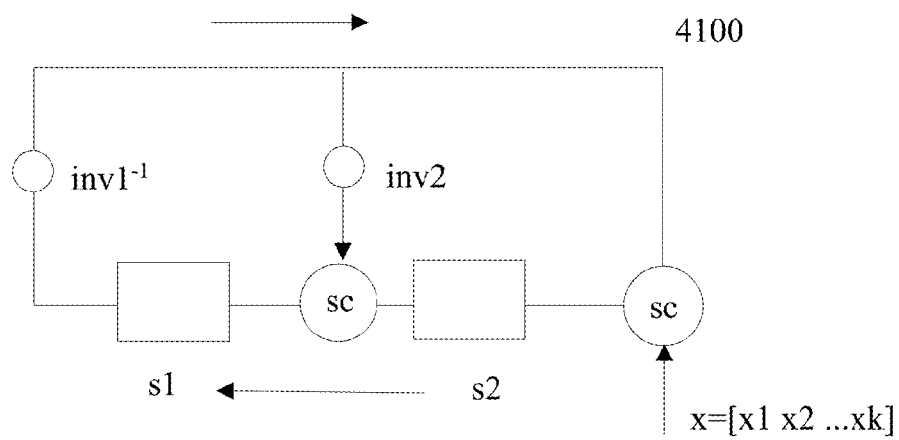
FIG. 28 illustrates a coder in reverse direction in accordance with an aspect of the present invention.

As a further aspect of the present invention a coder such as provided in FIG. 27 is reversed, starting from an end state and entering the symbols of x=[x1 x2 x3 x4] in reverse order. This is shown in FIG. 28 in a coder 4100. The change compared to FIG. 27 is the reversed direction of the flow of symbols. All functions are the same (because the function sc8e2 is self reversing) and inv2 is the same as in FIG. 27. Only the last inverter which was inv1=a is now reversed and should be inv1$^{-1}$ or a$^{-1}$. The reverse of 1 is 6 in this field. In reverse direction the shift register starts with initial end content [s1es2e] wherein s1e and s2e can be determined from the above step. The end state can be represented as: [s1e 3 3 3 3 3] and [3 s2e 3 3 3 3] or as [0 3 3 3 3 3] and [3 0 3 3 3 3]. The symbols entered are x4=[3 3 3 3 3 x1]; x3=[3 3 3 3 x3 3]; x2=[3 3 3 x2 3 3] and x1=[3 3 x1 3 3 3] wherein the state of x1, x2, x3 and x4 can be set to the identity state 0. The following table shows the states of the shift register at each clock stage in reverse order (starting from end state to t=1).

|  | sr element 1 | | | | | | sr element 2 | | | | | |
| --- | --- | --- | --- | --- | --- | --- | --- | --- | --- | --- | --- | --- |
|  | s1 | s2 | x1 | x2 | x3 | x4 | s1 | s2 | x1 | x2 | x3 | x4 |
| t = 1 | 2 | 2 | 3 | 0 | 1 | 0 | 4 | 6 | 0 | 3 | 6 | 0 |
| t = 2 | 2 | 0 | 3 | 3 | 0 | 1 | 6 | 0 | 3 | 0 | 3 | 6 |
| t = 3 | 0 | 1 | 3 | 3 | 3 | 0 | 0 | 6 | 3 | 3 | 0 | 3 |
| t = 4 | 1 | 0 | 3 | 3 | 3 | 3 | 6 | 3 | 3 | 3 | 3 | 0 |
| end state | 0 | 3 | 3 | 3 | 3 | 3 | 3 | 0 | 3 | 3 | 3 | 3 |

All the steps as described above can easily be performed by a processor. If one performs the reverse steps (or down direction) starting with the states as determined in the forward direction (or up direction) then one will arrive at initial shift register state [3 3 3 3 3 3] and [3 3 3 3 3 3] as is to be expected.

If no errors have occurred, all the shift register states going up have to be identical to the shift register states going down or in reverse. As a further aspect of the present invention corresponding states going up and down are compared. Because addition in the alternate finite field is identical to subtraction one may add corresponding states. The sum of corresponding states then has to be the all zero elements or [3 3 3 3 3 3]. The sum (or subtraction) of all corresponding states is shown in the following table.

|  | comparative state sr1 | | | | | | comparative state sr2 | | | | | |
| --- | --- | --- | --- | --- | --- | --- | --- | --- | --- | --- | --- | --- |
|  | s1 | s2 | x1 | x2 | x3 | x4 | s1 | s2 | x1 | x2 | x3 | x4 |
| t = 1 | 2 | 2 | 3 | 0 | 1 | 0 | 4 | 6 | 0 | 3 | 6 | 0 |
| t = 2 | 2 | 0 | 1 | 3 | 0 | 1 | 6 | 0 | 4 | 0 | 3 | 6 |
| t = 3 | 0 | 1 | 2 | 4 | 3 | 0 | 0 | 6 | 4 | 2 | 0 | 3 |
| t = 4 | 1 | 0 | 2 | 5 | 5 | 3 | 6 | 3 | 6 | 2 | 7 | 0 |
| end state | 0 | 3 | 0 | 5 | 6 | 3 | 3 | 0 | 0 | 0 | 7 | 3 |

Because it is known that all comparative states are the zero state (or state 3 in this case) one can now determine if a received symbol was in error. One can see that each comparative state has at least one component that is in state 3. This means that no matter what state that component is, the comparative state is not influenced by the state of such component. For instance comparative state of sr1 at t=1 the comparative state is [2 2 3 0 1 0] and the symbol x1 contributes 3, so it does not depend upon x1. This also means that if x1 is received in error, then the comparative state of sr1 will still be 3 if all other symbols were correct.

As an illustrative example assume that what is received is [s1 s2 x1 x2 x3 x4]=[1 7 0 1 2 3]. Entering these states in the comparative table and evaluating the expressions will lead to:

|  | evaluated comparative states | |
| --- | --- | --- |
|  | sr1 | sr2 |
| t = 1 | 3 | 3 |
| t = 2 | 3 | 3 |
| t = 3 | 3 | 3 |
| t = 4 | 3 | 3 |
| end state | 3 | 3 |

One may conclude that if only one error can occur, then based on this evaluation no error has occurred.

Assume that what is received is [s1 s2 x1 x2 x3 x4]=[1 7 7 1 2 3]. Entering these states in the comparative table and evaluating the expressions will lead to:

|  | evaluated comparative states | |
| --- | --- | --- |
|  | sr1 | sr2 |
| t = 1 | 3 | 5 |
| t = 2 | 7 | 6 |
| t = 3 | 0 | 6 |
| t = 4 | 0 | 2 |
| end state | 5 | 5 |

Because there are comparative states that are not 3 there is a symbol in error. Because sr1 at t=1 is state 3 it can be determined that x1 as received is in error.

As only x1 is in error, the end state of sr1 is not in error. Recall that [s1 s2 x1 x2 x3 x4]=[1 7 7 1 2 3] was received. Thus for instance comparative state sr1 at t=4 should be 3 or: 0*s1+3*s2+0*x1+5*x2+6*x3+3*x3=3. Or: 0*x1=0*1+3*7+5*1+6*2+3*3=1+3+7+4+3=0, which was the correct state of x1.

The outcome of the comparative states depends on the selected inverters. In one embodiment of the present invention one creates a computer program, for instance in Matlab® of The Mathworks of Natick, Mass. that implements the up and down version of an LFSR and determines the comparative states based on different inverters. Preferably at least one inverter is defined by a multiplication over the alternate finite field GF(n) and at least one function sc is defined by the alternate finite field. Based on a selected inverter one can review the comparative states and determine which configuration is most convenient to determine at least one symbol in error.

In accordance with a further aspect of the present invention an LFSR with at least three (3) shift register elements is created to determine three check symbols and send a word of a plurality of data symbols and the at least three check symbols to a receiving device that implements the comparative states calculations as explained herein. This allows the receiving device to determine at least 2 symbols in error. How detectable symbols in error are distributed over a codeword depends on the selected inverters.

In accordance with a further aspect of the present invention a very long sequence, much longer than the number of shift register elements, can be coded this way into a word with only two or more shift register elements. The number of comparative states will increase. However, the method as provided herein will still identify a symbol in error. At least for a small number of errors that appear in a burst of consecutive errors, the herein provided methods can be arranged to provide a fast way to determine an error location and resolve the symbols in error, for instance as compared to standard Reed Solomon methods. This is especially true for detecting one or more consecutive errors in a long sequence or even a very long sequence of symbols.

In one embodiment of the present invention the up/down approach is applied to a sequence of binary symbols. For instance, a coder as illustrated in FIG. 23 is a binary coder with inv1 and inv2 being identity and the '+' being an implementation of a XOR function. The following table shows the comparative state table for this coder with an input of a sequence of 4 bits and an initial shift register state [0 0].

|  | comparative state sr1 | | | | | | comparative state sr2 | | | | | |
| --- | --- | --- | --- | --- | --- | --- | --- | --- | --- | --- | --- | --- |
|  | s1 | s2 | x1 | x2 | x3 | x4 | s1 | s2 | x1 | x2 | x3 | x4 |
| t = 1 | 1 | 1 | 0 | 1 | 1 | 0 | 1 | 0 | 1 | 0 | 1 | 1 |
| t = 2 | 1 | 0 | 1 | 0 | 1 | 1 | 0 | 1 | 1 | 1 | 0 | 1 |
| t = 3 | 0 | 1 | 1 | 1 | 0 | 1 | 1 | 1 | 0 | 1 | 1 | 0 |
| t = 4 | 1 | 1 | 0 | 1 | 1 | 0 | 1 | 0 | 1 | 0 | 1 | 1 |
| end state | 1 | 0 | 1 | 0 | 1 | 1 | 0 | 1 | 1 | 1 | 0 | 1 |

One is reminded that 0 herein means that that symbol does not contribute to the state and 1 means it does. For t=1 one can thus express the two comparative states as sr1→(s1≠s2≠x2≠x3) and sr2→(s1≠x1≠x3≠x4). This means that if bit x1 is in error sr1 will be 0 but sr2 will be 1.

A similar result can be achieved for binary coders with 3 or more shift registers and with binary coders wherein at least one implementation of an EQUAL (=) function or an XOR function with an inverter [1 0] is used.

The above methods for error location and error correction also apply to alternate finite fields for n is smaller than 8. One example is n=4. The following provides an addition and a multiplication over an alternate finite field GF(4).

| sc4 | 0 | 1 | 2 | 3 | m4 | 0 | 1 | 2 | 3 |
| --- | --- | --- | --- | --- | --- | --- | --- | --- | --- |
| 0 | 3 | 2 | 1 | 0 |  | 0 | 1 | 2 | 3 |
| 1 | 2 | 3 | 0 | 1 |  | 1 | 2 | 0 | 3 |
| 2 | 1 | 0 | 3 | 2 |  | 2 | 0 | 1 | 3 |
| 3 | 0 | 1 | 2 | 3 |  | 3 | 3 | 3 | 3 |

Using the configurations of FIGS. 27 and 28 and inv1=[2 0 1 3] or a=2 and inv2=[0 1 2 3] or b=0 and $a^{-1}$=1, will provide the following comparative states.

|  | comparative states sr1 | | | | | | comparative states sr1 | | | | | |
| --- | --- | --- | --- | --- | --- | --- | --- | --- | --- | --- | --- | --- |
|  | s1 | s2 | x1 | x2 | x3 | x4 | s1 | s2 | x1 | x2 | x3 | x4 |
| t = 1 | 3 | 0 | 3 | 0 | 1 | 0 | 1 | 1 | 0 | 3 | 1 | 2 |
| t = 2 | 0 | 0 | 2 | 3 | 0 | 1 | 1 | 2 | 0 | 0 | 3 | 1 |
| t = 3 | 0 | 1 | 2 | 2 | 3 | 0 | 2 | 1 | 1 | 0 | 0 | 3 |
| t = 4 | 1 | 0 | 0 | 2 | 2 | 3 | 1 | 3 | 0 | 1 | 0 | 0 |
| end state | 0 | 3 | 2 | 0 | 2 | 2 | 3 | 0 | 3 | 0 | 1 | 0 |

The state corresponding to t=1 is the initial state. In an example this state should be [3 3]. Assume that a word [s1 s2 x1 x2 x3 x4]=[1 2 3 1 2 0] was received. The evaluated comparative states based on the received word are:

|  | evaluated comparative states | |
| --- | --- | --- |
|  | sr1 | sr2 |
| t = 1 | 3 | 2 |
| t = 2 | 1 | 2 |
| t = 3 | 1 | 0 |
| t = 4 | 2 | 2 |
| end state | 1 | 3 |

From the earlier individual components based comparative states one can see that for t=1 (wherein the comparative state of sr1 is 3) that comparative state sr1 does not depend upon x1, while the other comparative states do. As a check one can also see that the same is the case for the end state of sr2. Accordingly x1 is in error. And one can solve, as before, x1 by solving for instance the expression that determines the comparative end state for sr1. The expression is $0*s1+3*s2+2*x1+0*x2+2*x3+2*x4=3$. Or $2*x1=0*s1+3*s2+0*x2+2*x3+2*x4$. The word [1 2 3 1 2 0] was received or: $2*x1=0*1+3*2+0*1+2*2+0*0=1+3+1+1+1=3$. Or $x1=1^{-1}*3=3$. Thus $x1=3$.

Odd Alternate Finite Fields

In the above alternate finite fields of order $n=2^p$ have been disclosed. As illustrative examples self reversing additions over such fields have been provided. As is known to one of ordinary skill a field can also be over n is an odd number. In particular prime fields wherein n is prime or $Z_n$ are of interest. These and other fields are of interest in certain coders such as Elliptic Curve Coders. In many of these cases the 'normal' field is usually defined by using the modulo-n addition and the modulo-n multiplication. In accordance with an aspect of the present invention an alternate finite field is created over GF(n) wherein n is prime. As an example an alternate finite field over GF(5) is provided that is defined by the following addition and multiplication.

| sc5a | 0 | 1 | 2 | 3 | 4 | m5a | 0 | 1 | 2 | 3 | 4 |
|------|---|---|---|---|---|-----|---|---|---|---|---|
| 0 | 1 | 2 | 3 | 4 | 0 |   | 0 | 1 | 2 | 3 | 4 |
| 1 | 2 | 3 | 4 | 0 | 1 |   | 1 | 3 | 0 | 2 | 4 |
| 2 | 3 | 4 | 0 | 1 | 2 |   | 2 | 0 | 3 | 1 | 4 |
| 3 | 4 | 0 | 1 | 2 | 3 |   | 3 | 2 | 1 | 0 | 4 |
| 4 | 0 | 1 | 2 | 3 | 4 |   | 4 | 4 | 4 | 4 | 4 |

The functions sc5*a* is commutative, associative, it has a '0' element (4) so that "x sc5*a* 4=x" and it is distributive with m5*a* which has a zero element 4 and a neutral element '0' and which function is also commutative and associative. Furthermore, each multiplier has an inverse that is also in the alternate finite field: 0 has itself as inverse, the inverse of 1 is 2, the inverse of 2 is 1, and the inverse of 3 is 3.

The following table provides an addition and multiplication that establish an alternate finite field GF(5).

| sc5b | 0 | 1 | 2 | 3 | 4 | m5b | 0 | 1 | 2 | 3 | 4 |
|------|---|---|---|---|---|-----|---|---|---|---|---|
| 0 | 2 | 3 | 4 | 0 | 1 |   | 0 | 1 | 2 | 3 | 4 |
| 1 | 3 | 4 | 0 | 1 | 2 |   | 1 | 0 | 4 | 3 | 2 |
| 2 | 4 | 0 | 1 | 2 | 3 |   | 2 | 4 | 1 | 3 | 0 |
| 3 | 0 | 1 | 2 | 3 | 4 |   | 3 | 3 | 3 | 3 | 3 |
| 4 | 1 | 2 | 3 | 4 | 0 |   | 4 | 2 | 0 | 3 | 1 |

Each multiplier has an inverse in the field: 0 is the identity; 1 is self reversing; 2 has 4 as inverse and 4 has 2 as inverse.

Other alternate finite fields over GF(5) can also be constructed with 0 as identity element and 1 or 2 as the neutral element.

The following tables provides additions and multiplications that establish an alternate finite field over GF(7).

| sc7a | 0 | 1 | 2 | 3 | 4 | 5 | 6 | m7a | 0 | 1 | 2 | 3 | 4 | 5 | 6 |
|------|---|---|---|---|---|---|---|-----|---|---|---|---|---|---|---|
| 0 | 1 | 2 | 3 | 4 | 5 | 6 | 0 |   | 0 | 1 | 2 | 3 | 4 | 5 | 6 |
| 1 | 2 | 3 | 4 | 5 | 6 | 0 | 1 |   | 1 | 3 | 5 | 0 | 2 | 4 | 6 |
| 2 | 3 | 4 | 5 | 6 | 0 | 1 | 2 |   | 2 | 5 | 1 | 4 | 0 | 3 | 6 |
| 3 | 4 | 5 | 6 | 0 | 1 | 2 | 3 |   | 3 | 0 | 4 | 1 | 5 | 2 | 6 |
| 4 | 5 | 6 | 0 | 1 | 2 | 3 | 4 |   | 4 | 2 | 0 | 5 | 3 | 1 | 6 |
| 5 | 6 | 0 | 1 | 2 | 3 | 4 | 5 |   | 5 | 4 | 3 | 2 | 1 | 0 | 6 |
| 6 | 0 | 1 | 2 | 3 | 4 | 5 | 6 |   | 6 | 6 | 6 | 6 | 6 | 6 | 6 |

All multipliers are also in the alternate finite field.

The following tables also establish an alternate finite field GF(7).

| sc7b | 0 | 1 | 2 | 3 | 4 | 5 | 6 | m7b | 0 | 1 | 2 | 3 | 4 | 5 | 6 |
|------|---|---|---|---|---|---|---|-----|---|---|---|---|---|---|---|
| 0 | 6 | 0 | 1 | 2 | 3 | 4 | 5 |   | 0 | 1 | 2 | 3 | 4 | 5 | 6 |
| 1 | 0 | 1 | 2 | 3 | 4 | 5 | 6 |   | 1 | 1 | 1 | 1 | 1 | 1 | 1 |
| 2 | 1 | 2 | 3 | 4 | 5 | 6 | 0 |   | 2 | 1 | 0 | 6 | 5 | 4 | 3 |
| 3 | 2 | 3 | 4 | 5 | 6 | 0 | 1 |   | 3 | 1 | 6 | 4 | 2 | 0 | 5 |
| 4 | 3 | 4 | 5 | 6 | 0 | 1 | 2 |   | 4 | 1 | 5 | 2 | 6 | 3 | 0 |
| 5 | 4 | 5 | 6 | 0 | 1 | 2 | 3 |   | 5 | 1 | 4 | 0 | 3 | 6 | 2 |
| 6 | 5 | 6 | 0 | 1 | 2 | 3 | 4 |   | 6 | 1 | 3 | 5 | 0 | 2 | 4 |

Again, all multipliers not being the zero element have an inverse in the field.

The following 3-valued or ternary function establishes a standard finite field GF(3).

| sc3 | 0 | 1 | 2 | m3 | 0 | 1 | 2 |
|-----|---|---|---|----|---|---|---|
| 0 | 0 | 1 | 2 |   | 0 | 0 | 0 |
| 1 | 1 | 2 | 0 |   | 0 | 1 | 2 |
| 2 | 2 | 0 | 1 |   | 0 | 2 | 1 |

One can easily check that the following 3-valued or ternary functions also establish an alternate finite field.

| sc3a | 0 | 1 | 2 | m3a | 0 | 1 | 2 |
|------|---|---|---|-----|---|---|---|
| 0 | 1 | 2 | 0 |   | 0 | 1 | 2 |
| 1 | 2 | 0 | 1 |   | 1 | 0 | 2 |
| 2 | 0 | 1 | 2 |   | 2 | 2 | 2 |

| sc3b | 0 | 1 | 2 | m3b | 0 | 1 | 2 |
|---|---|---|---|---|---|---|---|
| 0 | 2 | 0 | 1 | 0 | 0 | 1 | 2 |
| 1 | 0 | 1 | 2 | 1 | 1 | 1 | 1 |
| 2 | 1 | 2 | 0 | 2 | 2 | 1 | 0 |

Figure 32:
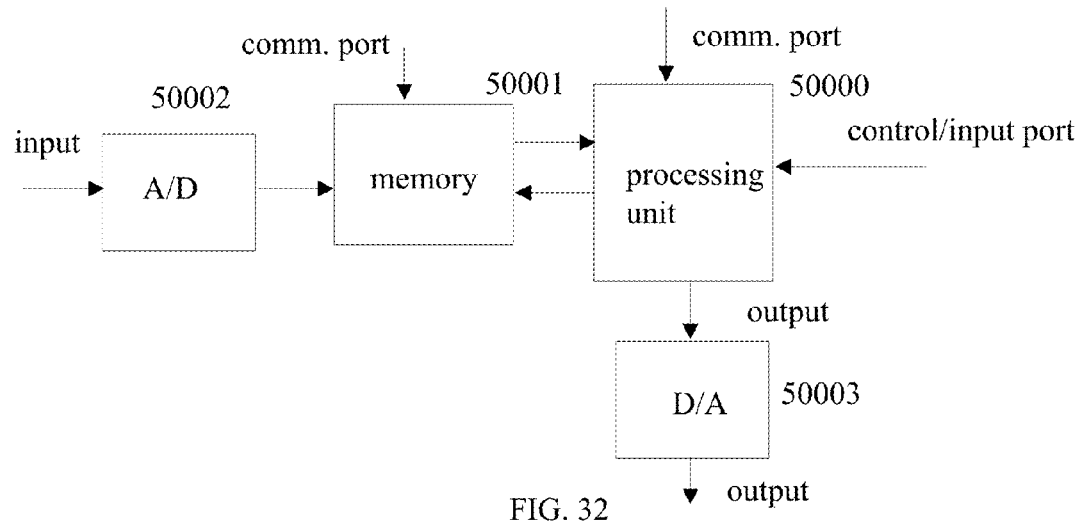
FIG. 32 illustrates a processor based system to perform coding and decoding steps in accordance with an aspect of the present invention.
Figure 33:
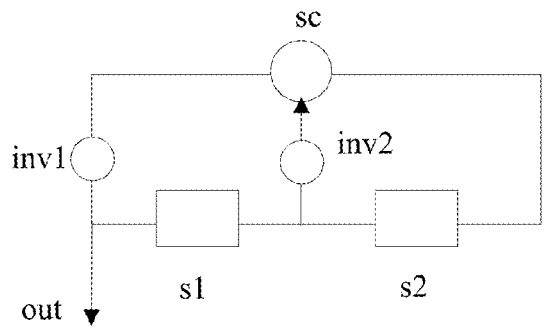
FIG. 33 illustrates a Linear Feedback Shift Register (LFSR) in accordance with an aspect of the present invention.

One can generate the states for an n-state extension field with n=3² with a 2-state LFSR with one of the above 3-state additions and an inverter being one of the inverters in the field in a sequence generator as shown in FIG. 32. For instance with sc being sc3b and inv1 is [0 1 2] and inv2=[2 1 0] as defined by m3b. The following table shows the addition and multiplication over GF(9) that can be generated from this.

| sc9 | 0 | 1 | 2 | 3 | 4 | 5 | 6 | 7 | 8 | m9 | 0 | 1 | 2 | 3 | 4 | 5 | 6 | 7 | 8 |
|---|---|---|---|---|---|---|---|---|---|---|---|---|---|---|---|---|---|---|---|
| 0 | 0 | 1 | 2 | 3 | 4 | 5 | 6 | 7 | 8 | 0 | 0 | 0 | 0 | 0 | 0 | 0 | 0 | 0 | 0 |
| 1 | 1 | 5 | 8 | 4 | 6 | 0 | 3 | 2 | 7 | 0 | 1 | 2 | 3 | 4 | 5 | 6 | 7 | 8 |
| 2 | 2 | 8 | 6 | 1 | 5 | 7 | 0 | 4 | 3 | 0 | 2 | 3 | 4 | 5 | 6 | 7 | 8 | 1 |
| 3 | 3 | 4 | 1 | 7 | 2 | 6 | 8 | 0 | 5 | 0 | 3 | 4 | 5 | 6 | 7 | 8 | 1 | 2 |
| 4 | 4 | 6 | 5 | 2 | 8 | 3 | 7 | 1 | 0 | 0 | 4 | 5 | 6 | 7 | 8 | 1 | 2 | 3 |
| 5 | 5 | 0 | 7 | 6 | 3 | 1 | 4 | 8 | 2 | 0 | 5 | 6 | 7 | 8 | 1 | 2 | 3 | 4 |
| 6 | 6 | 3 | 0 | 8 | 7 | 4 | 2 | 5 | 1 | 0 | 6 | 7 | 8 | 1 | 2 | 3 | 4 | 5 |
| 7 | 7 | 2 | 4 | 0 | 1 | 8 | 5 | 3 | 6 | 0 | 7 | 8 | 1 | 2 | 3 | 4 | 5 | 6 |
| 8 | 8 | 7 | 3 | 5 | 0 | 2 | 1 | 6 | 4 | 0 | 8 | 1 | 2 | 3 | 4 | 5 | 6 | 7 |

One way to generate an alternate field over GF(9) is to for instance determine that the new 'zero' or neutral element of the alternate field is 5. This means that 'a+5=a' or: the row and column corresponding to element 5 should be [0 1 2 3 4 5 6 7 8]. A way to achieve that is to invert the whole truth table of sc9 with the inverse of the column or row of element 5 because $5^{-1}(5)=e$. This means that the new column of element 5 in the inverted truth table should be $[5\ 0\ 7\ 6\ 3\ 1\ 4\ 8\ 2]^{-1}=[1\ 5\ 8\ 4\ 6\ 0\ 3\ 2\ 7]$. The functions sc9a generated by inverting sc9 with the above inverter will create:

| sc9a | 0 | 1 | 2 | 3 | 4 | 5 | 6 | 7 | 8 | m9a | 0 | 1 | 2 | 3 | 4 | 5 | 6 | 7 | 8 |
|---|---|---|---|---|---|---|---|---|---|---|---|---|---|---|---|---|---|---|---|
| 0 | 1 | 5 | 8 | 4 | 6 | 0 | 3 | 2 | 7 | 0 | 1 | 2 | 3 | 4 | 5 | 6 | 7 | 8 |
| 1 | 5 | 0 | 7 | 6 | 3 | 1 | 4 | 8 | 2 | 1 | 0 | 3 | 2 | 7 | 5 | 8 | 4 | 6 |
| 2 | 8 | 7 | 3 | 5 | 0 | 2 | 1 | 6 | 4 | 2 | 3 | 1 | 0 | 8 | 5 | 4 | 6 | 7 |
| 3 | 4 | 6 | 5 | 2 | 8 | 3 | 7 | 1 | 0 | 3 | 2 | 0 | 1 | 6 | 5 | 7 | 8 | 4 |
| 4 | 6 | 3 | 0 | 8 | 7 | 4 | 2 | 5 | 1 | 4 | 7 | 8 | 6 | 2 | 5 | 0 | 3 | 1 |
| 5 | 0 | 1 | 2 | 3 | 4 | 5 | 6 | 7 | 8 | 5 | 5 | 5 | 5 | 5 | 5 | 5 | 5 | 5 |
| 6 | 3 | 4 | 1 | 7 | 2 | 6 | 8 | 0 | 5 | 6 | 8 | 4 | 7 | 0 | 5 | 3 | 1 | 2 |
| 7 | 2 | 8 | 6 | 1 | 5 | 7 | 0 | 4 | 3 | 7 | 4 | 6 | 8 | 3 | 5 | 1 | 2 | 0 |
| 8 | 7 | 2 | 4 | 0 | 1 | 8 | 5 | 3 | 6 | 8 | 6 | 7 | 4 | 1 | 5 | 2 | 0 | 3 |

One should first check if sc9a is associative. One can create m9a by first setting column and row of 5 to all 5 (as this is now the neutral element). Furthermore, one can determine all reversible 9-state inverters that are distributive with sc9a and construct the truth table m9a from the compliant inverters. A simple computer program will demonstrate that sc9a and m9a are distributive. There is a zero element, the multiplication has an identity (0), all non-zero elements in the field have an inverse that is also in the field, the functions are commutative. Accordingly, sc9a and m9a establish an alternate finite field GF(9). Other alternate finite fields can be constructed in a similar way.

Galois Field (or finite field) arithmetic is widely used in cryptography. The applied fields can be for instance a field GF(p) with p being prime, or extension fields GF(p^m) with p being prime and m>1, wherein p preferably is 2, or composite fields GF((p^m)^r) with p being prime and m and r>1, or a prime field such as a Mersenne prime field GF(n) or any other finite field with n≈p^m and preferably n≈2^m. For instance Odd Characteristic Extension Fields including Optimal Extension Fields are known that are defined over GF(n)=GF(2^m±c) as disclosed for instance in U.S. Pat. No. 7,069,287 issued on Jun. 27, 2006 to Paar et al. which is incorporated herein by references. One application of finite field arithmetic is in Elliptic Curve cryptography, wherein product symbols based on an elliptic curve over a finite field is generated from the to be coded symbols and random numbers. How to apply a Galois Field in elliptic curve cryptography is also disclosed in U.S. Pat. No. 5,351,297 issued on Sep. 27, 1994 to Miyaji et al. which is incorporated herein by reference. The use of binary fields or binary extension fields in elliptic curve cryptography is disclosed in U.S. Pat. No. 6,721,771 issued on Apr. 13, 2004 to Chang which is incorporated herein by reference.

In elliptic curve coding repetitive addition also called scalar multiplication is applied for for instance doubling of a point on an elliptic curve. A new point Q on such a curve is for instance found by addition such that 2P=P+P. And 3P=2P+P, and kP=P+P+ . . . P (k times). The '+' operator is herein defined as the addition over a finite field, for instance over an alternate finite field. This 'doubling' and 'scalar multiplication' is the basis for Elliptic Curve Coding, which can be performed in a finite field, and in one embodiment of the present invention it is performed in an alternate finite field.

It has been shown already above that alternate finite fields exists for binary, binary extension fields and prime fields and prime extension finite fields. Any field (if it is a traditional or an alternate field) as is known in the art has a minimal set of common properties. However, where at least one class of alternate finite fields differ from traditional finite fields is that the neutral or 'zero' element is not 0. Name the neutral element 'e' and 'a' is any element in a finite field not being 'e' then 'e' is defined as 'a+e=a' with '+' being the addition over the field and wherein the neutral element 'e' is not 0 in at least one class of alternate finite fields. A parallel definition in the alternate finite field is related to the multiplication '*' over the finite field. Herein 'e*a=e' for all states of 'a' including all states not being 'e' and wherein 'e' is not '0'. As the same field properties to traditional finite fields apply to alternate finite fields one may define an elliptic curve over an alternate finite field and develop the cryptography over that elliptic curve in a similar way as in the traditional finite field but now by applying the alternate finite field. In general one applies finite field arithmetic by using a modulo-polynomial calculation. However, a much faster way is to either store the truth table or calculate the elements of the truth table from a known inversion as was explained above. This allows for very fast calculations in binary logic if one so desires. Thus an embodiment is provided of an elliptic curve encoder and a corresponding decoder that applies addition and multiplication (and division when required) over an alternate finite field.

Figure 34:
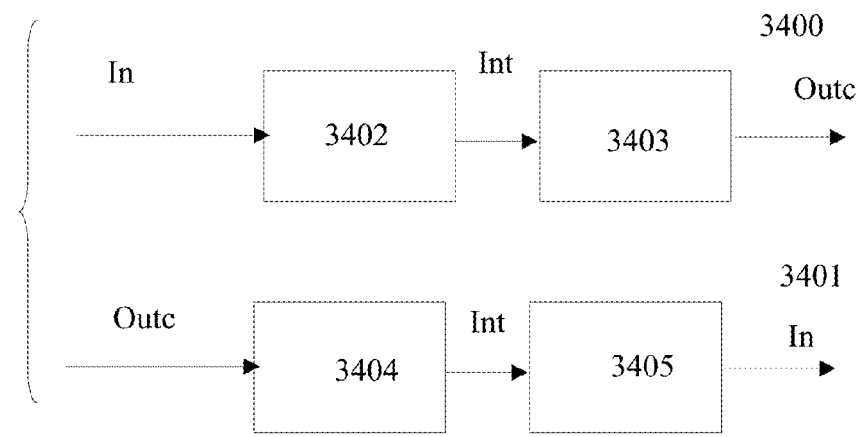
FIGS. 34 and 35 illustrate a coder in accordance with an aspect of the present invention.
Figure 35:
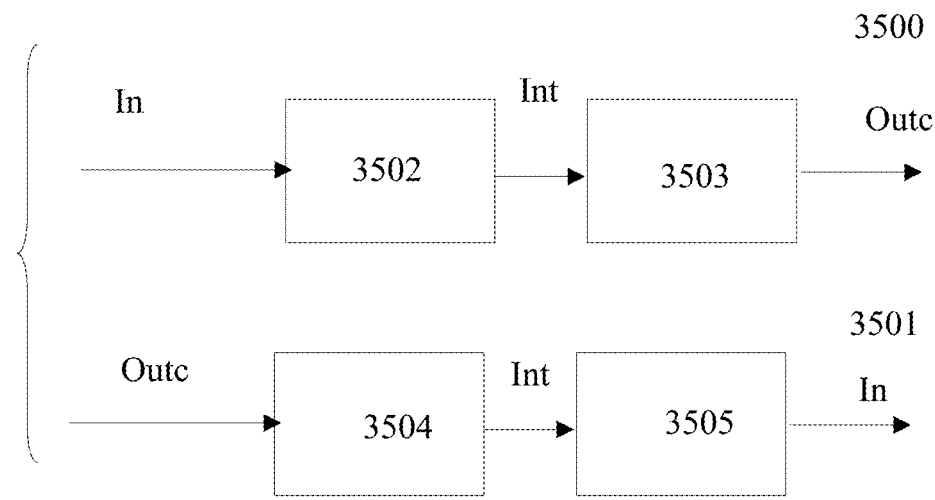

An encoder is provided that modifies the statistical distribution of symbols in a coded message as disclosed in U.S. Pat. No. 7,659,838 issued on Feb. 9, 2010 to Lablans, which is incorporated herein by reference. In one embodiment of the present invention as illustrated in FIG. 34 a coder 3400 with a corresponding decoder 3401 is provided. The encoder 3400 in one embodiment of the present invention has a first coding stage 3402 in accordance with an encoding method as herein provided an using at least an implementation of an addition over an alternate finite field and preferably an addition over an alternate finite field and an inverter defined by a multiplication over an alternate finite field with an input sequence of symbols In, that generates a sequence Int of symbols. Sequence Int is provided to an encoding state 3403 which modifies the statistical distribution of symbols without changing the number of symbols to generate sequence Outc. For decoding by a decoder 3401 a received sequence Outc is provided on decoding stage 3404 which reverses 3403 to generate Int with the previous statistical distribution of symbols which is provided to decoding stage 3405 which reverses encoder 3402 to generate original sequence In. An encoding step may be preceded or succeeded by signal processing including modulation, demodulation, detection, amplification or other signal processing as is known in the art. FIG. 35 illustrates an encoder 3500 wherein 3502 performs modification of statistical distribution of symbols and 3503 performs an encoding process in accordance with a method as provided herein using at least an implementation of an addition over an alternate finite field and preferably an addition over an alternate finite field and an inverter defined by a multiplication over an alternate finite field. FIG. 35 also illustrates a decoder 3501 with 3504 reversing 3503 and 3505 reversing 3502.

The above approaches also apply to the generation of other classes of alternate fields $GF(q^p)$ with q≥2 and p≥1 or p≥2.

An alternate finite field GF(n) is not a classical finite field. The existing literature in Field Theory uses in general 0 as the neutral element or as the zero element 'e' of a field so that 'a+e=e'. At least one class of an alternate finite field GF(n) herein is defined as the field GF(n) defined by the addition scn wherein an element not represented by the field element 0 is the neutral element and by a corresponding multiplication. It is noted that a field can be defined by a single addition and one of a plurality of possible multiplications.

In accordance with an aspect of the present invention an implementation of at least one addition over an alternate finite field GF(n) and at least one inverter defined by a multiplication over an alternate finite field GF(n) with n≥3 is applied in an encoder as provided herein.

In accordance with an aspect of the present invention an implementation of at least one addition over an alternate finite field GF(n) and at least one inverter defined by a multiplication over an alternate finite field GF(n) with n>3 is applied in an encoder as provided herein.

In accordance with an aspect of the present invention an implementation of at least one addition over an alternate finite field GF(n) and at least one inverter defined by a multiplication over an alternate finite field GF(n) with n>4 is applied in an encoder as provided herein.

In accordance with an aspect of the present invention an implementation of at least one n-state function which is defined by a truth table that is a reduction of an addition over an alternate finite field GF(n) and at least one inverter defined by a multiplication over an alternate finite field GF(n) with n≥3 is applied in an encoder as provided herein.

In accordance with an aspect of the present invention an implementation of at least one n-state function which is defined by a truth table that is a reduction of an addition over an alternate finite field GF(n) and at least one inverter defined by a multiplication over an alternate finite field GF(n) with n≥3 is applied in an encoder as provided herein.

In accordance with an aspect of the present invention an implementation of at least one n-state function which is defined by a truth table that is a reduction of an addition over an alternate finite field GF(n) and at least one inverter defined by a multiplication over an alternate finite field GF(n) with n>3 is applied in an encoder as provided herein.

In accordance with an aspect of the present invention an implementation of at least one n-state function which is defined by a truth table that is a reduction of an addition over an alternate finite field GF(n) and at least one inverter defined by a multiplication over an alternate finite field GF(n) with n>4 is applied in an encoder as provided herein.

In accordance with an aspect of the present invention an alternate binary finite field is defined by an addition being the EQUAL (or =) function and a multiplication being the NAND function. Extension fields created from the EQUAL and the NAND function from primitive or minimal polynomials may also be called alternate finite fields. However, they may also be considered as a different type of alternate finite field compared to those that cannot be generated from primitive or minimal polynomials only.

In accordance with an aspect of the present invention an encoder that is provided in accordance with an aspect of the present invention is provided with a corresponding decoder.

In accordance with an embodiment of the present invention an encoder and a corresponding decoder use at least an implementation of an addition over an alternate finite field GF(n). In such an embodiment inverters may be used or the addition may be modified in accordance with an inverter. In a further embodiment an inverter defined by a multiplication defining the alternate finite field GF(n) is required or an implementation of an addition in accordance with an inverter over the alternate finite field is required.

In some cases only illustrative examples of a 4-state or an 8-state or an n-state encoder and or decoder is provided. It is fully contemplated that similar encoders and decoders in any of the alternate finite fields GF(n) can easily be constructed by one of ordinary skill without undue experimentation. Any additional effort may come from the increased number of states of GF(n>n1) if n1 is greater than n and not from different principles.

Figure 29:
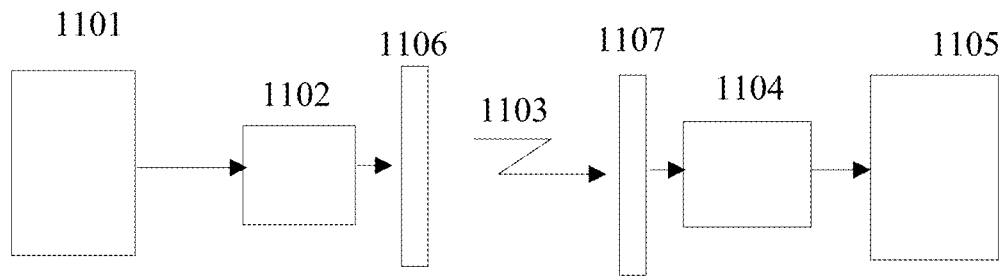
FIG. 29 illustrates a communication system in accordance with an aspect of the present invention.

In accordance with a further aspect of the present invention the here provided methods of encoding and decoding are used in a system, such as a communication system. Such a communication system may be a wired system or a wireless system. Such a system may be used for data transmission, telephony, video or any other type of transfer of information. A diagram of such a system is provided in FIG. 29. Herein 1101 is a source of information. The information is provided to a coder 1102. The information provided to a coder 1102 may already be in a digital form. It may also be converted into digital form by the coder 1102. The coder 1102 creates the coded symbols in a signal. The codewords are organized in such a way that up to a number of symbols in error can be identified as such. The thus created codewords may be provided directly to a transmission medium 1103 for transmission. They may also be provided to a modulator/transmitter 1106 that will modify the digital coded signal provided by 1102 to a form that is appropriate for the medium 1103. For instance 1106 may create an optical signal or an electrical signal. Modulator 1106 may also be a radio transmitter, which will modulate the signal on for instance a carrier signal, and wherein 1103 is a radio connection.

At the receiving side a receiver 1107 may receive, amplify, and demodulate the signal coming from 1103 and provide a digital signal to a decoder 1104. The decoder 1104 applies the methods provided herein to decode symbols including correcting symbols in error. A decoded and/or error corrected signal is then provided to a target 1105. Such a target may be a radio, a phone, a computer, a tv set or any other device that can be a target for an information signal. A coder 1102 may also provide additional coding means, for instance to form a concatenated or combined code. Additional information, such as synchronization or ID information, may be inserted during the transmission and/or coding process.

Figure 30:
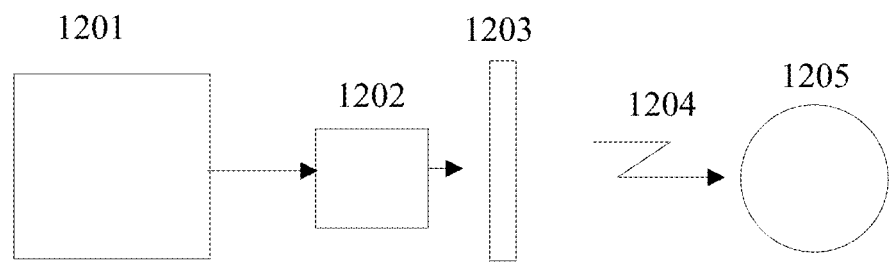
FIG. 30 illustrates part of a data storage system in accordance with an aspect of the present invention.

In accordance with another aspect of the present invention the here provided methods and apparatus for coding including error correcting coding and decoding including error correcting decoding of signals can also be applied for systems and apparatus for storage of information. For instance data stored on a CD, a DVD, a magnetic tape or disk or in mass memory in general may benefit from error correcting coding. A system for storing symbols coded in accordance with an aspect of the present invention is shown in diagram in FIG. 30. A source 1201 provides the information to be coded. This may be audio, video or any information data. The data may already be presented in n-valued symbols by 1201 or may be coded in such a form by 1202. Unit 1202 may create code words of a plurality of data symbols with added check symbols as described herein as another aspect of the present invention. The thus created coded symbols may be provided directly to a channel 1204 for transmission to an information carrier 1205. The information carrier 1205 may be an optical disk, an electro-optical disk, a magnetic disk, a magnetic tape, a flash memory device or any other device or medium that can store information. In general a modulator/data writer 1203 will be required to write a signal to a carrier 1205. For instance the channel may require optical signals, electrical signals or it may require magnetic or electro-magnetic or electro-optical signals. Modulator/data writer 1203 will create a signal that can be written via channel 1204 to a carrier 1205. Additional information such as for ID and/or synchronization may be added to the data.

Figure 31:
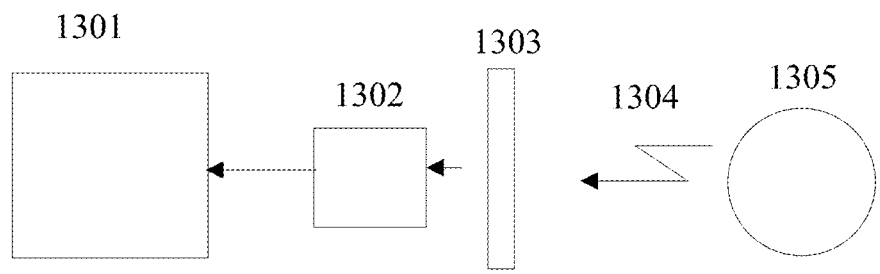
FIG. 31 illustrates another part of a data storage system in accordance with another aspect of the present invention.

FIG. 31 shows a diagram for decoding information read from a carrier 1305. The information is read through a channel 1304 (such as an optical channel or electrical or magnetic or electro-magnetic or electro-optical channel) and provided in general to a detector 1303 that will receive and may amplify and/or demodulate the signal. The signal is then provided to a decoder 1302. The information signal, possibly readied for presentation as an audio or video signal or any other form is then provided to a target 1301. The target 1301 may be a video screen, a compute, a radio or any other device that can use the decoded signal.

The methods and apparatus here provided can be implemented using a general processor, a dedicated signal processor or customized logic. N-valued symbols may be processed as binary words, being created from n-valued symbols by Analog/Digital converters. After being processed n-valued signals may be created from binary words by applying Digital/Analog converters. Switching functions may be created as customized n-valued circuits. For instance U.S. Pat. No. 6,133,754 by Olson, issued Oct. 17, 2000 entitled "Multiple-valued logic circuit architecture; supplementary symmetrical logic circuit structure (SUS-LOC)" discloses embodiments of n-valued CMOS switches. In United States Patent Application, application Ser. No. 11/000,218 filed Nov. 30, 2004 entitled "Single and composite binary and multi-valued logic functions from gates and inverters" which is incorporated herein by reference in its entirety, it is shown how n-valued logic circuits can be created. N-state logic embodiments, for instance using look-up tables are also contemplated.

It has been shown in for instance U.S. Published Patent Publication Ser. No. 2007009160 to Lablans published on May 3, 2007 which is incorporated herein by reference in its entirety that an LFSR, with may be part of a scrambler or a descrambler is implemented in an addressable memory and using an implementation of an n-state switching function. In one embodiment of the present invention an LFSR implemented with an addressable memory applies an implementation of an addition over an alternate finite field, or an implementation of an addition over an alternate finite field and an inverter defined by a multiplication over an alternate finite field, or an implementation of a single truth table of an addition over an alternate finite field modified by an inverter defined by a multiplication over an alternate finite field.

In some encipherment applications security comes from large finite fields GF(n), preferably with n being prime and in certain cases with n≈$2^p$ to facilitate binary execution. Elliptic Curve Coding coders and AES coders are an example of that. In accordance with an aspect of the present invention instead of n being a large prime, n can be a much smaller integer but with many different alternate finite fields are used. For instance n=251 (which can be represented by 8 bits) has hundreds of alternate finite fields. Furthermore, there are different alternate finite fields having the same addition but different multiplications as was shown herein. In a coder and a decoder instead of one large finite field or one large alternate finite field many different smaller alternate finite fields are applied. And rather than calculating a state in a finite field by applying complex Galois field or polynomial arithmetic the states are stored in an addressable memory, which makes processing much faster. Additional security is introduced by determining which alternate finite field to apply for instance based on a key or a pseudo-random sequence of symbols. In a further embodiment of the present invention, the order of alternate finite fields is changed per message, per time period or by any other pre-determined parameter that can be synchronized between sender and receiver.

FIG. 32 illustrates a processor in accordance with an aspect of the present invention. A processing unit 50000 is provided to process at least binary words that represent an n-state symbol. The processing unit may also implement circuitry that implements n-state logic tables. The processing unit has at least one input/control port to provide the processing units directly with input and/or control signals. The processing unit may also have a communication port to receive external data. While the processing unit may have its own internal memory, preferably it is bi-directionally connected to a memory 50001 to store and retrieve data and instructions. The memory may work in binary mode or as a non-binary memory. If the memory is a binary memory then if non-binary symbols are provided as non-binary signals a converter such as an A/D 50002 converts non-binary signals to binary words that are stored in 50001. The processing unit process the n-state symbols in accordance with the herein provided encoding and/or decoding methods over an alternate finite field GF(n) and provides the result on an output. If the processing unit operates on binary words a converter such as a D/A converter 50003 generates non-binary signals from the binary words.

It is again noted that a finite field and an alternate finite field are defined by an addition and a multiplication. In one embodiment of the present invention it is a requirement that an encoder or a corresponding decoder applies at least an implementation of an addition over an alternate finite field. This automatically requires that a multiplication over the alternate finite field also exists, even if such multiplication or an inverter defined by such multiplication is not used. This means that an addition over a classical field GF(6) does not exist. Such an addition conceivably would be a modulo-6 addition. However, no set of multiplications in combination with the modulo-6 addition exists to create a finite field. Accordingly, an addition over a finite field, be it a classical field or a class of alternate fields, requires a corresponding multiplication.

As an example of a small alternate finite field that defines a group over an elliptic curve an illustrative example will be provided for n=8 which will be applied to an example as provided on the website of Certicom® of Mississauga, Canada with URL of pages <URLwww.certicom.com/index.php/44-quiz-3> and <URLwww.certicom.com/index.php/44-quiz-3—solutions>. The page defines a field GF(8) defined by the polynomial $x^3+x+1$ and provides an elliptic curve $y^2+xy=x^3+g^2x^2+g^6$. Rather than working in binary represented states, the truth table of classical addition and multiplication over this field can be provided as follows:

| sc8clas | 0 | 1 | 2 | 3 | 4 | 5 | 6 | 7 | m8clas | 0 | 1 | 2 | 3 | 4 | 5 | 6 | 7 |
|---|---|---|---|---|---|---|---|---|---|---|---|---|---|---|---|---|---|
| 0 | 0 | 1 | 2 | 3 | 4 | 5 | 6 | 7 | 0 | 0 | 0 | 0 | 0 | 0 | 0 | 0 | 0 |
| 1 | 1 | 0 | 4 | 7 | 2 | 6 | 5 | 3 | 0 | 1 | 2 | 3 | 4 | 5 | 6 | 7 | |
| 2 | 2 | 4 | 0 | 5 | 1 | 3 | 7 | 6 | 0 | 2 | 3 | 4 | 5 | 6 | 7 | 1 | |
| 3 | 3 | 7 | 5 | 0 | 6 | 2 | 4 | 1 | 0 | 3 | 4 | 5 | 6 | 7 | 1 | 2 | |
| 4 | 4 | 2 | 1 | 6 | 0 | 7 | 3 | 5 | 0 | 4 | 5 | 6 | 7 | 1 | 2 | 3 | |
| 5 | 5 | 6 | 3 | 2 | 7 | 0 | 1 | 4 | 0 | 5 | 6 | 7 | 1 | 2 | 3 | 4 | |
| 6 | 6 | 5 | 7 | 4 | 3 | 1 | 0 | 2 | 0 | 6 | 7 | 1 | 2 | 3 | 4 | 5 | |
| 7 | 7 | 3 | 6 | 1 | 5 | 4 | 2 | 0 | 0 | 7 | 1 | 2 | 3 | 4 | 5 | 6 | |

The curve then should be written as $y^2+xy=x^3+3x^2+7$. One can easily check that the following points in the field lie on the curve: (2,0) and (2,2), (4,5) and (4,7) and (0,4) as was provided in the Certicom® example. The points (1,0) and (1,1), (6,0) and (6,6) among others also lie on the curve. The coordinates of 2P of P=(4,1) can be determined as (5,2). As the correct solution for developing 2P one should apply the formula yR=s(xP+xR)+xR+yP, which leads to 2P=(5,2).

In an alternate scenario one uses the alternate finite field defined by:

| sc8e2 | 0 | 1 | 2 | 3 | 4 | 5 | 6 | 7 | m8e2 | 0 | 1 | 2 | 3 | 4 | 5 | 6 | 7 |
|---|---|---|---|---|---|---|---|---|---|---|---|---|---|---|---|---|---|
| 0 | 3 | 2 | 1 | 0 | 6 | 7 | 4 | 5 | 0 | 1 | 2 | 3 | 4 | 5 | 6 | 7 | |
| 1 | 2 | 3 | 0 | 1 | 5 | 4 | 7 | 6 | 1 | 4 | 5 | 3 | 2 | 7 | 0 | 6 | |
| 2 | 1 | 0 | 3 | 2 | 7 | 6 | 5 | 4 | 2 | 5 | 6 | 3 | 7 | 0 | 4 | 1 | |
| 3 | 0 | 1 | 2 | 3 | 4 | 5 | 6 | 7 | 3 | 3 | 3 | 3 | 3 | 3 | 3 | 3 | |
| 4 | 6 | 5 | 7 | 4 | 3 | 1 | 0 | 2 | 4 | 2 | 7 | 3 | 5 | 6 | 1 | 0 | |
| 5 | 7 | 4 | 6 | 5 | 1 | 3 | 2 | 0 | 5 | 7 | 0 | 3 | 6 | 1 | 2 | 4 | |
| 6 | 4 | 7 | 5 | 6 | 0 | 2 | 3 | 1 | 6 | 0 | 4 | 3 | 1 | 2 | 7 | 5 | |
| 7 | 5 | 6 | 4 | 7 | 2 | 0 | 1 | 3 | 7 | 6 | 1 | 3 | 0 | 4 | 5 | 2 | |

One curve is defined as $y^2+xy=x^3+x^2+4$. The terms without coefficient actually have coefficient 0 in accordance with the field and the curve over the alternate finite field is $0*y^2+0*xy=0*x^3+0*x^2+4$. Points in the alternate finite field that lie on the curve are: (0,5) and (0,7); (1,0) and (1,2); (4,1) and (4,5) and (3,1). These points are generated by evaluating all points of the finite field and checking if they are one the curve. One can easily check that for all generated points on the curve (−P)=(xP, xP+yP) when P=(xP, yP) wherein '+' is sc8*e*2. Determining 2P when P is (4,1) using the proper addition and multiplication rules over the alternate finite field will lead to: 2P=(0,6). Accordingly, it has been shown that the calculations as required for elliptic curve coding in a finite field can also be performed in an alternate finite field.

The multiplication 'm8*clas*' is a standard or classical multiplication over GF(8). It is characterized by a shift in position of part of a column in its truth table compared to a preceding or a succeeding column. Other, non-classical or non-standard, multiplications over GF(n) for n>7, and/or n>31 and/or n>200 in a further definition of a finite alternate field define a zero-alternate finite field wherein the neutral element is 0. As is disclosed herein, an alternate finite field in yet another definition is defined as a multi-alternate finite field when is has two different multiplication with neutral element 0.

In one embodiment of the present invention an encoder or a decoder includes an implementation of a multiplication over an alternate finite field. If a constant multiplier or an equivalent inverter is required one can provide a constant input symbol on at least one input of such a multiplication which then in effect implements a constant multiplier.

For smaller finite fields and alternate finite fields it is attractive to store the complete truth table in an addressable memory. This may not be desirable for higher order fields. In that case it is desirable to de-construct a Galois Field calculation to one that involves an addition over a standard GF($2^p$) so that a relatively simple XOR-ing can be applied. As an example an alternate 4-state Galois Field is used defined by the following truth tables.

| sc4a | 0 | 1 | 2 | 3 | m4a | 0 | 1 | 2 | 3 |
|---|---|---|---|---|---|---|---|---|---|
| 0 | 1 | 0 | 3 | 2 |  | 0 | 1 | 2 | 3 |
| 1 | 0 | 1 | 2 | 3 |  | 1 | 1 | 1 | 1 |
| 2 | 3 | 2 | 1 | 0 |  | 2 | 1 | 3 | 0 |
| 3 | 2 | 3 | 0 | 1 |  | 3 | 1 | 0 | 2 |

A Galois Field is defined by an addition and a multiplication over GF(n) that are commutative, associative and distributive and that has in the field a neutral element 'e' so that {a=a+e} and {a+(−a)=e}. In a standard Galois Field e is usually 0. So, one definition of an alternate Galois Field is that the neutral element is not 0. Another definition is wherein a multiplication is not a standard multiplication. A standard multiplication in a Galois Field in one embodiment of the present invention is defined by a generating polynomial of the field. Other definitions of an alternate Galois Field are also possible. In the above field the zero-element is 1. The combination is commutative, associative and distributive. The function m4*m* above is not a standard multiplication.

Figure 37:
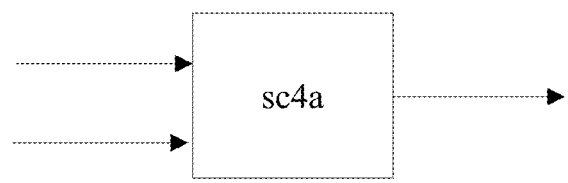
FIGS. 37-38 illustrate implementing an n-state logic function in accordance with an aspect of the present invention.

FIG. 37 illustrates a device implementing the function sc4*a*. FIG. 38 illustrates a different device implementing the same addition sc4*a* by first implementing a truth table sc4 followed by an inverter 'inv' which inverts the output states. The standard addition sc4 over GF(4) has been provided earlier herein. It is inverted by an inverter inv.

Figure 36:
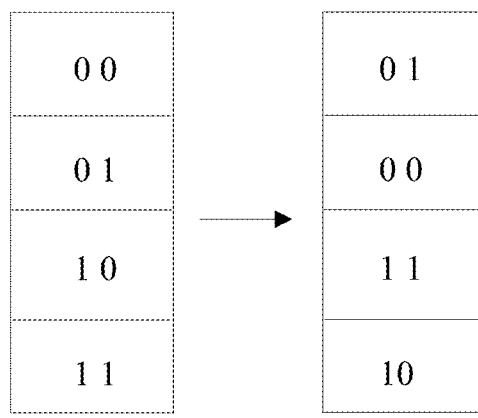
FIG. 36 illustrates an n-state inverter with n=4 in accordance with an aspect of the present invention.

The inverter inv is for instance [0 1 2 3]→[1 0 3 2] (or [1 2 3 4]→[2 1 4 3] if one works in an origin 1 system). Such an inverter in one embodiment of the present invention is implemented in a binary look-up table in a memory, which is illustrated in FIG. 36. The truth table of sc4 is a 'standard' addition over GF(n) can be realized by XOR-ing the binary words representing the n-state symbols. The inverters can be realized by memory storing look-up tables. This approach works for any truth table over GF(n) that can be deconstructed into an n-state truth table that can be realized by at least an n-state truth table that can be realized by XOR-ing binary words followed by an n-state inverter, for instance in a memory look-up table, that inverts the output states in accordance with an inverter. Additional Galois Field operations can be realized by including additional inverters, for instance defined by rows or columns from m4*a*.

Yet another alternate Galois Field GF(8) or alternate finite field for GF($2^3$) is illustrated by the following truth tables of an addition sc8*m* and a multiplication m8*m* over GF(8).

| sc8m | 0 | 1 | 2 | 3 | 4 | 5 | 6 | 7 | m8m | 0 | 1 | 2 | 3 | 4 | 5 | 6 | 7 |
|---|---|---|---|---|---|---|---|---|---|---|---|---|---|---|---|---|---|
| 0 | 7 | 3 | 6 | 1 | 5 | 4 | 2 | 0 |  | 0 | 1 | 2 | 3 | 4 | 5 | 6 | 7 |
| 1 | 3 | 7 | 5 | 0 | 6 | 2 | 4 | 1 |  | 1 | 2 | 3 | 5 | 6 | 4 | 0 | 7 |
| 2 | 6 | 5 | 7 | 4 | 3 | 1 | 0 | 2 |  | 2 | 3 | 5 | 4 | 0 | 6 | 1 | 7 |
| 3 | 1 | 0 | 4 | 7 | 2 | 6 | 5 | 3 |  | 3 | 5 | 4 | 6 | 1 | 0 | 2 | 7 |
| 4 | 5 | 6 | 3 | 2 | 7 | 0 | 1 | 4 |  | 4 | 6 | 0 | 1 | 3 | 2 | 5 | 7 |
| 5 | 4 | 2 | 1 | 6 | 0 | 7 | 3 | 5 |  | 5 | 4 | 6 | 0 | 2 | 1 | 3 | 7 |
| 6 | 2 | 4 | 0 | 5 | 1 | 3 | 7 | 6 |  | 6 | 0 | 1 | 2 | 5 | 3 | 4 | 7 |
| 7 | 0 | 1 | 2 | 3 | 4 | 5 | 6 | 7 |  | 7 | 7 | 7 | 7 | 7 | 7 | 7 | 7 |

As discussed, a finite field is defined by the elements in the field, an addition over the field which should be associative, the addition should be commutative, and the addition should have a zero element. Furthermore, the field is defined by a multiplication, which should be distributive with the addition and each multiplication should be commutative and associative and should have a reverse, which should also be in the field. One can check that sc8*m* and m8*m* meet the requirements for a finite field. Because the 'zero' or 'neutral' element is 7 and not 0, the above field meets at least one definition for an alternate finite field.

The above alternate finite field can for instance be used in a simple Elliptic Curve Coding (ECC) encryption application as illustrated in the modified Certicom® example.

Finite fields and certainly finite fields over GF($2^p$) with p>1 are generally represented as 'modulo-polynomial' using complete binary representations. Very seldom are the truth tables provided of the n-state addition and n-state multiplication. If the truth tables are provided at all, they are immediately related to standard or generic binary representations or in a related conceptual representation which does not really provide actual n-state tables. Examples are the earlier mentioned Sklar article and U.S. Pat. No. 4,162,480 to Berlekamp issued on Jul. 24, 1979, which is incorporated herein by reference. In further embodiments of the present invention truth tables of addition and/or multiplication over a finite field GF(n) are stored in an addressable memory, including bit not limited to: with n>2; with n=$2^p$ with p>1; and with n=$2^p$ with p>7. In yet one or more embodiments of the present invention a truth table of an addition over finite field GF(n) modified in accordance with an n-state inverter is stored in an addressable memory including but not limited to: with n>2; with n=$2^p$ with p>1; and with n=$2^p$ with p>7. In accordance with yet another embodiment of the present invention the finite fields of the above embodiments are alternate finite fields. In accordance with yet another aspect of the present invention an n-state inverter is defined by a multiplication over a finite field GF(n), wherein the finite field in one embodiment is an alternate finite field. In accordance with yet another aspect of the present invention an n-state inverter is defined by a multiplication over a finite field GF($2^p$), wherein the finite field in a further embodiment is an alternate finite field including but not limited to p>1, p>5 and p>7.

Current coders, decoders and apparatus that apply an addition and/or a multiplication over GF(n) usually implement these functions in binary logic defining GF(n) states in terms of a generating polynomial. Certainly for binary extension fields GF($2^p$) an addition over GF($2^p$) is relatively simple to implement with XOR switches. Multiplications over GF($2^p$) may be implemented as a shift operation. However, a true multiplication of two variables over GF($2^p$) is quite involved. Furthermore, division over GF($2^p$) in binary switching rather than memory form is also fairly complex. Executing arithmetical operations such as addition, multiplication and division is much faster by using a truth table stored in an addressable memory. One should keep in mind that a multiplicative inverse (division) in a finite field GF(n) is another element of the field. For instance, Reed-Solomon codes operate on 8-bit words in a GF(256) field. Coding and decoding or error correcting of Reed-Solomon codewords and of convolutional codes using stored truth tables in accordance with an aspect of the present invention are much faster by using truth tables that are stored in addressable memory. While such a solution cost more in memory size, it will provide as an unexpected result a much faster coding and decoding operation.

It is believed that truth tables of an addition and/or a multiplication and/or a division of at least two variables or a variable and a constant in a Galois Field for at least n≥256 or p≥8 in n=$2^p$ stored in an addressable memory to perform coding and/or decoding operations in a communication system and/or a data storage system are unknown and are herein provided herewith as an aspect of the present invention.

An addressable memory in one embodiment of the present invention is an electronic memory, containing electronic memory elements, for instance flash memory, RAM, ROM, PROM, EEPROM or DRAM or any other memory that can store data. A data storage system in one embodiment is an electronic memory system a rotating storage system containing rotating or moving data storage elements including but not limited to magnetic, optical, electro-optical, magnetic-optical platters, drums, tapes, wires. A data storage system in one embodiment is a static carrier such as a magnetic, optical or otherwise machine readable device wherein the storage material can be in one of n states. A data storage system or device herein includes a computer magnetic disk, a CD or DVD disk or any disk that contains media data for replay in an apparatus, a media player such as audio or video and MP3 player. A data storage system or device herein embodies at least one or more aspects of the present invention.

The truth tables of an addition and/or a multiplication and/or a division of at least two variables or a variable and a constant stored in an addressable memory for the above systems are also provided in different embodiments of the present invention which include, but are not limited to finite fields and finite alternate fields GF(n): for n>2; for n>32; for n>200; for n=256; for n>256 and p>8 with n=$2^p$; for n≥242 and p>4 and u>2 with n=$u^p$. In further embodiments of the present invention a truth table of addition over GF(n) is implemented in active operations of binary switches such as XOR and all corresponding multiplications and/or divisions or n-state inverters related to the additions are implemented in addressable memory for: n>2; n>32; for n≥256 and n>256. In yet a further embodiment of the present invention a truth table of a multiplication and/or a division over GF(n) with n≥64, or n≥128 or n≥256 or n≥512 is stored in an addressable memory.

An n-state symbol of a truth table may be saved as a binary word. An n-state output state of an n-state truth table is determined by one n-state input symbol in case of an inverter and by at least 2 n-state input symbols in case of an addition, a multiplication and a division. The input symbol or input symbols that determine an output symbol of a truth table are used to create an address of the output symbol in the memory that stores the truth table.

The working of an addressable memory 7900 is known. It is illustrated in FIG. 39. Assume an implementation of a 2-dimensional n by n truth table. An addressable memory 7900 has an address decoder 7903 with two inputs: input 7901 is enabled to receive a signal or a plurality of signals representing a first n-state symbol and input 7902 is enabled to receive a signal or a plurality of signals representing a second n-state symbol. The address decoder 7903 combines or processes the two symbols to activate a memory line 7904 which is unique to an address in a memory or data storage 7905. The memory has at least enough storage to store all relevant output states of the truth table. Each memory line when activated allows a content of the data storage 7906 to be provided on output 7907. Data content of a data storage or of one or more memory elements only appears on output 7907 when the corresponding memory line is activated by the address decoder. The output 7907 thus provides a signal or a plurality of signals that corresponds with the output state of the truth table that belongs to two input symbols to the truth table.

When the field is very large, the storage of a complete truth table in a memory with a look-up table of an operation over that field may not be practical. In that case, the use of stored inverters and execution of long binary words with XOR devices may be preferable. The truth table of the addition should then be reduced to an implemented form as shown in FIG. 55. In the GF(8) case sc8m should be de-constructed into a XOR executable form 'sc8' with an inverter 'inv' to invert the generated output states.

The truth table of sc8m can in fact be realized with an inverter [0 1 2 3 4 5 6 7]→[7 3 6 1 5 4 2 0] on a standard addition sc8 which has been provided above.

One commonly uses the terms addition and multiplication to define a finite field. One not of ordinary skill in field theory may have problems recognizing the above functions as addition and multiplication. Formally, a finite field is defined by a first and a second "law of composition on a set of elements" as for instance explained in the book Introduction to Field Theory, second edition, by Iain T. Adamson, Dover Publications, Mineola, N.Y., 2007, which is incorporated herein by reference in its entirety. One should view the terms "addition" and "multiplication" in terms of these definitions rather than in the terms of for instance modulo-n or modulo-$2^p$ operations. However, after defining an alternate field, it is an aspect of the present invention to implement the functions of the alternate field with binary components, which include binary switching devices and binary memories. As a further aspect of the present invention the functions of the alternate field are implemented with non-binary components, which include non-binary switching devices and non-binary memories.

An addition over an alternate field can be created by inverting an addition over a standard finite field with an n-state inverter. It is noted that the corresponding multiplication can usually not be found by inverting the multiplication of the standard field with the same inverter as used to create the addition of the alternate finite field. It is further noted that each column or row of the truth table of the multiplication over the alternate field can be created by inverting a row or column of the multiplication over the standard finite field.

The following patent applications, including the specifications, claims and drawings, are hereby incorporated by reference herein, as if they were fully set forth herein: U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; U.S. Pat. No. 7,002,490 by Lablans, issued Feb. 21, 2006, entitled TERNARY AND HIGHER MULTI-VALUE SCRAMBLERS/DESCRAMBLERS; U.S. patent application Ser. No. 11/000,218, filed Nov. 30, 2004, entitled SINGLE AND COMPOSITE BINARY AND MULTI-VALUED LOGIC FUNCTIONS FROM GATES AND INVERTERS; U.S. Provisional Patent Application No. 60/599,781, filed Aug. 7, 2004, entitled MULTI-VALUED DIGITAL INFORMATION RETAINING ELEMENTS AND MEMORY DEVICES; U.S. patent application Ser. No. 11/566,725 filed Dec. 5, 2006, entitled ERROR CORRECTING DECODING FOR CONVOLUTIONAL AND RECURSIVE SYSTEMATIC CONVOLUTIONAL ENCODED SEQUENCES; U.S. patent application Ser. No. 11/018,956, filed Dec. 20, 2004, entitled Multi-value digital calculating circuits, including multipliers; U.S. patent application Ser. No. 11/534,777 filed Sep. 25, 2006, entitled ENCIPHERMENT OF DIGITAL SEQUENCES BY REVERSIBLE TRANSPOSITION METHODS; U.S. patent application Ser. No. 11/680,719 filed Mar. 1, 2007, entitled MULTI-VALUED CHECK SYMBOL CALCULATION IN ERROR DETECTION AND CORRECTION; U.S. patent application Ser. No. 11/964,507 filed Dec. 26, 2007, entitled IMPLEMENTING LOGIC FUNCTIONS WITH NON-MAGNITUDE BASED PHYSICAL PHENOMENA; U.S. patent application Ser. No. 12/061,286 filed Apr. 2, 2008, entitled Multi-State Latches From n-State Reversible Inverters; U.S. patent application Ser. No. 12/330,255 filed Dec. 8, 2008, entitled N-State Ripple Adder Scheme Coding with Corresponding N-State Ripple Adder Scheme Decoding; U.S. patent application Ser. No. 12/188,261 filed Aug. 8, 2008, entitled Methods and Systems for Modifying the Statistical Distribution of Symbols in a Coded Message; and U.S. patent application Ser. No. 12/952,482 filed Nov. 23, 2010, entitled Methods and Apparatus in Alternate Finite Field Based Coders and Decoders.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. An apparatus for encoding a first plurality of n-state symbols with n equal to or greater than 3, each symbol being represented by a signal, comprising:
an input of a device enabled to receive the first plurality of n-state symbols;
the device enabled for processing the first plurality of n-state symbols by implementing an addition and a multiplication over an alternate finite field GF(n), wherein the alternate finite field GF(n) is a finite field defined by the addition, the multiplication, and a zero element of the finite field; wherein the zero element of the alternate finite field GF(n) is a neutral element of the addition and is not 0; wherein
the apparatus is part of a communication system or a data storage system and an output enabled to provide a second plurality of symbols as a result of the processing.

2. The apparatus of claim 1, wherein n>4.

3. The apparatus of claim 1, further comprising:
an implementation of at least one n-state inverter defined by the multiplication over the alternate finite field GF(n).

4. The apparatus of claim 1, wherein the second plurality of n-state symbols is applied in symbol error correction.

5. The apparatus of claim 1, wherein the device is part of a Feistel-like network.

6. The apparatus of claim 1, wherein the apparatus is an Advanced Encryption Standard (AES) encoder.

7. The apparatus of claim 1, wherein the apparatus is an Elliptic Curve Coding encoder.

8. The apparatus of claim 1, wherein the apparatus modifies a statistical distribution of symbols in the first plurality of symbols compared to the second plurality of symbols.

9. The apparatus of claim 1, further comprising a corresponding apparatus to decode the second plurality of symbols into the first plurality of symbols.

10. The apparatus of claim 1, wherein the second plurality of symbols includes at least one check symbol.

11. The apparatus of claim 1, wherein n is a prime number.

12. The apparatus of claim 1, wherein $n=2^m$ with $m>1$.

13. The apparatus of claim 1, wherein the apparatus is a transposition encoder.

14. The apparatus of claim 1, wherein the apparatus performs a Galois arithmetical operation for encoding.

15. The apparatus of claim 1, wherein an n-state symbol is represented by a plurality of binary signals.

16. An apparatus for encoding a first sequence of n-state symbols, each n-state symbol being represented by a signal, comprising:
an input of a device enabled to receive the first sequence of n-state symbols;
the device enabled for processing the first plurality of n-state symbols by implementing a single truth table that is a truth table of a modified addition over an alternate finite field GF(n), wherein the alternate finite field GF(n) is a finite field defined by the addition, a multiplication and a neutral element of the addition; wherein the neutral element of the addition is not 0 and the modified addition over the alternate finite field GF(n) is the addition over the alternate finite field GF(n) that is modified by at least one n-state inverter defined by the multiplication over the alternate finite field GF(n) wherein n is an integer greater than 4; and wherein
the apparatus is part of a communication system or a data storage system; and an output that provides a second sequence of symbols as a result of the processing.

17. The apparatus of claim 16, wherein the apparatus is one of the group consisting of:
a scrambler, a convolutional coder, a Reed-Solomon coder, a Hamming coder, a check-symbol based error correcting coder, a transposition coders, a hopping rule coder, a Linear Feedback Shift Register based coder, a Feistel-like network based coder, an Elliptic Curve Coding coder, a symbol statistical distribution modifying coder, a Galois Field arithmetic based coder, a sequence generator based encoder, a streaming coder, a block coder and an Advanced Encryption Standard (AES) coder.

18. A method for decoding a sequence of encoded n-state symbols with n>4, each n-state symbol in the sequence of encoded n-state symbols being represented by a signal, comprising:
- providing a plurality of signals representing the encoded sequence of n-state symbols to an input of a processor; wherein
- the encoded sequence of n-state symbols was generated using an encoder in the group consisting of a convolutional encoder, a Reed-Solomon encoder, a Hamming coder, a check-symbol based error correcting encoder, a transposition encoder, a hopping rule encoder, a streaming cipher encoder, a block coder, a Feistel-like network based encodes an Elliptic Curve Coding encoder, a symbol statistical distribution modifying encoder, a Galois Field arithmetic based encoder and an Advanced Encryption Standard (AES) encoder;
- the processor processing the plurality of signals representing the encoded sequence of n-state symbols by an implementation of an addition and a multiplication over an alternate finite field, wherein the addition and the multiplication over the alternate finite field define the alternate finite field; wherein a zero element of the alternate finite field is a neutral element of the addition over the alternate finite field and is not 0; and an output providing a plurality of signals representing a decoded sequence of n-state symbols on an output as a result of the processing.

* * * * *